(12) United States Patent
Gao et al.

(10) Patent No.: US 12,510,715 B2
(45) Date of Patent: Dec. 30, 2025

(54) OPTICAL MODULE, COMMUNICATION DEVICE, AND POE DEVICE

(71) Applicant: HUAWEI TECHNOLOGIES CO., LTD., Shenzhen (CN)

(72) Inventors: Shimin Gao, Dongguan (CN); Lu Cao, Shenzhen (CN); Xue Yin, Shenzhen (CN); Jiansi Tan, Dongguan (CN); Dada Liu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 298 days.

(21) Appl. No.: 18/172,214

(22) Filed: Feb. 21, 2023

(65) Prior Publication Data

US 2023/0194812 A1    Jun. 22, 2023

Related U.S. Application Data

(63) Continuation of application No. PCT/CN2021/090738, filed on Apr. 28, 2021.

(30) Foreign Application Priority Data

Aug. 18, 2020    (CN) .......................... 202010831724.6
Sep. 22, 2020    (CN) .......................... 202011004279.2

(51) Int. Cl.
*H04B 10/00*    (2013.01)
*G02B 6/38*    (2006.01)
(Continued)

(52) U.S. Cl.
CPC ......... *G02B 6/4293* (2013.01); *G02B 6/3817* (2013.01); *G02B 6/4246* (2013.01);
(Continued)

(58) Field of Classification Search
CPC .. G02B 6/4293; G02B 6/3817; G02B 6/4246; G02B 6/4278; G02B 6/428;
(Continued)

(56) References Cited

U.S. PATENT DOCUMENTS 4,491,981 A * 1/1985 Weller ................. H05K 7/1427
336/98
6,846,115 B1 * 1/2005 Shang ................. G02B 6/4277
439/91

(Continued)

FOREIGN PATENT DOCUMENTS

CN    111129876 A    5/2020

*Primary Examiner* — Agustin Bello
(74) *Attorney, Agent, or Firm* — Leydig, Voit & Mayer, Ltd.

(57) ABSTRACT

An optical module, a communication device, and a Power over Ethernet (PoE) device are provided. The optical module includes a housing, an optical component, and a power supply component. The housing has a first socket and a second socket. The optical component also includes a first optical connector, an optical-to-electrical conversion component, and a second optical connector that are sequentially connected. The power supply component includes a first electrical connector, a power supply line, and a second electrical connector that are sequentially connected. The first socket is configured to insert a composite cable that matches the optical module. A power connector of the composite cable can be connected to the communication device by using the optical module, and the power connector of the composite cable does not need to be inserted into the communication device, so that panel space of the communication device can be reduced and miniaturization facilitated.

13 Claims, 42 Drawing Sheets

(51) Int. Cl.

| | |
|---|---|
| *G02B 6/42* | (2006.01) |
| *H01R 13/04* | (2006.01) |
| *H01R 13/05* | (2006.01) |
| *H01R 13/08* | (2006.01) |
| *H01R 13/10* | (2006.01) |
| *H01R 13/22* | (2006.01) |
| *H01R 13/24* | (2006.01) |
| *H01R 13/26* | (2006.01) |
| *H01R 13/518* | (2006.01) |
| *H01R 31/06* | (2006.01) |
| *H01R 43/20* | (2006.01) |
| *H04B 10/80* | (2013.01) |
| *H01R 13/631* | (2006.01) |
| *H01R 24/00* | (2011.01) |
| *H01R 24/62* | (2011.01) |
| *H01R 103/00* | (2006.01) |
| *H04B 10/40* | (2013.01) |

(52) U.S. Cl.
CPC ........... *G02B 6/4278* (2013.01); *G02B 6/428* (2013.01); *G02B 6/4284* (2013.01); *G02B 6/4292* (2013.01); *H01R 13/04* (2013.01); *H01R 13/05* (2013.01); *H01R 13/08* (2013.01); *H01R 13/10* (2013.01); *H01R 13/22* (2013.01); *H01R 13/2471* (2013.01); *H01R 13/26* (2013.01); *H01R 13/518* (2013.01); *H01R 31/06* (2013.01); *H01R 43/20* (2013.01); *H04B 10/801* (2013.01); *H04B 10/808* (2013.01); *G02B 6/4274* (2013.01); *H01R 13/631* (2013.01); *H01R 24/00* (2013.01); *H01R 24/62* (2013.01); *H01R 2103/00* (2013.01); *H04B 10/40* (2013.01); *Y02E 10/50* (2013.01)

(58) Field of Classification Search
CPC .. G02B 6/4284; G02B 6/4292; G02B 6/4274; H01R 13/04; H01R 13/05; H01R 13/08; H01R 13/10; H01R 13/22; H01R 13/2471; H01R 13/26; H01R 13/518; H01R 31/06; H01R 43/20; H01R 13/631; H01R 24/62; H01R 2103/00; H01R 24/00; H04B 10/801; H04B 10/808; H04B 10/40; Y02E 10/50
See application file for complete search history.

(56) References Cited

U.S. PATENT DOCUMENTS

| | | | | |
|---|---|---|---|---|
| 7,213,980 B2 * | 5/2007 | Oki | ............... | G02B 6/4256 385/94 |
| 7,325,983 B1 * | 2/2008 | Dallesasse | ........... | G02B 6/4269 398/79 |
| 8,641,429 B2 * | 2/2014 | Fish | ................... | H01R 13/6658 439/76.1 |
| 8,646,991 B2 * | 2/2014 | Sakurai | ................ | G02B 6/3817 398/141 |
| 9,523,827 B2 * | 12/2016 | Sano | ................... | G02B 6/4293 |
| 9,544,058 B2 * | 1/2017 | Coffey | ................ | G02B 6/3895 |
| 9,696,506 B2 * | 7/2017 | Wu | ................... | H05K 7/20409 |
| 10,468,794 B2 * | 11/2019 | Leigh | ................ | G02B 6/36 |
| 10,541,758 B2 * | 1/2020 | Goergen | .............. | H04M 19/08 |
| 11,300,737 B2 * | 4/2022 | Lan | ................ | G02B 6/4261 |
| 11,956,090 B2 * | 4/2024 | Cao | ................... | G02B 6/4274 |
| 2007/0237463 A1 * | 10/2007 | Aronson | .............. | G02B 6/4416 385/89 |
| 2007/0253168 A1 * | 11/2007 | Miller | .................. | G02B 6/4246 361/719 |
| 2010/0303465 A1 * | 12/2010 | Dahlfort | .............. | G02B 6/4201 398/115 |
| 2011/0086539 A1 * | 4/2011 | Aguren | ................ | H01R 13/641 439/490 |
| 2011/0221601 A1 * | 9/2011 | Aguren | ................ | G02B 6/3895 340/653 |
| 2011/0221609 A1 * | 9/2011 | Aguren | ................ | G02B 6/4284 340/687 |
| 2011/0229083 A1 * | 9/2011 | Nior | ..................... | G02B 6/3823 385/74 |
| 2011/0262074 A1 * | 10/2011 | Shirk | .................. | G02B 6/0008 385/52 |
| 2012/0301134 A1 * | 11/2012 | Davari | ................ | H04L 43/0817 398/9 |
| 2014/0258742 A1 * | 9/2014 | Chien | ................ | H04L 12/10 713/300 |
| 2015/0023671 A1 | 1/2015 | Bradley et al. | | |
| 2015/0147036 A1 * | 5/2015 | Isenhour | .............. | G02B 6/3817 29/862 |
| 2016/0054527 A1 * | 2/2016 | Tang | ................... | G02B 6/3895 439/155 |
| 2016/0057518 A1 * | 2/2016 | Neudorf | ............... | G02B 6/4292 398/45 |
| 2016/0103286 A1 * | 4/2016 | Matsui | ................ | G02B 6/4246 398/139 |
| 2016/0202434 A1 * | 7/2016 | Masahiko | ........... | G02B 6/3893 385/14 |
| 2017/0269316 A1 * | 9/2017 | Chang | .................... | H01L 24/81 |
| 2018/0149819 A1 * | 5/2018 | Rivaud | ................ | G02B 6/3814 |
| 2019/0089467 A1 * | 3/2019 | Goergen | .............. | G02B 6/4293 |
| 2019/0219780 A1 * | 7/2019 | Andrus | ................ | G02B 6/4284 |
| 2020/0044751 A1 * | 2/2020 | Goergen | ................ | H04L 12/12 |
| 2020/0137915 A1 * | 4/2020 | Morihata | ............ | G02B 6/0008 |
| 2020/0153515 A1 * | 5/2020 | Goergen | ............ | G01J 1/4257 |
| 2020/0195350 A1 * | 6/2020 | Matsui | ................ | G02B 6/4281 |
| 2020/0295528 A1 * | 9/2020 | Du | ...................... | H01S 5/02325 |
| 2020/0367392 A1 * | 11/2020 | Long | ................ | H01R 13/6582 |
| 2020/0386954 A1 * | 12/2020 | Lan | ....................... | G02B 6/4261 |
| 2021/0075163 A1 * | 3/2021 | Takai | .................... | H05K 1/141 |
| 2021/0126392 A1 * | 4/2021 | Briant | ................ | G02B 6/4292 |
| 2021/0194173 A1 * | 6/2021 | Yang | ................ | H01R 13/6594 |
| 2022/0019040 A1 * | 1/2022 | Lu | ...................... | G02B 6/4246 |
| 2022/0021457 A1 * | 1/2022 | Lu | .......................... | H04B 10/40 |
| 2022/0102880 A1 * | 3/2022 | Huang | ................ | H01R 13/6658 |
| 2023/0194812 A1 * | 6/2023 | Gao | ..................... | H01R 13/10 385/88 |
| 2023/0204883 A1 * | 6/2023 | Gao | ..................... | H01R 13/08 385/92 |
| 2023/0273380 A1 * | 8/2023 | Gao | ................... | G02B 6/4284 385/88 |
| 2023/0288654 A1 * | 9/2023 | Ge | ...................... | G02B 6/4281 |
| 2024/0106173 A1 * | 3/2024 | Duan | ....................... | G02B 6/00 |
| 2024/0302612 A1 * | 9/2024 | Winzer | ................ | G02B 6/3885 |
| 2024/0361540 A1 * | 10/2024 | Kao | ................... | G02B 6/4277 |
| 2025/0004224 A1 * | 1/2025 | Huang | ............... | H01R 13/7172 |

* cited by examiner

OPTICAL MODULE, COMMUNICATION DEVICE, AND POE DEVICE

CROSS-REFERENCE TO RELATED APPLICATIONS

This application is a continuation of International Application No. PCT/CN2021/090738, filed on Apr. 28, 2021, which claims priority to Chinese Patent Application No. 202010831724.6, filed on Aug. 18, 2020 and Chinese Patent Application No. 202011004279.2, filed on Sep. 22, 2020. All of the aforementioned patent applications are hereby incorporated by reference in their entireties.

FIELD

The disclosure relates to the field of optical communication technologies, and in particular, to an optical module, a communication device, and a Power over Ethernet (PoE) device.

BACKGROUND

Power over Ethernet (PoE) is a technology that transmits data and power simultaneously over Ethernet cables. A device that provides power is referred to as power sourcing equipment (PSE), and a device that receives power is referred to as a powered device (PD). The PSE may be, for example, a switch, and the PD may be, for example, an internet protocol (IP) telephone, an access point (AP) device, or a network camera.

The PSE and the PD may be connected by using a composite cable in which an optical fiber and a copper wire are wrapped. For example, an optical module is inserted into a panel of the PSE, and may be denoted as a first optical module. An optical module is inserted into a panel of the PD, and may be denoted as a second optical module. The PSE and the PD are connected by using a composite cable between the first optical module and the second optical module.

To implement the foregoing connection, each end of the composite cable has an optical fiber connector and a power connector, and panels of the PSE and the PD have an optical port and an electrical port respectively. The optical port has an optical interface configured to connect to the optical fiber connector, and the electrical port has an electrical interface configured to connect to the power connector.

In this way, the first optical module is inserted into the optical port of the PSE, the second optical module is inserted into the optical port of the PD, the optical fiber connector at one end of the composite cable is inserted into the first optical module, the power connector is inserted into the electrical port of the PSE, the optical fiber connector at the other end of the composite cable is inserted into the second optical module, and the power connector is inserted into the electrical port of the PD, so that the PSE is connected to the PD by using the two optical modules and the composite cable.

The foregoing solution is not conducive to miniaturization development of PoE devices such as switches and APs.

SUMMARY

The disclosure provides an optical module, a communication device, and a Power over Ethernet (PoE) device, to overcome limitations in related technology.

According to a first aspect, an optical module is provided. The optical module includes a housing, an optical component, and a power supply component.

A first end of the housing is provided with a first socket, and a second end of the housing is provided with a second socket. The optical component includes a first optical connector, an optical-to-electrical conversion component, and a second optical connector that are sequentially connected. The power supply component includes a first electrical connector, a power supply line, and a second electrical connector that are sequentially connected. A first electrical connector conductive part of the first electrical connector includes a bent strip.

Both the optical-to-electrical conversion component and the power supply line are located in the housing, the first optical connector is located in the first socket, the first electrical connector is located at the first socket, and positions of the first optical connector and the first electrical connector are independent of each other, and both the second optical connector and the second electrical connector are located in the second socket.

The first socket is configured to insert a composite cable that matches the optical module, and the optical module is any one of a standard optical module packaging type.

According to the solution shown in this application, the optical module not only has an optical-to-electrical conversion function, but also has the power supply component for implementing PoE. In addition, the power supply component does not change an original structural feature of the optical module, and does not affect a size of the optical module. In this way, a power connector of the composite cable is electrically connected to the communication device by using the optical module, and the power connector of the composite cable does not need to be inserted into the communication device, so that panel space of the communication device can be reduced, and miniaturization development of the communication device is facilitated.

The first electrical connector at the first end of the optical module does not change the original structural feature of the optical module, so that the first end of the optical module is compatible, and can be configured to insert a composite cable or an optical cable. Therefore, the optical module has a wide application scenario.

In a possible implementation, the first electrical connector conductive part is located in a center pillar of the optical module, and a current passing through is greater than or equal to a target current value, and can meet a specified safety range under a target voltage.

In the solution shown in this application, the first electrical connector conductive part is disposed in the center pillar, and the current passing through the first electrical connector conductive part is large, for example, greater than or equal to 2 A. When the target voltage is applied to the first electrical connector conductive part, the specified safety range can be met. For example, when a voltage of 48 V is applied to the first electrical connector conductive part, a minimum spacing between a first bent strip and a second bent strip of the first electrical connector conductive part is greater than or equal to 2 millimeters, so as to avoid breakdown of an insulation material between the first bent strip and the second bent strip.

In a possible implementation, the first electrical connector conductive part includes the first bent strip and the second bent strip.

A part of the first bent strip and a part of the second bent strip are located in a same vertical plane.

A part of the first bent strip and a part of the second bent strip are located in a same horizontal plane.

In the solution shown in this application, a part that is of the first bent strip and that is connected to the power connector of the composite cable and a part that is of the second bent strip and that is connected to the power connector of the composite cable are arranged from top to bottom, and are located in a same vertical plane. A part that is of the first bent strip and that is connected to the power supply line and a part that is of the second bent strip and that is connected to the power supply line are arranged from left to right, and are located in a same horizontal plane.

In a possible implementation, the first bent strip includes a first segment, a second segment, and a third segment.

One end of the second segment is connected to a side part of the first segment, the other end of the second segment is connected to a side part of the third segment, and the first segment and the third segment are located on different sides of the second segment, and there is a height difference between the first segment and the third segment.

The first segment, the second segment, and the third segment are integrally formed.

In the solution shown in this application, because there is a height difference between the first segment and the third segment, and one end of the second segment is connected to a side part of the first segment. In this case, a joint between the first segment and the second segment is bent once. The first segment and the third segment are located on different sides of the second segment, and the other end of the second segment is connected to a side part of the third segment. In this case, a joint between the second segment and the third segment is bent once. It can be learned that the first bent strip can be installed in the center pillar by two bendings for changing a direction.

In a possible implementation, a bending of the second bent strip matches a bending of the first bent strip.

In the solution shown in this application, the bending of the second bent strip is to adapt to the bending of the first bent strip, so as to increase a distance between the first bent strip and the second bent strip. In this case, the distance between the first bent strip and the second bent strip meets a specified safety range.

In a possible implementation, the second bent strip includes a fourth segment, a fifth segment, and a sixth segment.

One end of the fifth segment is connected to one end of the fourth segment, the other end of the fifth segment is connected to an end part of the sixth segment, the fourth segment and the sixth segment are located on different sides of the fifth segment, and there is a height difference between the fourth segment and the sixth segment.

The fourth segment, the fifth segment, and the sixth segment are integrally formed, and are located in a same vertical plane.

In a possible implementation, a minimum spacing between the first bent strip and the second bent strip meets a specified safety range under a target voltage.

In the solution shown in this application, the minimum spacing between the first bent strip and the second bent strip meets the specified safety range under the target voltage, to ensure that an insulation material between the first bent strip and the second bent strip cannot be broken down when the target voltage is applied to the first bent strip and the second bent strip. This improves safety and ensures a service life of the optical module.

In a possible implementation, a cross-sectional area of the first bent strip and a cross-sectional area of the second bent strip can satisfy that a current passing through is greater than or equal to a target current value.

In the solution shown in this application, because a value of the current passing through the first electrical connector conductive part is related to a voltage applied to the first electrical connector conductive part and a resistance of the first electrical connector conductive part, and the resistance of the first electrical connector conductive part is related to a cross-sectional area of the first electrical connector conductive part, when a power supply voltage (for example, 48 V) is known, the cross-sectional area of the first electrical connector conductive part may be adjusted, so that the first electrical connector conductive part can allow a current with a value greater than or equal to the target current value to pass through, to improve a rate and efficiency of PoE.

In a possible implementation, a shape of a connection part that is of the first electrical connector conductive part and that is close to the power supply line matches a shape of the power supply line.

Both the third segment of the first bent strip and the sixth segment of the second bent strip are connection parts that of the first electrical connector conductive part and that are close to the power supply line.

In a possible implementation, the power supply line is a flexible circuit board, a connection part of the first electrical connector conductive part has a sheet-shaped structure, and the connection part is welded to a surface of the power supply line.

In the solution shown in this application, the power supply line is a flexible circuit board. In this case, the connection part that is of the first electrical connector conductive part and that is close to the power supply line may be formed in a sheet shape, so that the connection part is welded on a surface of the flexible circuit board, to implement an electrical connection between the connection part and the flexible circuit board.

In a possible implementation, the power supply line is a cable, the connection part of the first electrical connector conductive part has a circular-ring-shaped structure, and an end part of the power supply line is fastened in the connection part.

In the solution shown in this application, the power supply line is a cable. In this case, the connection part that is of the first electrical connector conductive part and that is close to the power supply line may be formed in a circular-ring-shaped structure, so as to fasten an end part of the connection cable and implement an electrical connection between the connection part and the cable.

In a possible implementation, the center pillar includes a support plate and a guiding and limiting plate, and one end of the guiding and limiting plate is located on a surface of the support plate.

The support plate is located at a position that is in the first socket and that is close to the inside of the housing, the guiding and limiting plate is located at a position that is in the first socket and that is close to the outside of the housing, and the first optical connector is located on the support plate.

The first segment of the first bent strip is located on the guiding and limiting plate, and the first segment is exposed on the guiding and limiting plate, and the third segment of the first bent strip is located on the support plate, and the third segment is exposed on the support plate.

The fourth segment of the second bent strip is located on the guiding and limiting plate, the fourth segment is exposed on the guiding and limiting plate, the sixth segment of the second bent strip is located on the support plate, and the sixth segment is exposed on the support plate.

In the solution shown in this application, both the first segment of the first bent strip and the fourth segment of the second bent strip are connected to a power connector of the composite cable, and both the third segment of the first bent strip and the sixth segment of the second bent strip are connected to the power supply line.

In a possible implementation, the guiding and limiting plate includes a first plate body and a second plate body, a height of the first plate body is less than a height of the second plate body, the first plate body is located at one end of the second plate body, and an end part that is of the second plate body and that is away from the first plate body is located on a surface of the support plate.

One part of the first segment of the first bent strip is located on an upper surface of the first plate body, and the other part of the first segment is located in the second plate body. One part of the fourth segment of the second bent strip is located on a lower surface of the first plate body, and the other part of the fourth segment is located in the second plate body.

In the solution shown in this application, the first plate body of the guiding limiting plate is of a protruded column-shaped structure relative to the second plate body, so as to be connected to a power connector of a groove structure of the composite cable.

In a possible implementation, an end part that is of the guiding and limiting plate and that is away from the support plate has a groove.

Apart that is of the first horizontal part and that is away from the bent part is located on a groove wall of the groove.

In an example, an outer end face of the guiding and limiting plate has a groove, and the first horizontal part is located on an inner wall of the groove, so as to be connected to a power connector of a column-shaped structure of the composite cable.

In a possible implementation, a strip-shaped guide block is provided at an end part of the center pillar in a height direction, and an inner wall of the first socket has a strip-shaped guide groove.

The strip-shaped guide block matches the strip-shaped guide groove, and the strip-shaped guide block is located in the strip-shaped guide groove.

In an example, during assembly of the center pillar, quick and accurate assembly is implemented through matching between the strip-shaped guide block and the strip-shaped guide groove of the center pillar.

According to a second aspect, a communication device is provided. The communication device includes a chassis, a mainboard, and an optical-to-electrical conversion assembly.

A panel of the chassis is provided with an optical cable socket, and the optical-to-electrical conversion assembly includes an optical component and a power supply component.

The mainboard, the optical component, and the power supply component are all located in the chassis. Both the optical component and the power supply component are located on a surface of the mainboard, and an optical connector of the optical component and an electrical connector of the power supply component have positions independent of each other and both are located in the optical cable socket.

In an example, the communication device is integrated with the optical-to-electrical conversion assembly. In this case, when the communication device is connected to another device, only an optical cable or a composite cable needs to be inserted, and an optical module does not need to be additionally inserted. Therefore, the connection operation is simple, and loss of the optical module can be avoided. In addition, a case in which a connection fails due to mismatching between the optical module and the communication device can be avoided.

In a possible implementation, a conductive part of the electrical connector of the power supply component may include the foregoing bent strip.

In a possible implementation, both the optical connector of the optical component and the electrical connector of the power supply component are located in the optical cable socket, and positions of the optical connector of the optical component and the electrical connector of the power supply component are independent of each other, so that the optical cable socket is configured to insert a cable, and the cable may be a composite cable or an optical cable.

In an example, the optical cable socket of the communication device is compatible, so that an optical cable that does not include a power connector can be inserted into the optical cable socket and connected to an optical connector in the optical cable socket, to implement optical signal transmission. Therefore, wide application of the communication device can be enhanced, and use flexibility can be improved.

According to a third aspect, a PoE device is provided. The PoE device includes the optical module in the first aspect and the implementations of the first aspect.

Figure 1:
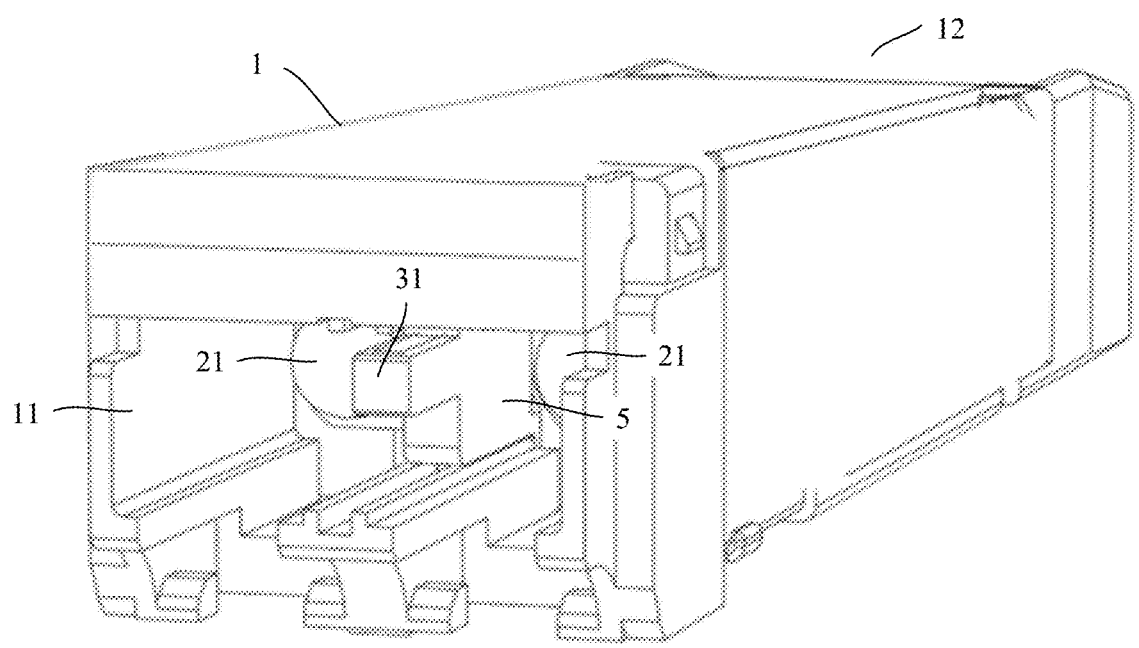
FIG. 1 is a schematic diagram of a structure of an optical module according to this application.

DESCRIPTION OF REFERENCE NUMERALS 1, housing; 11, first socket; 12, second socket; 111, strip-shaped guide groove;

2, optical component; 21, first optical connector; 22, optical-to-electrical conversion component; 23, second optical connector;

221, first rigid circuit board; 222, conversion component;

3, optical component; 31, first electrical connector; 32, power supply line; 33, second electrical connector;

311, first electrical connector conductive part; 321, second rigid circuit board; 322, cable; 323, flexible circuit board; 331, second electrical connector conductive part;

3111, first bent strip; 3111a, first segment; 3111b, second segment; 3111c, third segment;

3112, second bent strip; 3112a, fourth segment; 3112b, fifth segment; 3112c, sixth segment;

3311, straight part; 3312, bent part; 3312a, bending position; 3313, pin shaft; 3313a, groove; 3313b, bump; 3314, tube; 3314a, through hole; 3314b, axial strip-shaped hole;

23-33, composite electrical connector; 23-33-1, composite electrical joint carrier; 23-33-2, composite electrical connector edge connector; 23-33-2a, first metal sheet; 23-33-2b, second metal sheet;

4, pluggable guide block; 40, body; 41, mounting groove; 42, slider; 43, first elastic part; 44, pressing part; 45, second elastic part; 46, L-shaped rod; 47, U-shaped part;

401, sliding slot; 461, first rod; 462, second rod;

5, center pillar; 51, support plate; 52, guiding and limiting plate; 53, strip-shaped guide block;

521, first plate body; 522, second plate body; 523, groove;

100, chassis; 200, mainboard; 300, optical-to-electrical conversion assembly; and 600, optical cage.

DETAILED DESCRIPTION

In some related solutions, for each optical electrical composite cable, at least two ports need to be disposed on a panel of a communication device, such as a switch and an AP. One port is used as an optical port and is connected to an optical fiber in the optical electrical composite cable by using an optical module, and the other port is used as an electrical port to insert a power connector of the optical electrical composite cable. Each optical electrical composite cable occupies a relatively large panel size, which is unfavorable to miniaturization development of communication devices such as switches and APs.

The optical electrical composite cable, also referred to as a composite cable for short, is a cable in which an optical fiber and a copper wire are wrapped. The optical fiber is used to transmit an optical signal, the copper wire is used to transmit electric energy, and the transmission of the electric energy may also be referred to as electric energy transmission and power transmission.

Embodiments of this application provide an optical module. The optical module includes an optical component configured to implement optical-to-electrical conversion and a power supply component configured to implement power transmission. Therefore, the optical module may also be referred to as an optical electrical composite module, or a composite module for short. Therefore, the optical module may be configured to perform conversion between an optical signal and an electrical signal, and may be further configured to implement PoE.

The optical module may be applied to a connection between a switch and an AP. An optical module is inserted into a panel of the switch and a panel of the AP separately. The optical module inserted into the switch is connected to the optical module inserted into the AP by using a composite cable, to implement a connection between the switch and the AP.

A first end of the optical module is configured to insert the composite cable, and a second end of the optical module is configured to be inserted into a communication device (for example, the switch and the AP).

In this case, a panel of the communication device has a port (the port may also be referred to as a socket, that is, a socket of an optical cage of the communication device) configured to insert the optical module. The port has an electrical interface connected to an electrical connector (that is, a second optical connector mentioned below) of an optical component of the optical module, and the port further has an electrical interface connected to an electrical connector (that is, a second electrical connector mentioned below) of a power supply component of the optical module. Such a communication device may be referred to as an updated communication device.

Similarly, an end part of the composite cable has an optical fiber connector connected to an optical connector (that is, a first optical connector mentioned below) of the optical component of the optical module, and an end part of the composite cable further has a power connector connected to the electrical connector of the optical module.

In this way, both optical signal transmission and power transmission can be performed between the composite cable and the optical module, and both electrical signal transmission and power transmission can be performed between the optical module and the communication device.

It can be learned that the optical module includes a component (that is, the optical component mentioned below) for implementing an optical-to-electrical conversion function and a component (that is, the power supply component mentioned below) for implementing a PoE function, so that a panel of a communication device that matches the optical module only needs to have a port for inserting the optical module, and the port has an interface for transmitting an electrical signal with the optical component and an interface for transmitting power with the power supply component. This reduces a size of the panel of the communication device and facilitates miniaturization development of the communication device.

Certainly, because the first end that is of the optical module and that is configured to insert the composite cable is compatible, the optical module may be used together with a composite cable that includes a power connector, or may be used together with a conventional optical cable that does not include a power connector. In other words, the first end of the optical module not only can be configured to insert the composite cable, but also can be configured to insert the optical cable.

Similarly, because the second end that is of the optical module and that is configured to be inserted into the communication device is compatible, the optical cage of the communication device may have only an electrical interface connected to the electrical connector (that is, the second optical connector mentioned below) of the optical component of the optical module, and does not have an electrical interface connected to the electrical connector (that is, the second electrical connector mentioned below) of the power supply component of the optical module. Such a communication device may be referred to as a communication device before update, and the optical module in this embodiment may also be used together with the communication device before the update. Therefore, the second end of the optical module can be inserted into a communication device that includes a power connector in an optical cage, and can alternatively be inserted into a communication device that does not include a power connector in an optical cage.

The following should be noted.

The optical module in this embodiment may be any one of an optical receiving module, an optical transmitting module, an optical transceiver integrated module, and an optical forwarding module.

The optical module described in this embodiment may be either a hot-pluggable optical module or a non-hot-pluggable optical module.

The optical module described in this embodiment may be any one of a standard packaging type, for example, may be a small form pluggable (small form pluggable, SFP) optical module, a quad small form factor pluggable-double density (quad small form factor pluggable-double density, QSFP-DD) optical module, a C form factor pluggable (C form factor pluggable, CFP) optical module, a gigabit interface converter (gigabit interface converter, GBIC) optical module, a 10 gigabit small form pluggable (10 gigabit small form pluggable, XFP) optical module, and the like.

Figure 2:
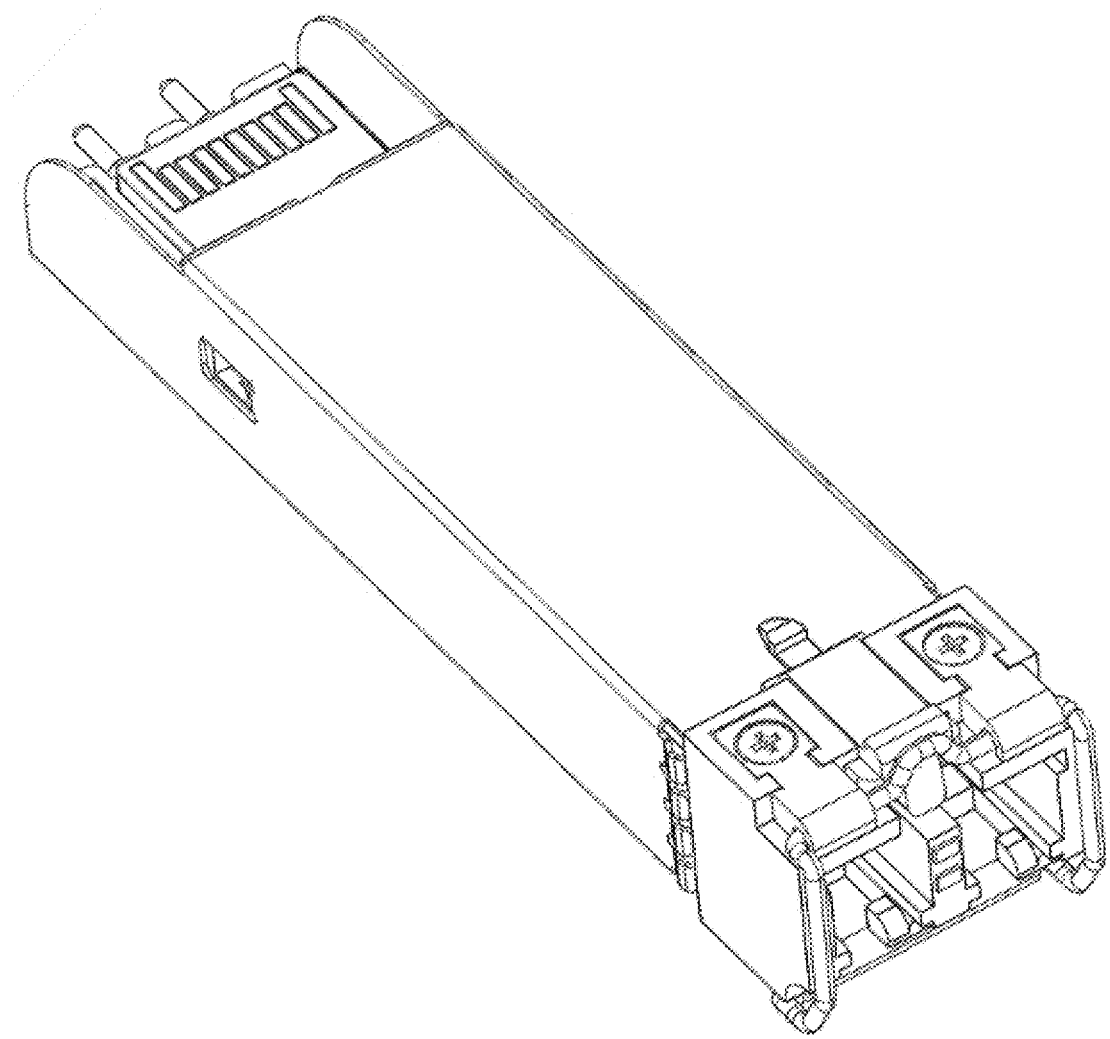
FIG. 2 is a schematic diagram of a structure of an optical module according to this application.
Figure 3:
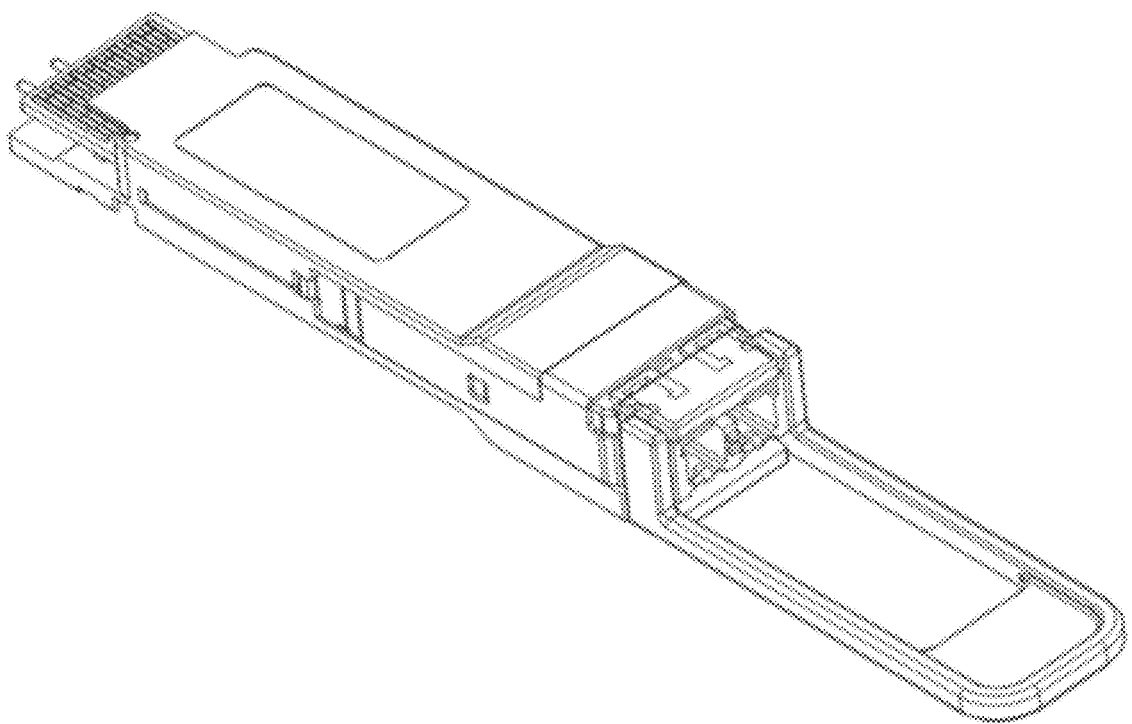
FIG. 3 is a schematic diagram of a structure of an optical module according to this application.
Figure 4:
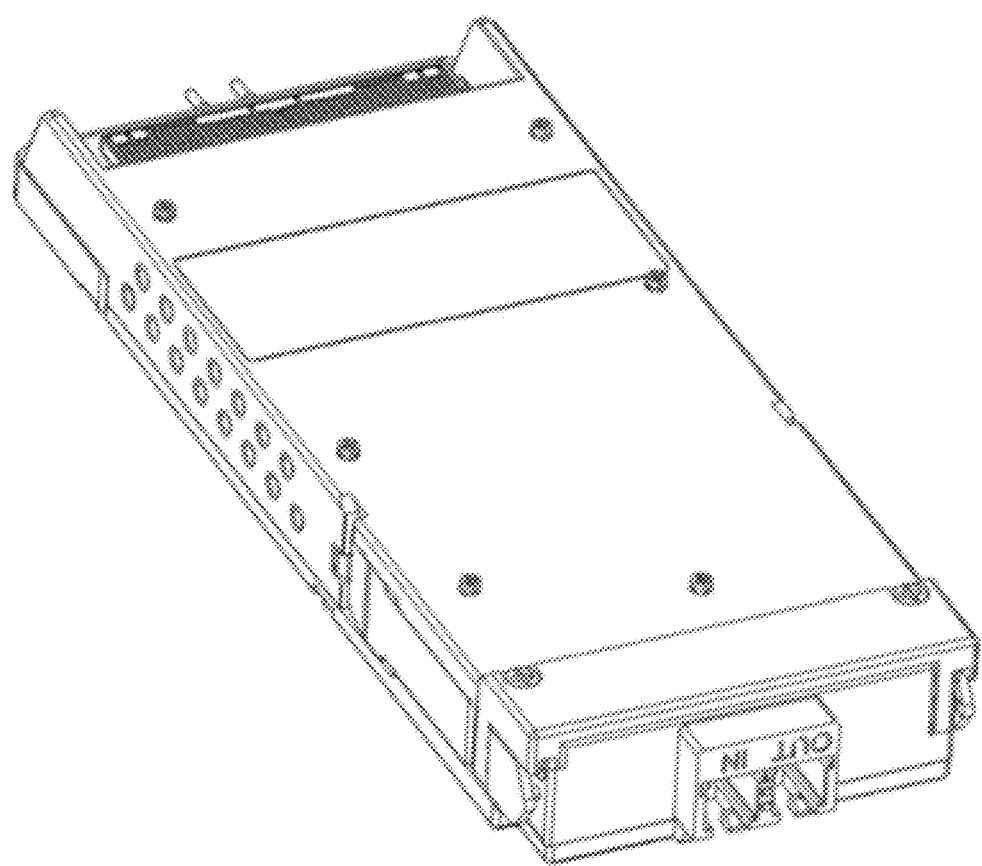
FIG. 4 is a schematic diagram of a structure of an optical module according to this application.

For example, the optical module may be an optical module shown in FIG. 1, and the optical module is an SFP optical module. For another example, the optical module may alternatively be an optical module shown in FIG. 2, and the optical module is an SFP optical module. A difference between the SFP optical module shown in FIG. 1 and the SFP optical module shown in FIG. 2 lies in a structure form of a front panel. For another example, the optical module may alternatively be an optical module shown in FIG. 3, and the optical module is a QSFP-DD optical module. For another example, the optical module may alternatively be an optical module shown in FIG. 4. The optical module is a CFP2 optical module, and the CFP2 optical module is an optical module whose size is half of a size of a CFP optical module.

A specific type of the optical module is not specifically limited in this embodiment, and the optical module in this embodiment may be an optical module packaged in any standard packaging format. For ease of description, an optical module whose packaging type is SFP shown in FIG. 1 may be used as an example. An optical module in another form is similar to the optical module, and details are not described again. The following describes in detail a specific structure of a component for implementing an optical-to-electrical conversion function and a specific structure of a component for implementing a PoE function that are of the optical module.

Figure 5:
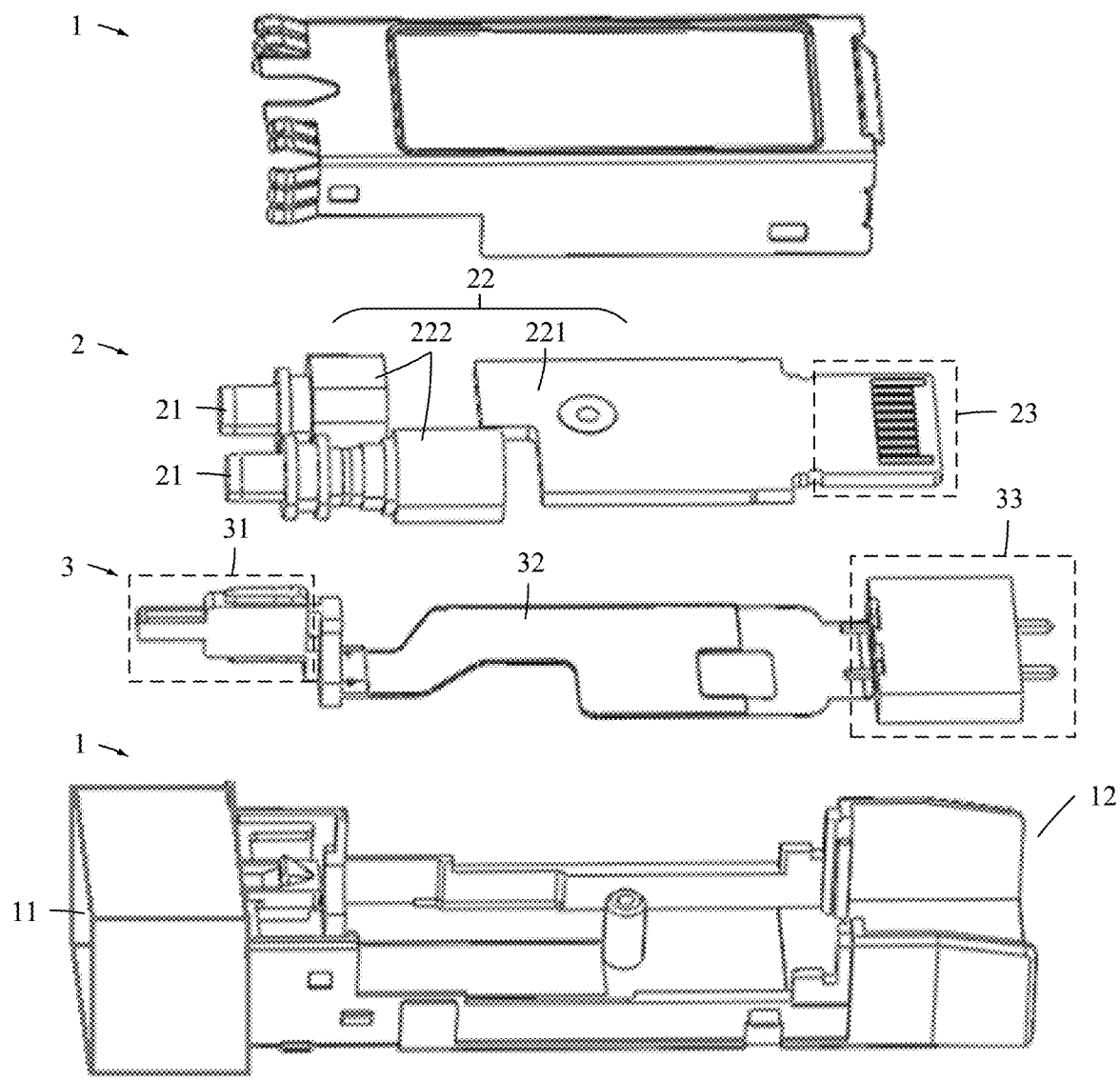
FIG. 5 is a schematic diagram of an exploded structure of an optical module according to this application.

FIG. 5 is a schematic diagram of an exploded structure of the optical module. The optical module includes a housing 1, an optical component 2, and a power supply component 3.

The housing 1 is used as a protective housing of the optical module, and is configured to protect components inside the optical module, so as to implement protection and dustproof and waterproof functions. The optical component 2 is a component configured to implement an optical-to-electrical conversion function. The power supply component 3 is a component configured to implement a PoE function.

To better understand the optical module, the following briefly describes main structures and relative position relationships of the housing 1, the optical component 2, and the power supply component 3.

(1) The Housing 1 of the Optical Module

Figure 6:
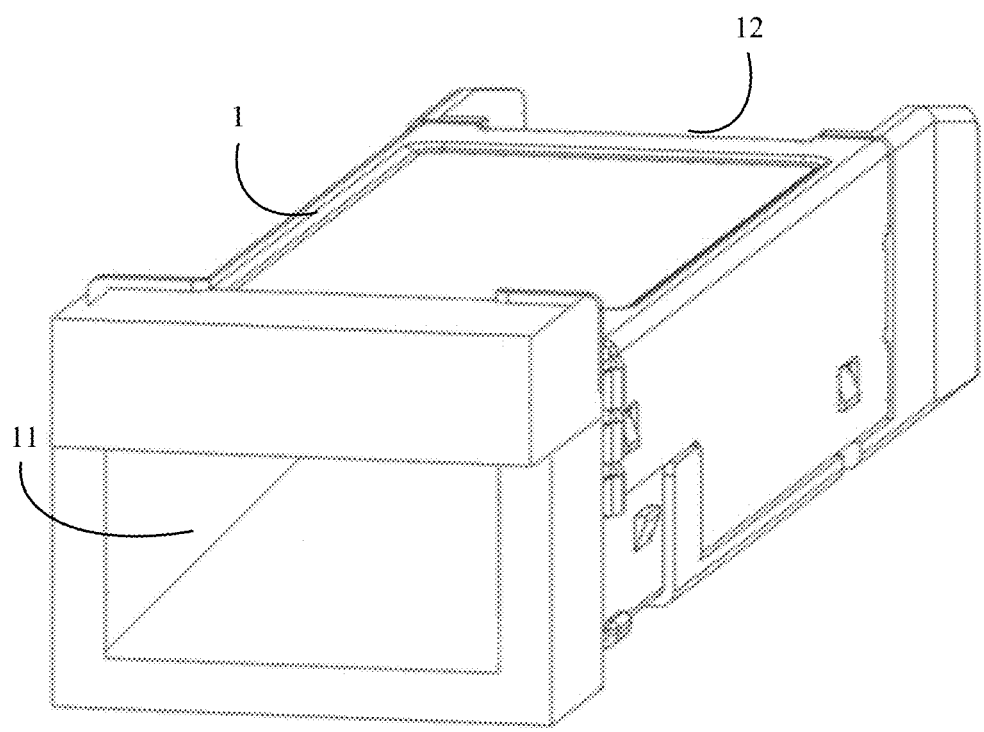
FIG. 6 is a schematic diagram of a structure of a housing of an optical module according to this application.

As shown in FIG. 6, the optical module may be a cuboid box-shaped structure. Correspondingly, the housing 1 may also be a cuboid box-shaped structure. In an example, the housing 1 may be a cuboid box-shaped structure with openings at two ends in a length direction, one of the openings at the two ends is used as a first socket 11, and the other is used as a second socket 12. In another example, the housing 1 may include an upper cover and a base, and the upper cover and the base are fastened to form the housing 1. For example, the upper cover may have a cover-shaped structure, and covers the base. For another example, the upper cover has a plate shape, the base has a box shape without a cover, and the base is covered by the upper cover. A specific structure of the upper cover and a specific structure of the base are not limited in this embodiment, so that the upper cover and the base may be fastened to form a box-shaped structure with openings at two ends.

The first socket 11 (located at a first end of the housing 1) of the housing 1 is configured to insert a composite cable, so as to implement an optical fiber connection between the optical module and the composite cable. The second socket 12 (located at a second end of the housing 1) of the housing 1 is configured to be inserted into an optical cage of a communication device, so as to implement an electrical connection between the optical module and the communication device.

(2) The Optical Component 2

Figure 7:
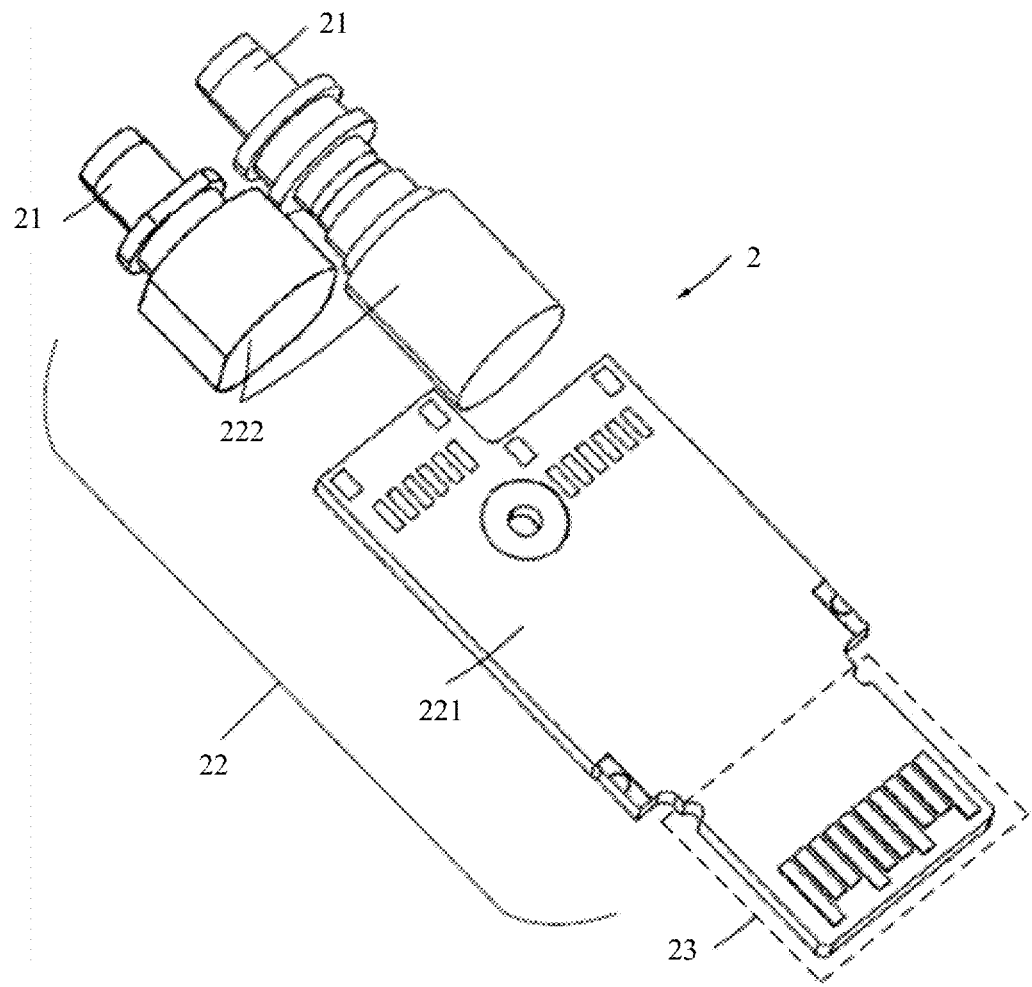
FIG. 7 is a schematic diagram of a structure of an optical component of an optical module according to this application.

The optical component 2 may also be referred to as an optoelectronic component. As shown in FIG. 7, the optical component 2 may include a first optical connector 21, an optical-to-electrical conversion component 22, and a second optical connector 23. One end of the optical-to-electrical conversion component 22 is connected to the first optical connector 21, and the other end is connected to the second optical connector 23. A connection between the first optical connector 21 or the second optical connector 23 and the optical-to-electrical conversion component 22 may include a physical connection and an electrical connection.

The first optical connector 21 is an optical fiber connector, and is configured to connect to an optical fiber connector of a composite cable, to implement optical signal transmission. The second optical connector 23 is an electrical connector, and is configured to implement an electrical connection to an electrical interface in an optical cage of a communication device, to implement electrical signal transmission.

In order to distinguish from two electrical connectors of the power supply component 3, the electrical connector at the second end of the optical module is referred to as the second optical connector 23 in this specification. However, the second optical connector 23 is actually an electrical connector rather than an optical fiber connector.

As shown in FIG. 7, the optical-to-electrical conversion component 22 includes a first rigid circuit board 221 and a conversion component 222. The conversion component 222 includes components required for implementing an optical-to-electrical conversion function, for example, may include components such as a laser, a detector, an amplifier, a clock data recovery apparatus, a driver chip, and a signal processor. One end of the first rigid circuit board 221 is connected to the conversion component 222, and a surface of the other end of the first rigid circuit board 221 has an edge connector, where the edge connector forms a conductive part of the second optical connector 23. One end, away from the first rigid circuit board 221, of the conversion component 222 is connected to the first optical connector 21, so as to transmit a converted optical signal to a composite cable through the first optical connector 21.

Figure 8:
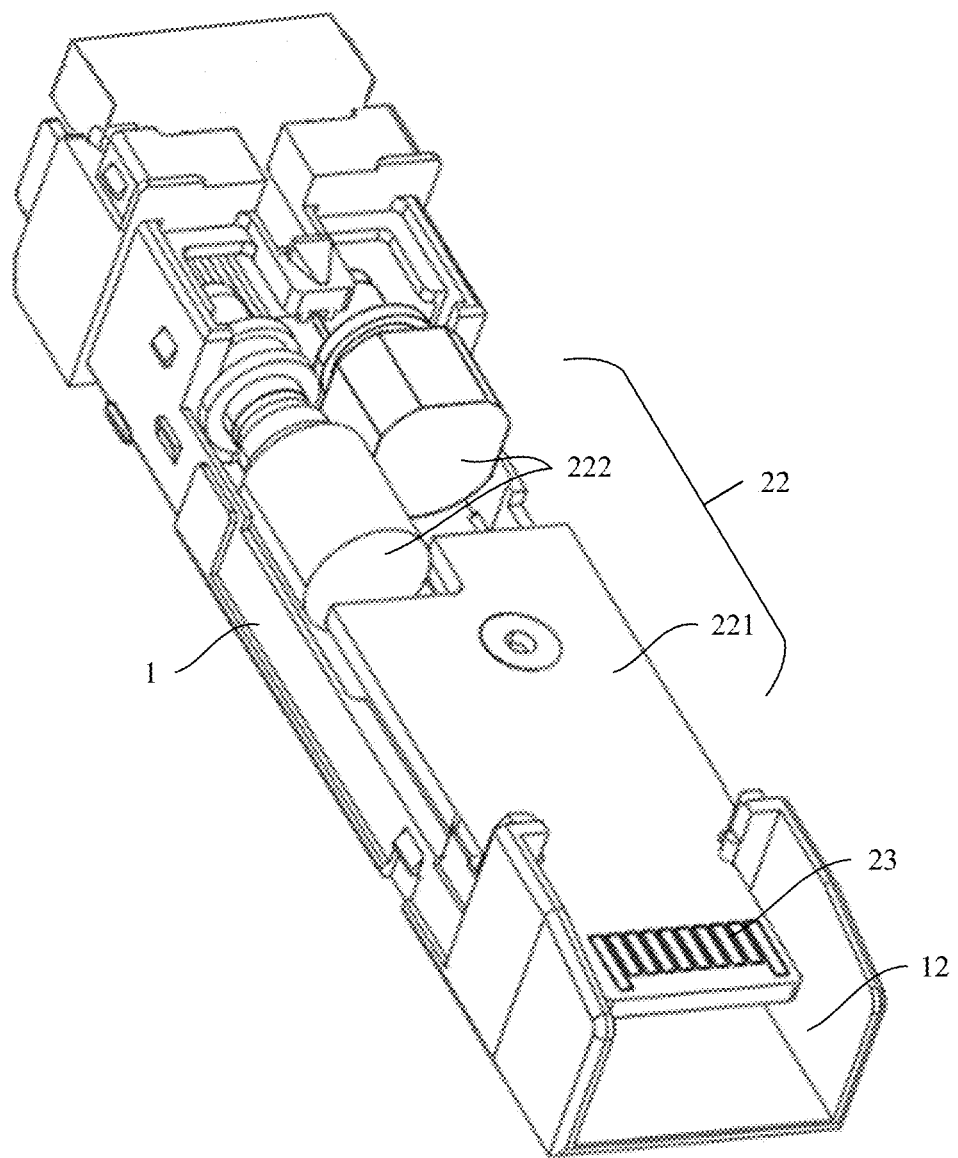
FIG. 8 is a schematic diagram of a structure of an optical component of an optical module in a housing according to this application.

An assembly relationship between the optical component 2 and the housing 1 may be shown in FIG. 8. Both the first rigid circuit board 221 and the conversion component 222 of the optical-to-electrical conversion component 22 are located in the housing 1, and one end that is of the first rigid circuit board 221 and that is away from the conversion component 222 is located in the second socket 12, so that an edge connector on a surface of the end that is of the first rigid circuit board 221 and that is away from the conversion component 222 is located in the second socket 12. In this way, the second optical connector 23 is located in the second socket 12. The first optical connector 21 connected to the conversion component 222 is located in the first socket 11 of the housing 1, as shown in FIG. 1.

The optical module may be a dual-fiber bi-directional optical module. Correspondingly, as shown in FIG. 7, there are two first optical connectors 21, one is used as a transmit end, and the other is used as a receive end. A connection structure between the optical component 2 and the circuit board in FIG. 7 is not shown. The optical module may alternatively be a single-fiber bi-directional optical module. Correspondingly, there is one first optical connector 21, which serves as both a transmit end and a receive end. This embodiment does not limit whether the optical module is specifically a dual-fiber bi-directional module or a single-fiber bi-directional module, and the dual-fiber bi-directional module is used as an example in the accompanying drawings.

(3) The Power Supply Component 3

The power supply component 3 is configured to implement power transmission in power over Ethernet. As shown in FIG. 5, the power supply component 3 includes a first electrical connector 31, a power supply line 32, and a second electrical connector 33. One end of the power supply line 32 is connected to the first electrical connector 31, and the other end of the power supply line 32 is connected to the second electrical connector 33.

The first electrical connector 31 and the second electrical connector 33 are both electrical connectors. The first electrical connector 31 is electrically connected to a power connector of a composite cable, and the second electrical connector 33 is electrically connected to a power connector in an optical cage of a communication device.

Figure 9:
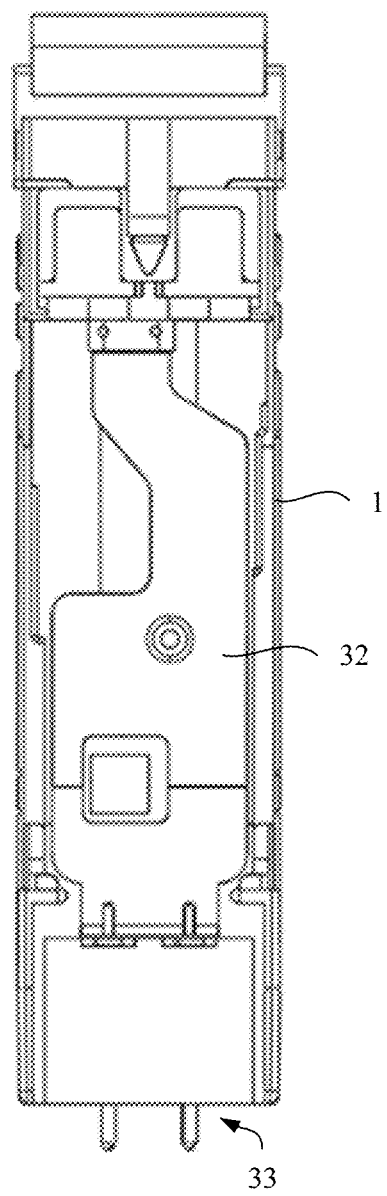
FIG. 9 is a schematic diagram of a structure of a power supply component of an optical module in a housing according to this application.

An assembly relationship between the power supply component 3 and the housing 1 may be as follows: As shown in FIG. 9, the power supply line 32 is located in the housing 1, the first electrical connector 31 is located at the first socket 11, and the second electrical connector 33 is located at the second socket 12. The first electrical connector 31 is located at the first socket 11. For example, as shown in FIG. 1, the first electrical connector 31 may be located in the first socket 11. For another example, the first electrical connector 31 may alternatively be located around the first socket 11. Details are described below.

After the power supply component 3 is mounted in the housing 1, the first electrical connector 31 may not affect a structural feature of the first socket 11 at the first end of the optical module. In this way, although the power supply component 3 is additionally disposed in the optical module, the first socket 11 at the first end of the housing 1 can still be configured to insert an optical cable. The second electrical connector 33 may not affect a structural feature of the second socket 12 at the second end of the optical module. In this way, the second socket 12 at the second end of the housing 1 can still be inserted into an optical cage that does not include a power connector.

In this way, both ends of the optical module are compatible. Therefore, an optical cable that does not include a power connector can even still be inserted into the first socket 11 of the optical module, and is connected to the first optical connector 21 in the first socket 11. Even if the optical cage does not include a power connector, the second socket 12 of the optical module can still be inserted into the optical cage, and is electrically connected to an electrical connector in the optical cage.

It can be learned from the foregoing that the optical module is integrated with the power supply component 3, so that after the optical module is inserted into a communication device, not only an optical fiber connection can be implemented, but also power transmission can be implemented. Therefore, a panel of the communication device into which the optical module is inserted needs to have only a port that matches the optical module, and no power port for implementing power transmission needs to be additionally disposed. This further can reduce a size of the panel of the communication device and facilitate miniaturization development of the communication device.

It should be noted that, unless otherwise specified in the following, the optical fiber connector of the composite cable or the optical cable is an optical fiber connector that matches the first optical connector 21 of the optical module, so that the optical fiber connector of the composite cable or the optical cable can be connected to the first optical connector 21. Similarly, the electrical interface of the optical cage of the communication device is an electrical interface that matches the second optical connector 23 (the second optical connector 23 is an electrical connector) of the optical module, so that the first optical connector 21 can be inserted into the electrical interface of the optical cage to implement transmission of an electrical signal.

In this application, the power supply component 3 is additionally disposed based on a common optical module (which may also be referred to as a conventional optical module). The following sequentially describes structures of the first electrical connector 31, the power supply line 32, and the second electrical connector 33 of the power supply component 3, and positions of the first electrical connector 31, the power supply line 32, and the second electrical connector 33 in the housing 1.

(I) The First Electrical Connector 31 of the Power Supply Component 3

To implement compatibility of the first socket 11, positions of the first electrical connector 31 and the first optical connector 21 are independent of each other, so that the first electrical connector 31 does not affect the first optical connector 21.

In this case, position distribution of the first electrical connector 31 may be as follows.

A first electrical connector conductive part 311 of the first electrical connector 31 is exposed from the housing 1 and is located at any position at the first end of the housing 1. Positions of the first optical connector 21 and the first electrical connector 31 are independent of each other, so that the first socket 11 is compatible.

Figure 10:
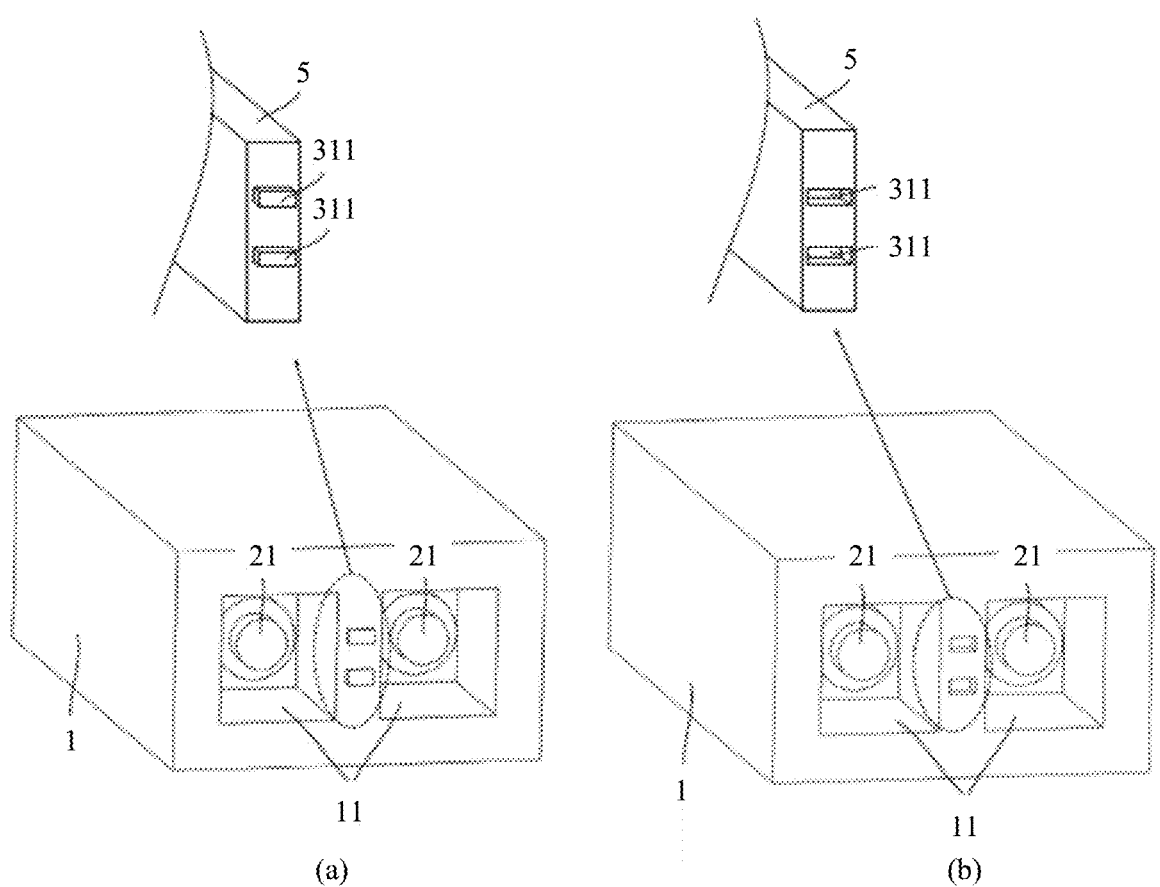
FIG. 10 is a schematic diagram of a structure of a position of a first electrical connector conductive part of an optical module according to this application.
Figure 11:
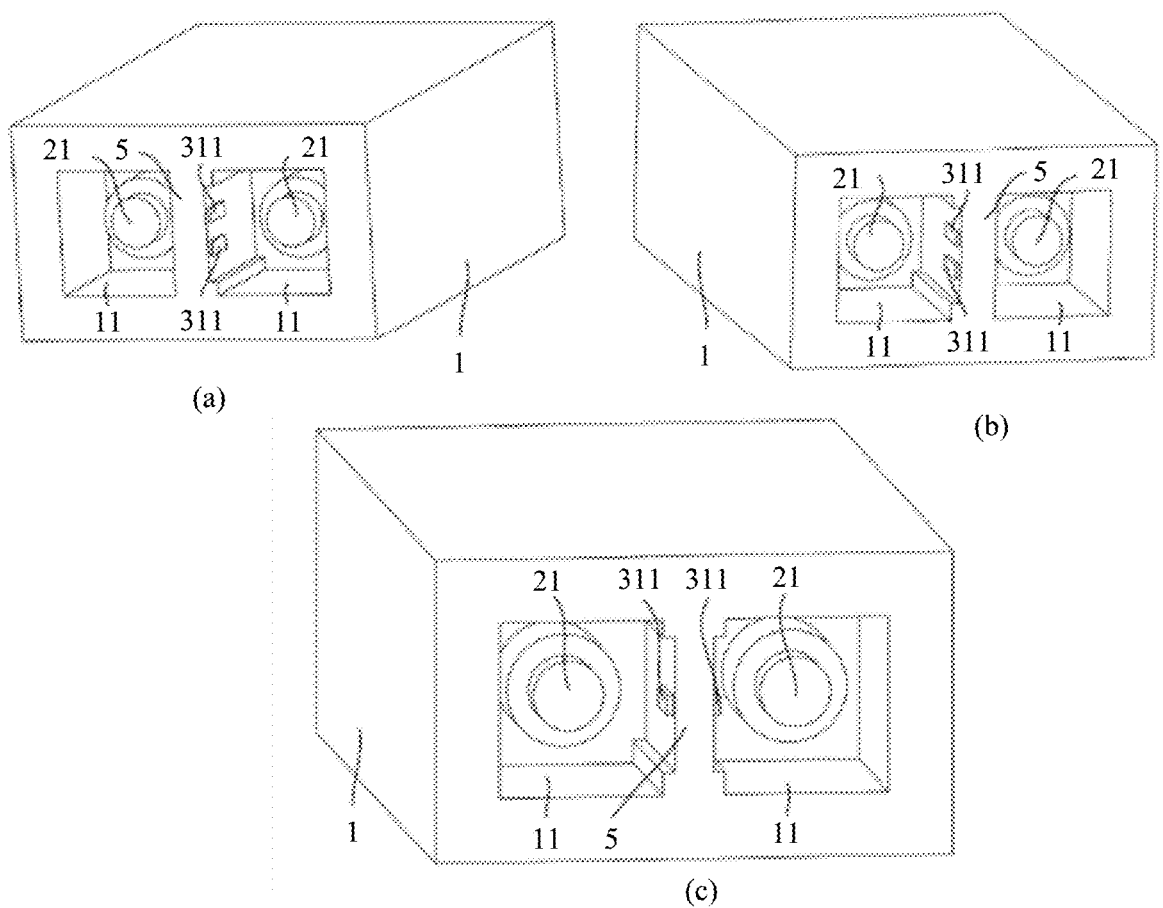
FIG. 11 is a schematic diagram of a structure of a position of a first electrical connector conductive part of an optical module according to this application.

(1) As shown in FIG. 10 and FIG. 11, the first electrical connector conductive part 311 of the first electrical connector 31 is fastened to a center pillar 5 of the optical module.

A feature of the center pillar 5 is described in detail in the following when the first electrical connector conductive part 311 of the first electrical connector 31 is described. Both the center pillar 5 and the first optical connector 21 are located in the first socket 11. For example, as shown in FIG. 10, there are two first optical connectors 21, and the optical module is an optical module with dual optical connectors. In this case, both the center pillar 5 and the two first optical connectors 21 are located in the first socket 11, the center pillar 5 is located between the two first optical connectors 21, and the center pillar 5 divides the first socket 11 into two sub-sockets.

A solution in which the first electrical connector conductive part 311 is fastened to the center pillar 5 may further include the following several possible cases.

As shown in FIG. 10, an end part of the first electrical connector conductive part 311 is located on an outer end face of the center pillar 5. For example, for the first electrical connector conductive part 311, the end part of the first electrical connector conductive part 311 is flush with the outer end face of the center pillar 5. For another example, as shown in (b) in FIG. 10, the outer end face of the center pillar 5 has a groove, the first electrical connector conductive part 311 is located in the groove, and the outer end face of the first electrical connector conductive part 311 is lower than the outer end face of the center pillar 5.

For another example, a length of the center pillar 5 is less than a standard length. As shown in (a) in FIG. 10, the first electrical connector conductive part 311 is a column-shaped structure, and the end part of the first electrical connector conductive part 311 extends out of the outer end face of the center pillar 5. A sum of a length of a part that is of the first electrical connector conductive part 311 and that extends out of the center pillar 5 and a length of the center pillar 5 is less than or equal to the standard length. The standard length is a length of the center pillar 5 obtained when the optical module is packaged based on a standard packaging type, or a conventional length of a center pillar of an optical module that does not include the power supply component 3.

In this way, although the first electrical connector conductive part 311 extends out of the outer end face of the center pillar 5, the first electrical connector conductive part 311 does not block insertion of an optical cable that does not include a power connector into the first socket 11, so that when an optical fiber connector of the optical cable is inserted, it is avoided that the optical fiber connector fails to be connected to the first optical connector 21 due to touching the first electrical connector conductive part 311 first, and the first socket 11 is compatible.

As shown in FIG. 11, the first electrical connector conductive part 311 is located on an inner wall surface of the center pillar 5. For example, as shown in (a) and (b) in FIG. 11, two first electrical connector conductive parts 311 are located on a same inner wall surface of the center pillar 5. For another example, as shown in (c) in FIG. 11, one first electrical connector conductive part 311 is located on one inner wall surface of the center pillar 5, and the other first electrical connector conductive part 311 is located on the other inner wall surface of the center pillar 5.

An outer surface of the first electrical connector conductive part 311 may be higher than the inner wall surface of the center pillar 5, and the outer surface of the first electrical connector conductive part 311 may alternatively be lower than the inner wall surface of the center pillar 5. For example, as shown in (c) in FIG. 11, an inner wall of the center pillar 5 has a groove, and the first electrical connector conductive part 311 is located in the groove, so that the outer surface of the first electrical connector conductive part 311 is lower than the inner wall surface of the center pillar 5. The outer surface of the first electrical connector conductive part 311 may alternatively be flush with the inner wall surface of the center pillar 5. This is not limited in this application, provided that an optical cable that does not include a power connector can be inserted into the first socket 11 and is connected to the first optical connector 21.

Figure 12:
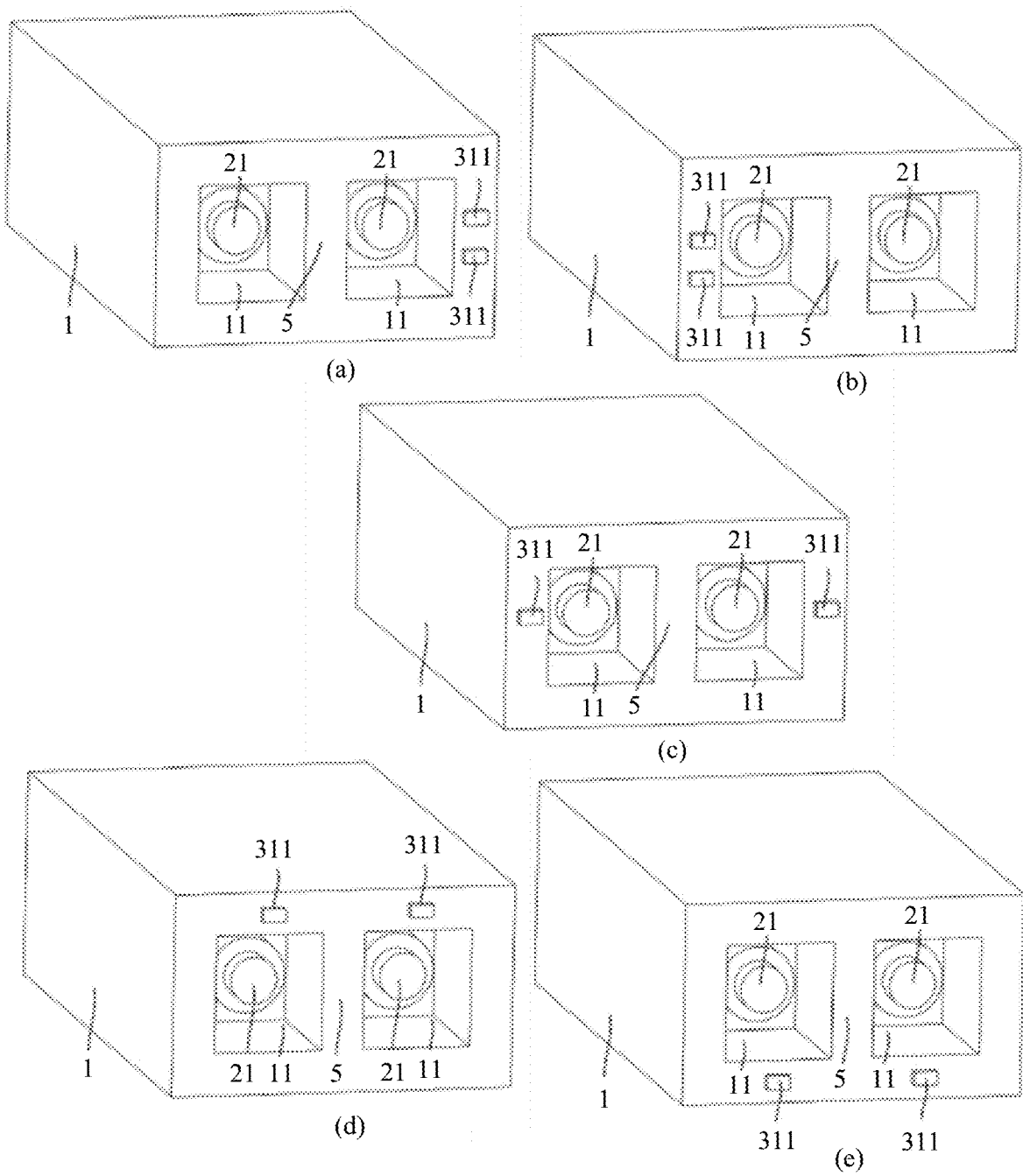
FIG. 12 is a schematic diagram of a structure of a position of a first electrical connector conductive part of an optical module according to this application.
Figure 13:
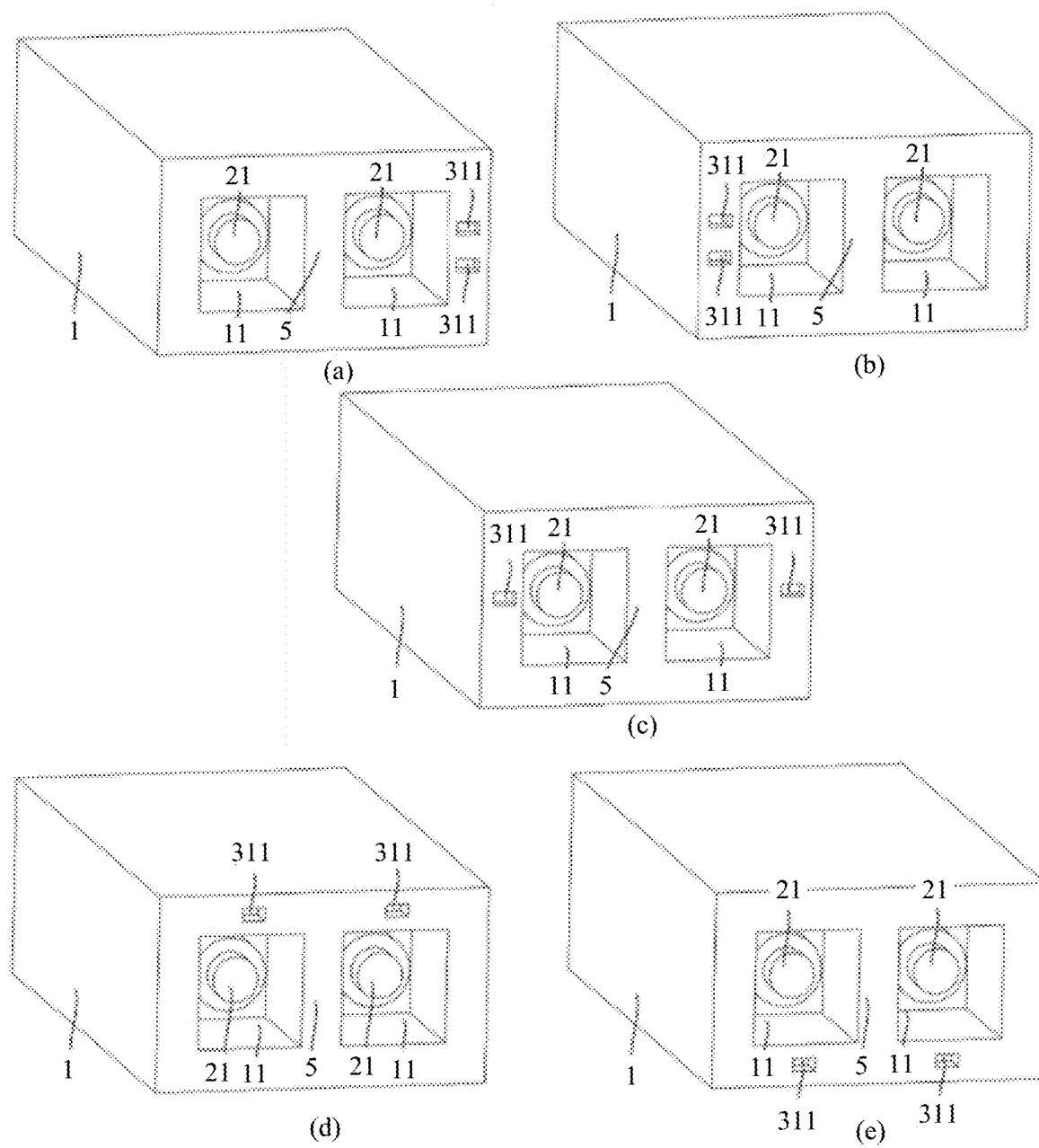
FIG. 13 is a schematic diagram of a structure of a position of a first electrical connector conductive part of an optical module according to this application.
Figure 14:
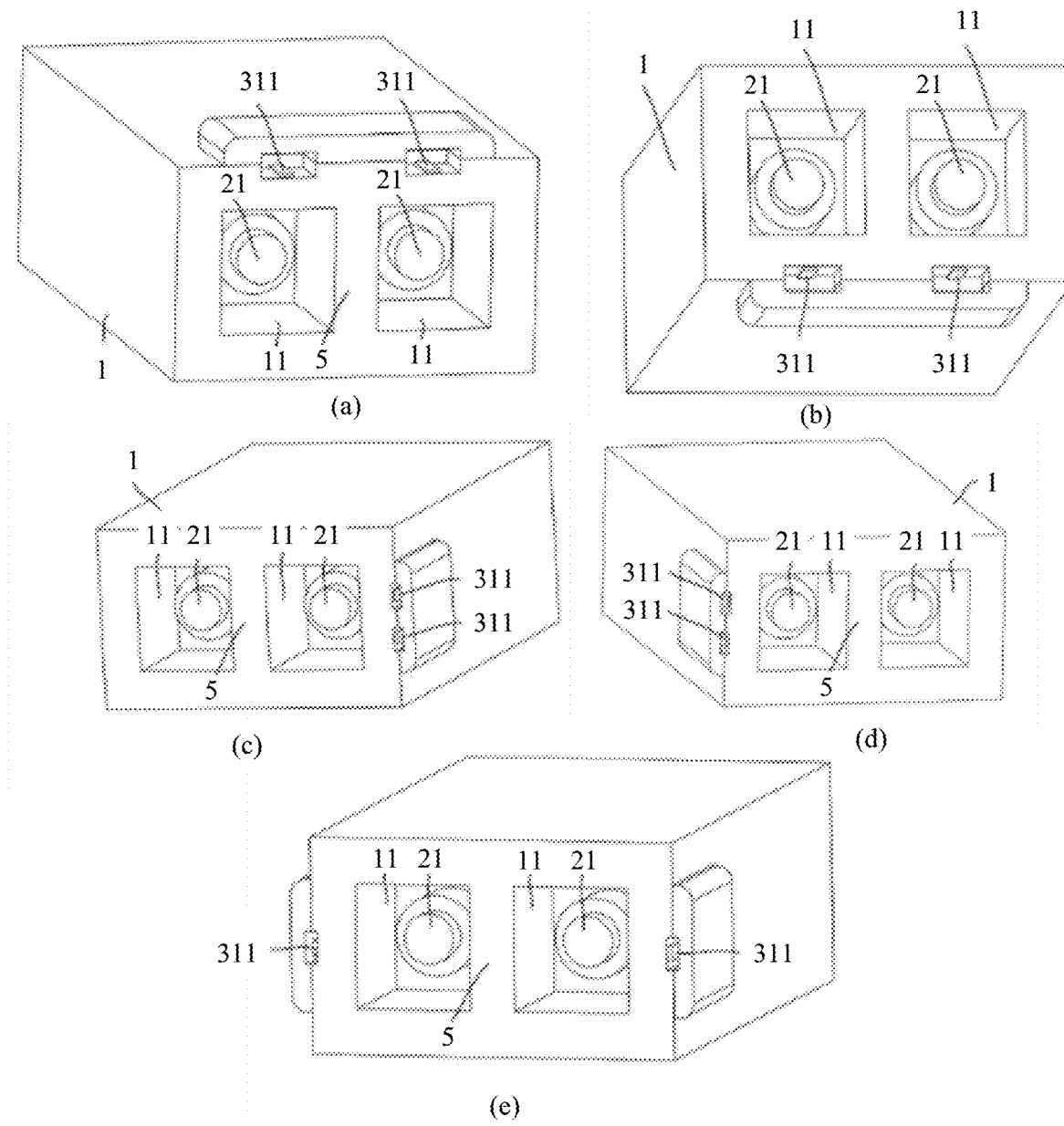
FIG. 14 is a schematic diagram of a structure of a power supply component of an optical module in a housing according to this application.

(2) As shown in FIG. 12 to FIG. 14, the first electrical connector conductive part 311 of the first electrical connector 31 is fastened to an end face of a first end of the housing 1.

An outer surface of the first electrical connector conductive part 311 may be flush with an outer end face of the first end of the housing 1. As shown in FIG. 12, the outer surface of the first electrical connector conductive part 311 may alternatively protrude from the outer end face of the first end of the housing 1. As shown in FIG. 13, the outer surface of the first electrical connector conductive part 311 may alternatively recess on the outer end face of the first end of the housing 1. In a case in which the outer surface of the first electrical connector conductive part 311 recess on the outer end face of the first end of the housing 1, the outer end face of the first end of the housing 1 has a groove, and the first electrical connector conductive part 311 is located in the groove. For example, an end part of the first electrical connector conductive part 311 is lower than an opening of the groove.

The first electrical connector conductive part 311 may be in a shape of a cylinder, a rectangular column, or the like. This is not limited in this application.

In an example, a solution in which the first electrical connector conductive part 311 is fastened to the end face of the first end of the housing 1 may further include the following several possible cases.

For example, as shown in FIG. 12 and FIG. 13, the two first electrical connector conductive parts 311 may be located on an outer end face of a same sidewall of the first socket 11. For example, the two first electrical connector conductive parts 311 are located on an outer end face of a left sidewall or an outer end face of a right sidewall of the first socket 11, or the two first electrical connector conductive parts 311 are located on an outer end face of a top wall or an outer end face of a bottom wall of the first socket 11. For another example, as shown in FIG. 12 and FIG. 13, two first electrical connector conductive parts 311 may be located on outer end faces of different sidewalls of the first socket 11. For example, one first electrical connector conductive part 311 is located on an outer end face of a left sidewall, and the other first electrical connector conductive part 311 is located on an outer end face of a right sidewall.

For another example, as shown in FIG. 14, the first electrical connector conductive part 311 is located at an outer edge of the first end of the housing 1, the outer edge of the first end of the housing 1 has a boss structure, a groove is provided at a joint between the boss structure and the outer edge of the first end of the housing 1, and the first electrical connector conductive part 311 is located in the groove.

Figure 15:
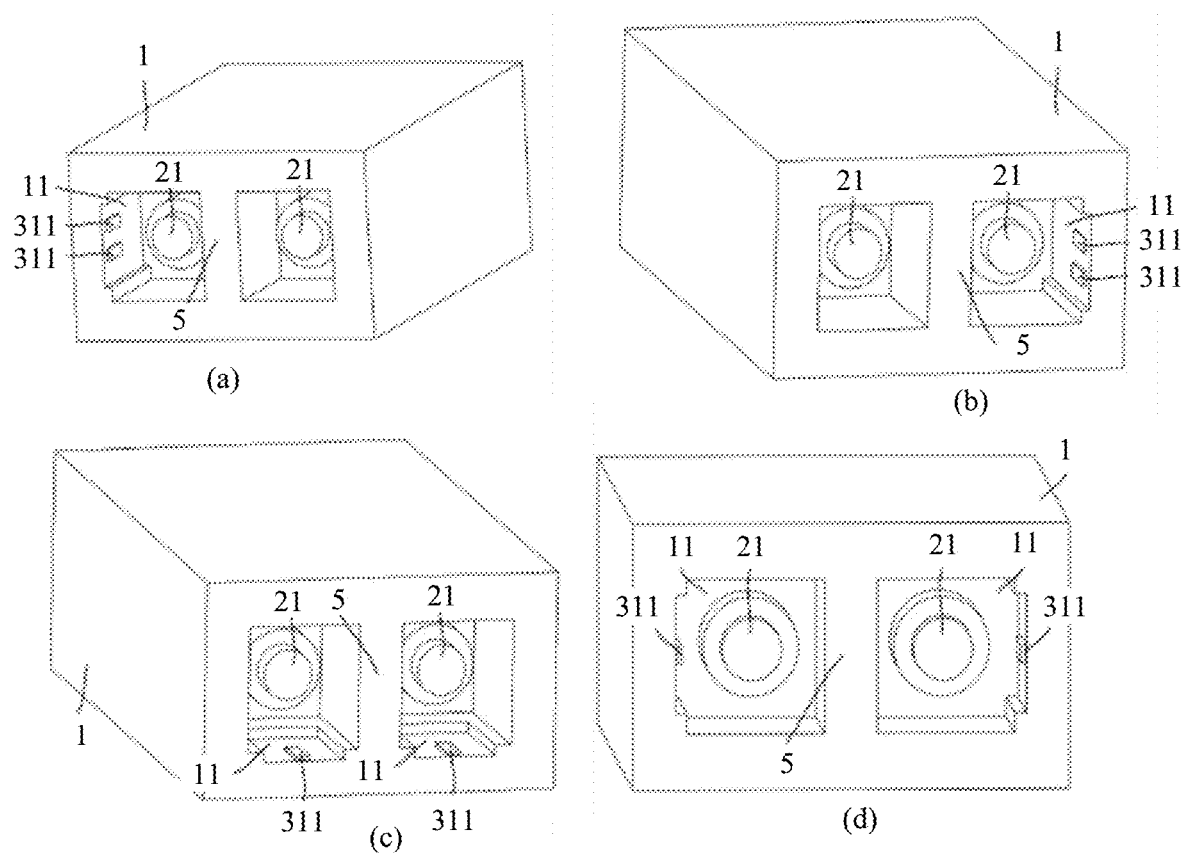
FIG. 15 is a schematic diagram of a structure of a position of a first electrical connector conductive part of an optical module according to this application.

(3) As shown in FIG. 15, the first electrical connector conductive part 311 of the first electrical connector 31 is located on an inner wall of the first socket 11.

For example, as shown in (a), (b), and (c) in FIG. 15, the two first electrical connector conductive parts 311 are located on a same inner wall of the first socket 11. For another example, as shown in (d) in FIG. 15, one first electrical connector conductive part 311 is located on one inner wall of the first socket 11, and the other first electrical connector conductive part 311 is located on the other inner wall of the first socket 11. For example, the center pillar 5 is located in the first socket 11 for dividing the first socket 11 into two left and right sub-sockets. As shown in (d) in FIG. 15, one first electrical connector conductive part 311 is located on an inner wall of one sub-socket, and the other first electrical connector conductive part 311 is located on an inner wall of the other sub-socket.

An outer surface of the first electrical connector conductive part 311 may be higher than the inner wall of the first socket 11. The outer surface of the first electrical connector conductive part 311 may alternatively be lower than the inner wall of the first socket 11. For example, as shown in (c) in FIG. 15, the inner wall of the center pillar 5 has a groove, and the first electrical connector conductive part 311 is located in the groove, so that the outer surface of the first electrical connector conductive part 311 is lower than the inner wall surface of the first socket 11. The outer surface of the first electrical connector conductive part 311 may alternatively be flush with the inner wall of the first socket 11. This is not limited in this application, provided that an optical cable that does not include a power connector can be inserted into the first socket 11 and is connected to the first optical connector 21.

Figure 16:
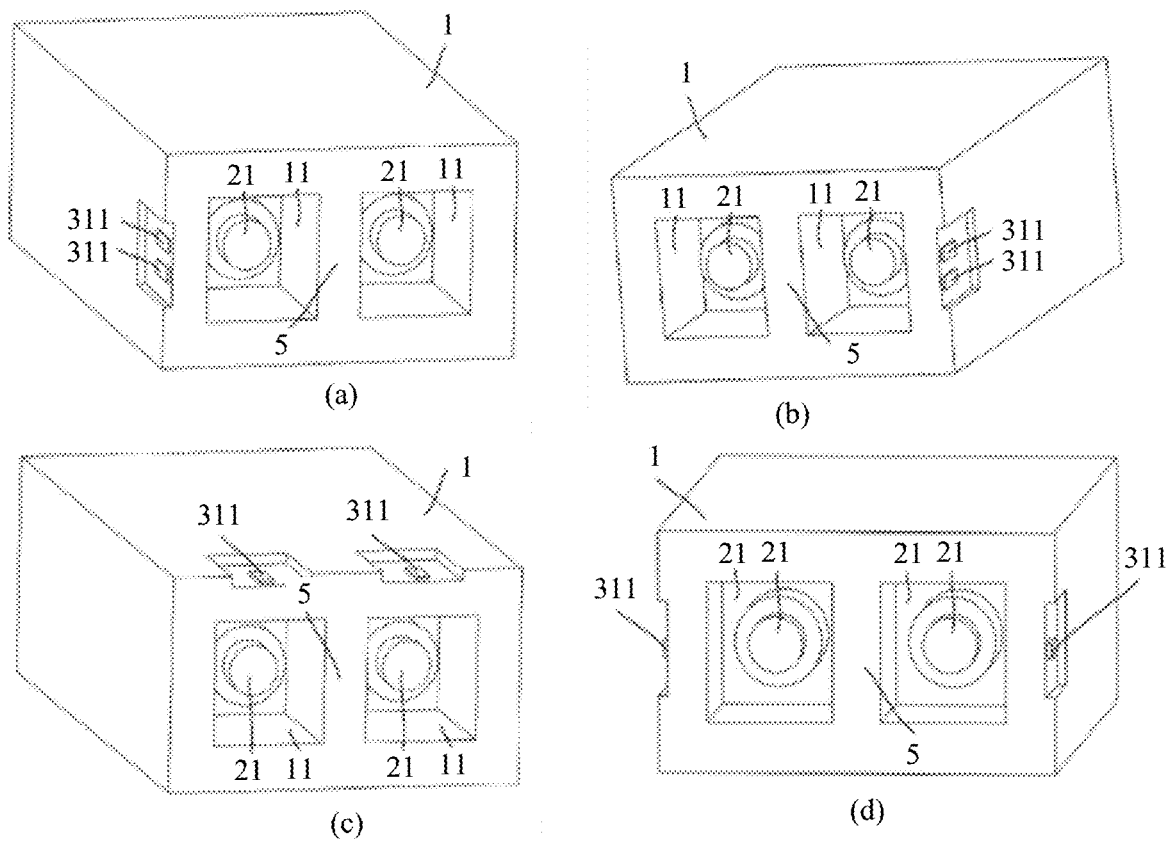
FIG. 16 is a schematic diagram of a structure of a position of a first electrical connector conductive part of an optical module according to this application.
Figure 17:
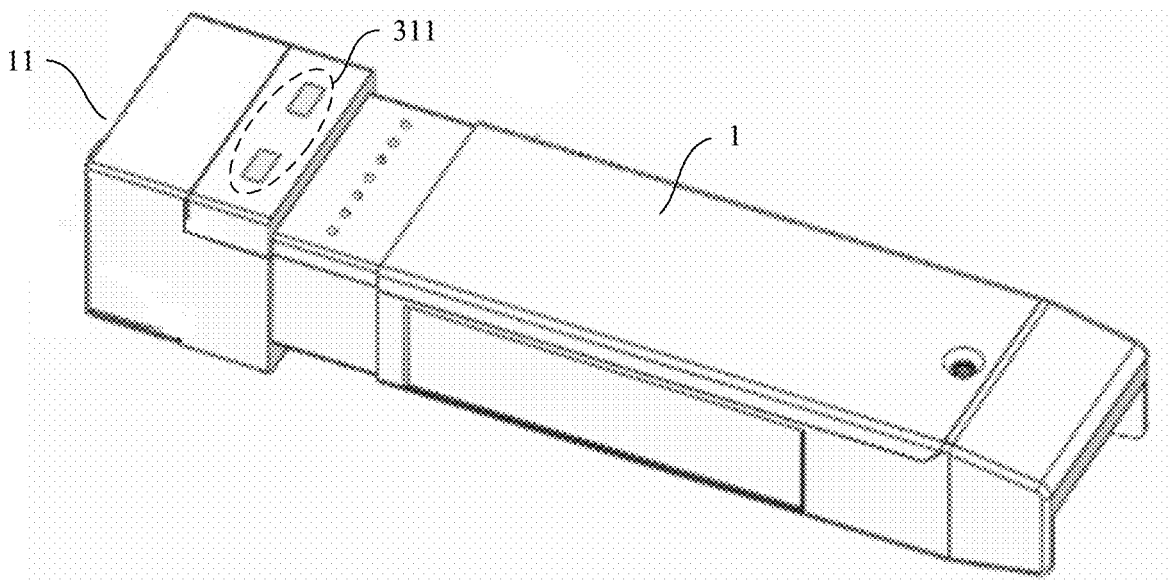
FIG. 17 is a schematic diagram of a structure of a position of a first electrical connector conductive part of an optical module according to this application.

(4) As shown in FIG. 16 and FIG. 17, the first electrical connector conductive part 311 of the first electrical connector 31 is located on an outer wall that is of the housing 1 and that is close to the first socket 11. The outer wall may be an outer surface of a top wall, an outer surface of a bottom wall, or an outer surface of a sidewall.

As shown in FIG. 16, the outer wall that is of the housing 1 and that is close to the first socket 11 may have a groove, and the first electrical connector conductive part 311 may be located in the groove.

For example, as shown in (a), (b), and (c) in FIG. 16, and as shown in FIG. 17, the two first electrical connector conductive parts 311 are located on a same outer wall. For another example, as shown in (d) in FIG. 16, one first electrical connector conductive part 311 is located on an outer wall, and the other first electrical connector conductive part 311 is located on another outer wall.

The position distribution of the first electrical connector conductive part 311 may be applied to an optical module with dual optical connectors, or may be applied to an optical module with a single optical connector. Although the optical module with dual optical connectors is used as an example in the figure, this is not limited, and may also be applied to an optical module with a single optical connector.

Figure 18:
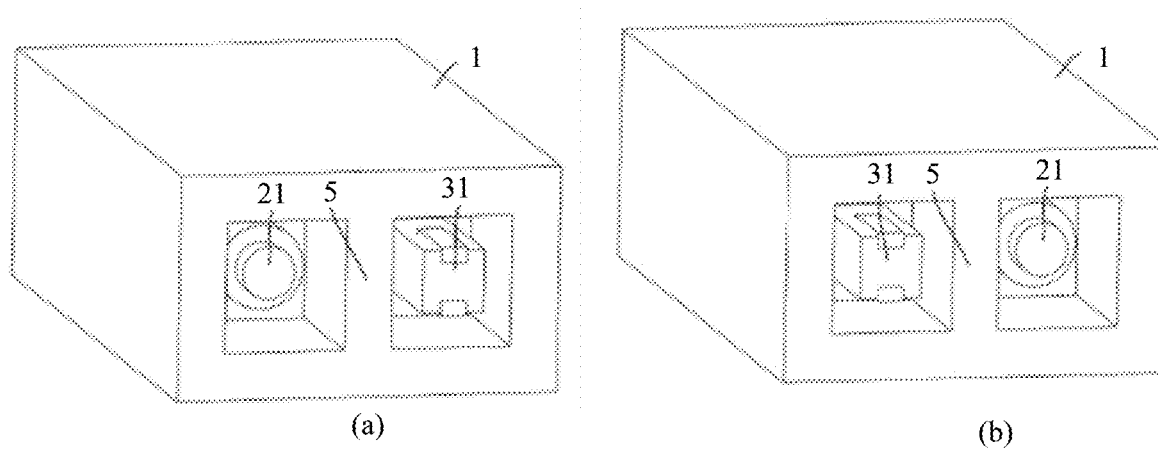
FIG. 18 is a schematic diagram of a structure of a position of a first electrical connector conductive part of an optical module according to this application.
Figure 19:
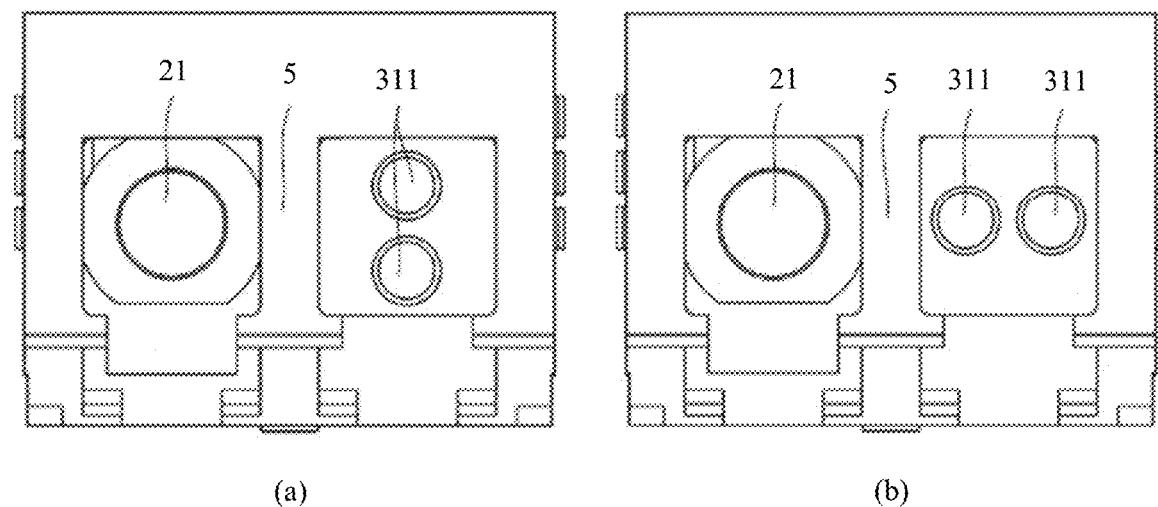
FIG. 19 is a schematic diagram of a structure of a position of a first electrical connector conductive part of an optical module according to this application.

In addition, for an optical module with a single optical connector, the first electrical connector 31 of the optical module may alternatively be distributed in the following manner: As shown in FIG. 18 and FIG. 19, there is one first optical connector 21; the first optical connector 21 is located on a first side of the center pillar 5 of the optical module, the first electrical connector 31 is located on a second side of the center pillar 5, and the first side and the second side of the center pillar 5 are opposite.

In an example, as shown in FIG. 18, the first electrical connector 31 may be in a column-shaped structure, and is located on a second side of the center pillar 5. The first electrical connector 31 includes a column body and a first electrical connector conductive part 311, and the first electrical connector conductive part 311 is located on a surface of the column body.

In another example, as shown in FIG. 19, the first electrical connector conductive part 311 may be on the second side of the center pillar 5 and is located on an outer end face of the first end of the housing 1. For example, the first electrical connector conductive part 311 is an outer end face that protrudes from the first end of the housing 1. For another example, the first electrical connector conductive part 311 recesses on an outer end face of the first end of the housing 1. The first electrical connector conductive part 311 may be in a shape of a rectangular column, a cylinder, or the like. The two first electrical connector conductive parts 311 may be arranged from top to bottom, or may be arranged from left to right.

The foregoing is about the position distribution of the first electrical connector conductive part 311 and the specific shape of the first electrical connector conductive part 311. Regardless of how the first electrical connector conductive part 311 is distributed or what the specific shape of the first electrical connector conductive part 311 is, after the first electrical connector conductive part 311 is disposed in the first socket 11 or around the first socket 11, positions of the first electrical connector conductive part 311 and the first optical connector 21 are independent of each other, and the first electrical connector conductive part 311 does not affect a connection between an optical fiber connector of an optical cable and the first optical connector 21.

In this way, for a composite cable that includes a power connector and that matches the first electrical connector conductive part 311, after the composite cable is inserted into the first socket 11, an optical fiber connector of the composite cable is connected to the first optical connector 21 in the first socket 11, to implement optical signal transmission. The power connector of the composite cable is electrically connected to the first electrical connector conductive part 311, to implement power transmission.

In addition, for an optical cable that does not include a power connector, because the first electrical connector conductive part 311 does not block insertion of an optical fiber connector of the optical cable, the optical fiber connector of the optical cable can be connected to the first optical connector 21, so as to implement optical signal transmission.

It can be learned that the first end of the optical module has both the first optical connector 21 and the first electrical connector 31. Therefore, it is unnecessary to dispose, on a panel of a communication device (such as a switch and an AP) into which the optical module is inserted, a power interface configured to insert a power connector of a composite cable. This reduces a size of the panel of the communication device and facilitates miniaturization development of the communication device.

In addition, the first socket 11 at the first end of the optical module can be configured to insert the composite cable that includes the power connector and that matches the first electrical connector conductive part 311, and the optical cable that does not include the power connector, so that the first socket 11 of the optical module is compatible, an application scenario of the optical module is expanded, use flexibility of the optical module is improved, and it is easy for cable onsite preparation.

The foregoing is about the position distribution of the first electrical connector 31. The following describes a structural form of the first electrical connector 31.

The first electrical connector conductive part 311 of the first electrical connector 31 includes a bent strip, for example, includes two bent strips. For details, refer to the following.

The first electrical connector 31 and the first optical connector 21 are independent of each other in position and are located in the first socket 11, so that the first socket 11 is compatible, and can be configured to insert any cable that matches the packaging type of the optical module. In this way, the composite cable that includes the power connector can be inserted into the first socket 11, and the optical cable that does not include the power connector can also be inserted into the first socket 11. The composite cable that includes the power connector includes a power connector that matches the first electrical connector 31 at an end part of the composite cable; and the optical cable that does not include the power connector includes no power connector at an end part of the composite cable, and includes only an optical fiber connector.

Figure 20:
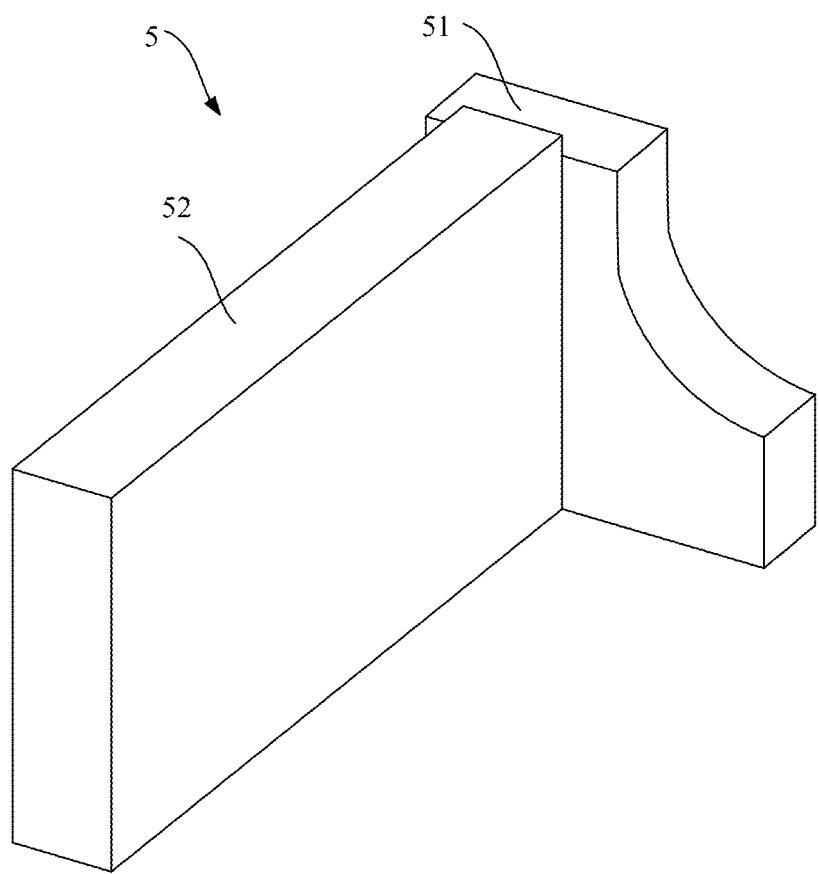
FIG. 20 is a schematic diagram of a structure of a center pillar of an optical module according to this application.
Figure 21:
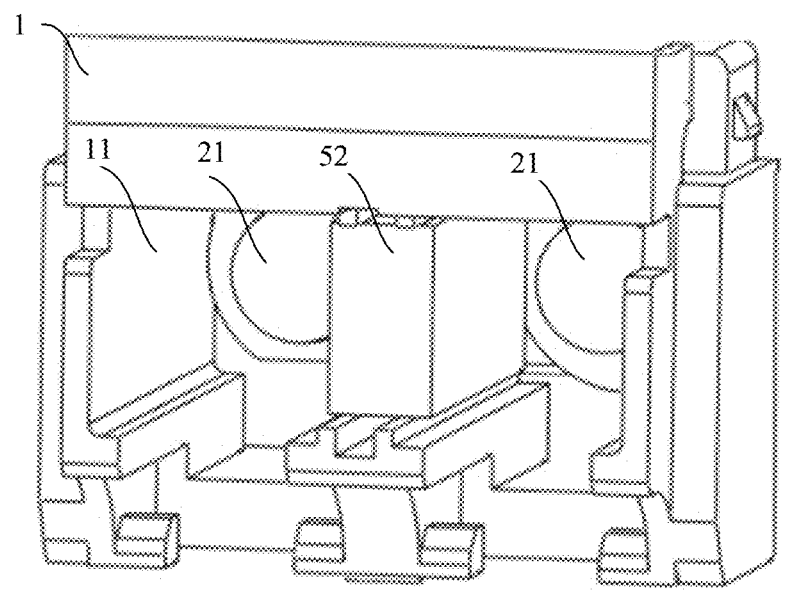
FIG. 21 is a schematic diagram of a structure at a first end of an optical module according to this application.

As described above, the optical module includes the center pillar 5. FIG. 20 is a schematic diagram of the center pillar 5. As shown in FIG. 21, the center pillar 5 is located in the first socket 11, and is used to support the first optical connector 21, and further implement a guiding and limiting function, so that an optical fiber connector of a composite cable is accurately inserted into the first socket 11 and is connected to the first optical connector 21 in the first socket 11, to implement optical signal transmission.

The center pillar 5 is a structure included in an optical module of a standard packaging type. Therefore, for an optical module that does not include the power supply component 3, the center pillar 5 is alternatively mounted in the first socket 11 of the optical module.

As shown in FIG. 20, the center pillar 5 includes a support plate 51 and a guiding and limiting plate 52, and an end part of the guiding and limiting plate 52 in a length direction is connected to a surface of the support plate 51. As shown in FIG. 21, the center pillar 5 is located in the housing 1 and close to a first end, the support plate 51 is close to the inside of the housing 1, and the guiding and limiting plate 52 is close to the outside of the housing 1. In this way, the support plate 51 and a sidewall of the housing 1 enclose the first socket 11, and the guiding and limiting plate 52 divides the first socket 11 into two sub-sockets. For an optical module with dual optical connectors, there are two first optical connectors 21, one first optical connector 21 is located on one side of the guiding and limiting plate 52, and the other first optical connector 21 is located on the other side of the guiding and limiting plate 52. The two first optical connectors 21 are both located on the support plate 51, and the support plate 51 supports the two first optical connectors 21 in the first socket 11.

The support plate 51 is horizontally disposed in the housing 1, and may also be referred to as a beam.

Figure 22:
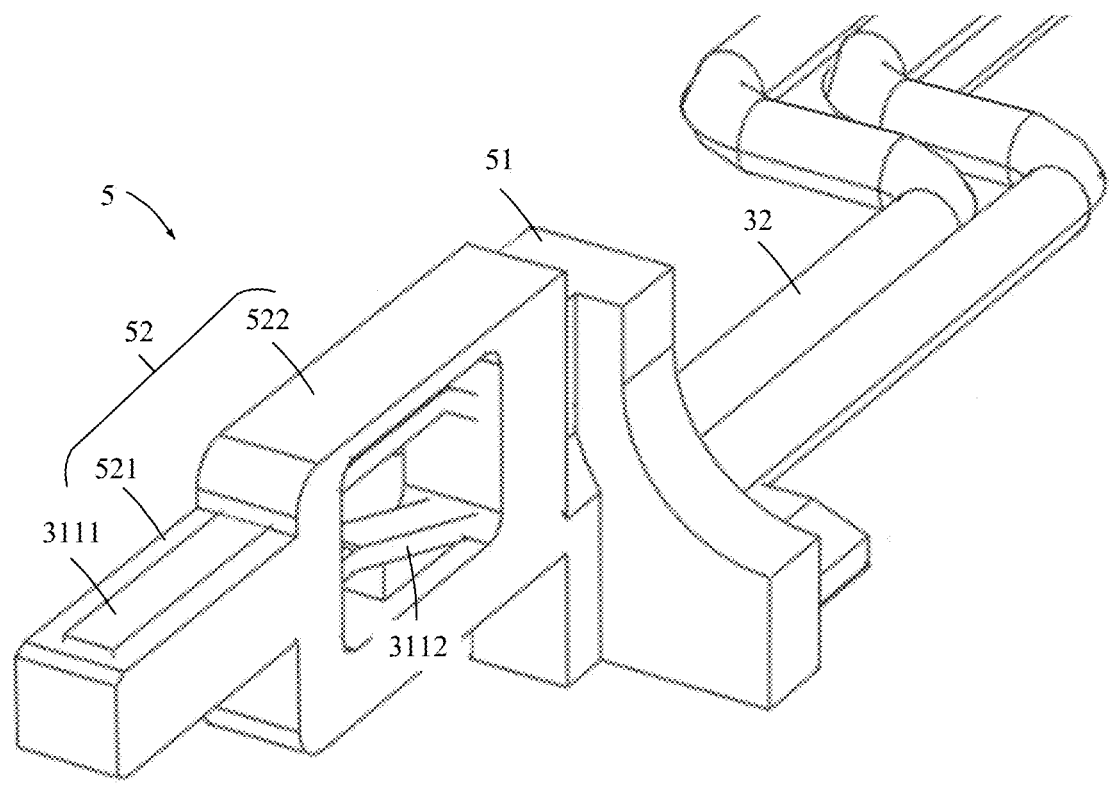
FIG. 22 is a schematic diagram of a structure of a first electrical connector conductive part in a center pillar according to this application.

To implement compatibility of the first socket 11, correspondingly, as shown in FIG. 22, the first electrical connector conductive part 311 of the first electrical connector 31 may be fastened to the center pillar 5, without affecting the first socket 11. For example, a size and a position of the first socket 11 are not affected, so that the first socket 11 is compatible.

For example, one part of the first electrical connector conductive part 311 is fastened to the guiding and limiting plate 52, and the other part of the first electrical connector conductive part 311 is fastened to the support plate 51. A first end of the first electrical connector conductive part 311 may be located on a surface of the guiding and limiting plate 52, or may extend out of an outer end face of the guiding and limiting plate 52. A second end of the first electrical connector conductive part 311 may be located in the support plate 51, or may extend out of the support plate 51. The first end of the first electrical connector conductive part 311 is an end part configured to be electrically connected to a power connector of a composite cable, and the second end of the first electrical connector conductive part 311 is an end part configured to be electrically connected to the power supply line 32.

In an example, the first electrical connector conductive part 311 mounted in the center pillar 5 can meet a requirement that a current passing through is greater than or equal to a target current value, and can meet a specified safety range under a target voltage.

The target current value may be set based on an actual situation. For example, the target current value may be 2 A, or may be a current value greater than 2 A, which is not limited in this embodiment.

The target voltage may also be set based on an actual situation. For example, the target voltage may be 48 V. Each voltage usually corresponds to a specified safety range. For example, a specified safety range corresponding to 48 V may be 2 millimeters.

Because a value of a current passing through the first electrical connector conductive part 311 is related to a voltage applied to the first electrical connector conductive part 311 and a resistance of the first electrical connector conductive part 311, and the resistance of the first electrical connector conductive part 311 is related to a cross-sectional area of the first electrical connector conductive part 311, when a power supply voltage (for example, 48 V) is known, the cross-sectional area of the first electrical connector conductive part 311 may be adjusted, so that the first electrical connector conductive part 311 can allow a current with a value greater than or equal to the target current value to pass through.

As described above, the first electrical connector conductive part 311 includes two bent strips, which are respectively a first bent strip 3111 and a second bent strip 3112. A distance between the first bent strip 3111 and the second bent strip 3112 meets the specified safety range under the target voltage. For example, if a voltage provided for the first bent strip 3111 and the second bent strip 3112 is 48 V, a minimum spacing between the first bent strip 3111 and the second bent strip 3112 is greater than or equal to 2 millimeters.

One of the first bent strip 3111 and the second bent strip 3112 is configured to connect to a positive electrode of a power supply, and the other is configured to connect to a negative electrode of the power supply. For example, the first bent strip 3111 is configured to connect to +48 V, and the second bent strip 3112 is configured to connect to −48 V.

Figure 23:
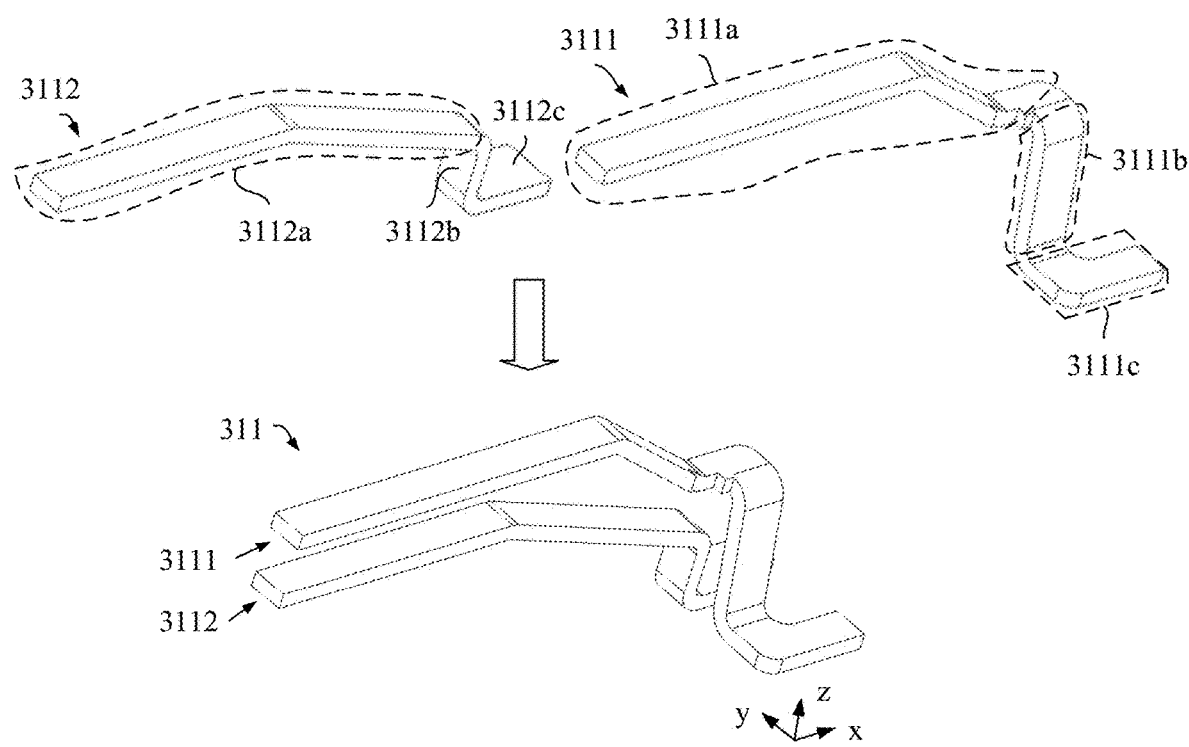
FIG. 23 is a schematic diagram of a structure of a first electrical connector conductive part of an optical module according to this application.

As shown in FIG. 23, a part of the first bent strip 3111 and a part of the second bent strip 3112 may be arranged from top to bottom, and are located in a same vertical plane. A part of the first bent strip 3111 and a part of the second bent strip 3112 may be arranged from left to right, and are located in a same horizontal plane.

For example, as shown in FIG. 23, the first bent strip 3111 includes a first segment 3111a, a second segment 3111b, and a third segment 3111c that are sequentially connected. The second bent strip 3112 includes a fourth segment 3112a, a fifth segment 3112b, and a sixth segment 3112c that are sequentially connected. As shown in FIG. 23, arrangement of the first bent strip 3111 and the second bent strip 3112 in the center pillar 5 may be that the first segment 3111a of the first bent strip 3111 and the fourth segment 3112a of the second bent strip 3112 are arranged from top to bottom, and are located in a same vertical plane, and the third segment 3111c of the first bent strip 3111 and the sixth segment 3112c of the second bent strip 3112 are arranged from left to right, and are located in a same horizontal plane. As shown in FIG. 23, the top-bottom arrangement is top-bottom arrangement in a z-axis direction, and the left-right arrangement is left-right arrangement in a y-axis direction.

The following describes a structural feature of the first bent strip 3111 and a structural feature of the second bent strip 3112.

(1) For the first bent strip 3111, as shown in FIG. 23, one end of the second segment 3111b is connected to a side part of the first segment 3111a, and the other end of the second segment 3111b is connected to a side part of the third segment 3111c. The first segment 3111a and the third segment 3111c are located on different sides of the second segment 3111b, and there is a height difference between the first segment 3111a and the third segment 3111c.

The first segment 3111a, the second segment 3111b, and the third segment 3111c are integrally formed by bending a metal strip (for example, a copper strip).

As shown in FIG. 23, one end of the second segment 3111b is connected to a side part of the first segment 3111a, and a joint of the two is bent once. The bending is to make the first bent strip 3111 extend downward (for example, in a negative direction of a z-axis), so that the height difference is formed between the first segment 3111a and the third segment 3111c. After the bending, the first segment 3111a and the second segment 3111b are not in a same vertical plane, and therefore, the bending may be referred to as a bending for changing a direction.

As shown in FIG. 23, the other end of the second segment 3111b is connected to the side part of the third segment 3111c, and a joint of the two is bent once. The bending is to make the first bent strip 3111 extend toward in a negative direction of the y-axis, so that the first segment 3111a and the third segment 3111c are located on different sides of the second segment 3111b. For example, the first segment 3111a is located on a first surface of the second segment 3111b, and the third segment 3111c is located on a second surface of the second segment 3111b. After the bending, the second segment 3111b and the third segment 3111c are not in a same vertical plane, and therefore, the bending may be referred to as a bending for changing a direction.

It can be learned that the first bent strip 3111 includes at least two bendings for changing a direction.

The first segment 3111a may be a bent structure shown in FIG. 23. Certainly, the first segment 3111a may alternatively be a horizontal structure. This is not limited in this application, provided that the first bent strip 3111 can be mounted in the center pillar 5.

A connection between the first segment 3111a and the second segment 3111b may be a rounded-corner connection, and a connection between the second segment 3111b and the third segment 3111c may also be a rounded-corner connection.

(2) For the second bent strip 3112, as shown in FIG. 23, a bending of the second bent strip 3112 matches a bending of the first bent strip 3111.

The bending of the second bent strip 3112 is mainly intended to adapt to the bending of the first bent strip 3111, so as to widen a spacing between the two. In this way, a minimum spacing between the two meets a specified safety range (which may also be referred to as a safety regulation for short).

For example, one end of the fifth segment 3112b is connected to one end of the fourth segment 3112a, and the other end of the fifth segment 3112b is connected to an end part of the sixth segment 3112c. The fourth segment 3112a and the sixth segment 3112c are located on different sides of the fifth segment 3112b, and there is a height difference between the fourth segment 3112a and the sixth segment 3112c.

The fourth segment 3112a, the fifth segment 3112b, and the sixth segment 3112c are integrally formed by bending a metal strip (for example, a copper strip).

One end of the fifth segment 3112b is an end in a length direction of the fifth segment 3112b. Similarly, one end of the fourth segment 3112a is also an end in a length direction of the fourth segment 3112a.

As shown in FIG. 23, there is the height difference between the fourth segment 3112a and the sixth segment 3112c, one end of the fifth segment 3112b is connected to one end of the fourth segment 3112a, and the other end of the fifth segment 3112b is connected to an end part of the sixth segment 3112c. In this case, although a joint between the fourth segment 3112a and the fifth segment 3112b is bent, the fourth segment 3112a and the fifth segment 3112b are located in a same vertical plane. Therefore, the bending is a bending for not changing a direction. Similarly, although a joint between the fifth segment 3112b and the sixth segment 3112c is bent, the fifth segment 3112b and the sixth segment 3112c are located in a same vertical plane. Therefore, the bending is a bending for not changing a direction.

It can be learned that the fourth segment 3112a, the fifth segment 3112b, and the sixth segment 3112c of the second bent strip 3112 are all located in a same vertical plane.

In an example, the first segment 3111a of the first bent strip 3111 and the fourth segment 3112a of the second bent strip 3112 are configured to electrically connect to a power connector of a composite cable. The third segment 3111c of the first bent strip 3111 and the sixth segment 3112c of the second bent strip 3112 are configured to electrically connect to the power supply line 32.

Both the third segment 3111c of the first bent strip 3111 and the sixth segment 3112c of the second bent strip 3112 are connection parts that are of the first electrical connector conductive part 311 and that are close to the power supply line 32.

The third segment 3111c of the first bent strip 3111 and the sixth segment 3112c of the second bent strip 3112 both are matched with the power supply line 32 in shape.

For example, if the power supply line 32 is a flexible circuit board, both the third segment 3111c of the first bent strip 3111 and the sixth segment 3112c of the second bent strip 3112 may have a sheet-shaped structure shown in FIG. 23, and both the third segment 3111c and the sixth segment 3112c are welded on a surface of the flexible circuit board.

For another example, if the power supply line 32 is a cable, both the third segment 3111c of the first bent strip 3111 and the sixth segment 3112c of the second bent strip 3112 may have a circular-ring-shaped structure, so that an end part of the power supply line 32 is fastened in the circular-ring-shaped structure.

The foregoing describes structural features of the first bent strip 3111 and the second bent strip 3112 of the first electrical connector conductive part 311. The following describes a mounting relationship of the first electrical connector conductive part 311 in the center pillar 5.

The mounting relationship of the first electrical connector conductive part 311 in the center pillar 5 may be as follows: As described above, the center pillar 5 includes the support plate 51 and the guiding and limiting plate 52. As shown in FIG. 22, a part of the first electrical connector conductive part 311 is fastened in the guiding and limiting plate 52, and a part of the first electrical connector conductive part 311 is fastened in the support plate 51. The first electrical connector conductive part 311 is exposed from the guiding and limiting plate 52, so as to be connected to the power connector of the composite cable. The first electrical connector conductive part 311 is exposed from the support plate 51, so as to be connected to the power supply line 32. For example, both the first segment 3111a of the first bent strip 3111 and the fourth segment 3112a of the second bent strip 3112 are exposed from the guiding and limiting plate 52, and both the third segment 3111c of the first bent strip 3111 and the sixth segment 3112c of the second bent strip 3112 are exposed from the support plate 51.

There are a plurality of manners in which both the first segment 3111a of the first bent strip 3111 and the fourth segment 3112a of the second bent strip 3112 are exposed from the guiding and limiting plate 52.

For example, one manner may be as follows: As shown in FIG. 22, the guiding and limiting plate 52 includes a first plate body 521 and a second plate body 522, a height of the first plate body 521 is less than a height of the second plate body 522, the first plate body 521 is located at an end of the second plate body 522, and an end part that is of the second plate body 522 and that is away from the first plate body 521 is located on a surface of the support plate 51. One part of the first segment 3111a of the first bent strip 3111 is located on an upper surface of the first plate body 521, and the other part is located in the second plate body 522. One part of the fourth segment 3112*a* of the second bent strip 3112 is located on a lower surface of the first plate body 521, and the other part is located in the second plate body 522.

The first plate body 521 is configured to match a socket of a power connector of a composite cable. Therefore, the first plate body 521 may also be referred to as a first electrical connector connection part, and may be made of an insulation material such as a plastic part. The second plate body 522 is mainly configured to fasten the first electrical connector conductive part 311. Therefore, the second plate body 522 may be referred to as a first electrical connector mounting part, and may be made of an insulation material such as a plastic part.

In an example, the first plate body 521 and the second plate body 522 are connected in a plurality of manners. For example, the first plate body 521 and the second plate body 522 may be connected through adhesive or a screw. For another example, an end part of the first plate body 521 and an end part of the second plate body 522 are fixedly connected through adhesive or a screw. For another example, the first plate body 521 and the second plate body 522 are integrally formed. As shown in FIG. 22, the first plate body 521 and the second plate body 522 are two parts of a plate body, and a height of the first plate body 521 is less than a height of the second plate body 522. This is because a top and a bottom of the second plate body 522 are respectively used to fixedly connect to a top and a top of the first socket 11, and a height of the second plate body 522 adapts to a height of the first socket 11. The first plate body 521 is configured to insert the power connector of the composite cable, and a height of the first plate body 521 adapts to the power connector of the composite cable. Therefore, the height of the first plate body 521 may not be equal to the height of the second plate body 522. Heights of the first plate body 521 and the second plate body 522 are not limited in this embodiment, and a person skilled in the art may flexibly select the heights based on an actual situation.

In this way, when the composite cable is inserted into the first socket 11, the first plate body 521 may enter a socket of the power connector of the composite cable, so that the first segment 3111*a* of the first bent strip 3111 on the upper surface of the first plate body 521 and the fourth segment 3112*a* of the second bent strip 3112 on the lower surface of the first plate body 521 are electrically connected to a conductive part in the socket of the power connector. However, when an optical cable inserted into the first socket 11 does not include a power connector, because an outer end part of the first plate body 521 is actually an outer end part of the center pillar 5, insertion of the optical cable into the first socket 11 is not affected. Further, although the first electrical connector conductive part 311 is mounted in the center pillar 5, insertion of the optical cable into the first socket 11 is not affected, so that the first socket 11 is compatible.

Figure 24:
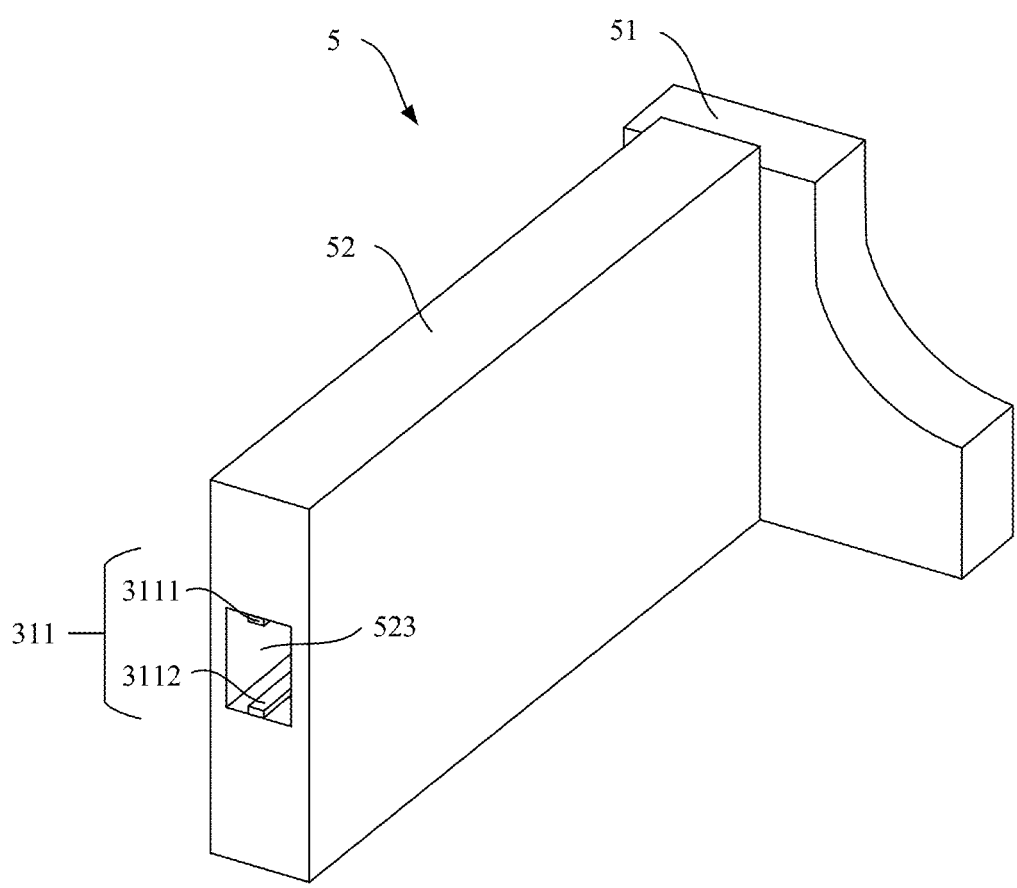
FIG. 24 is a schematic diagram of a structure of a first electrical connector conductive part in a center pillar according to this application.

For another example, in another manner in which both the first segment 3111*a* of the first bent strip 3111 and the fourth segment 3112*a* of the second bent strip 3112 are exposed from the guiding and limiting plate 52, as shown in FIG. 24, an end part that is of the guiding and limiting plate 52 and that is away from the support plate 51 has a groove 523. The first segment 3111*a* of the first bent strip 3111 is located on an upper groove wall of the groove 523, and the fourth segment 3112*a* of the second bent strip 3112 is located on a lower groove wall of the groove 523.

The groove 523 may also be referred to as a hollow structure. The groove 523 may be a column-shaped through hole shown in FIG. 24, or may be a cylindrical through hole, or may be a cross through hole, or the like. A specific structure of the groove 523 is not limited in this embodiment.

In this way, a plug of the power connector of the composite cable inserted into the first socket 11 may enter the groove 523, so that both the first bent strip 3111 on the upper groove wall of the groove 523 and the second bent strip 3112 on the lower groove wall of the groove 523 are electrically connected to a conductive part on a plug surface of the power connector of the composite cable. However, an optical cable inserted into the first socket 11 does not include a power connector. Because an end part at an opening of the groove 523 is actually an outer end part of the center pillar 5, insertion of the optical cable into the first socket 11 is not affected. Further, although the first bent strip 3111 and the second bent strip 3112 of the first electrical connector conductive part 311 are mounted in the center pillar 5, insertion of the optical cable into the first socket 11 is not affected, so that the first socket 11 is compatible.

Figure 25:
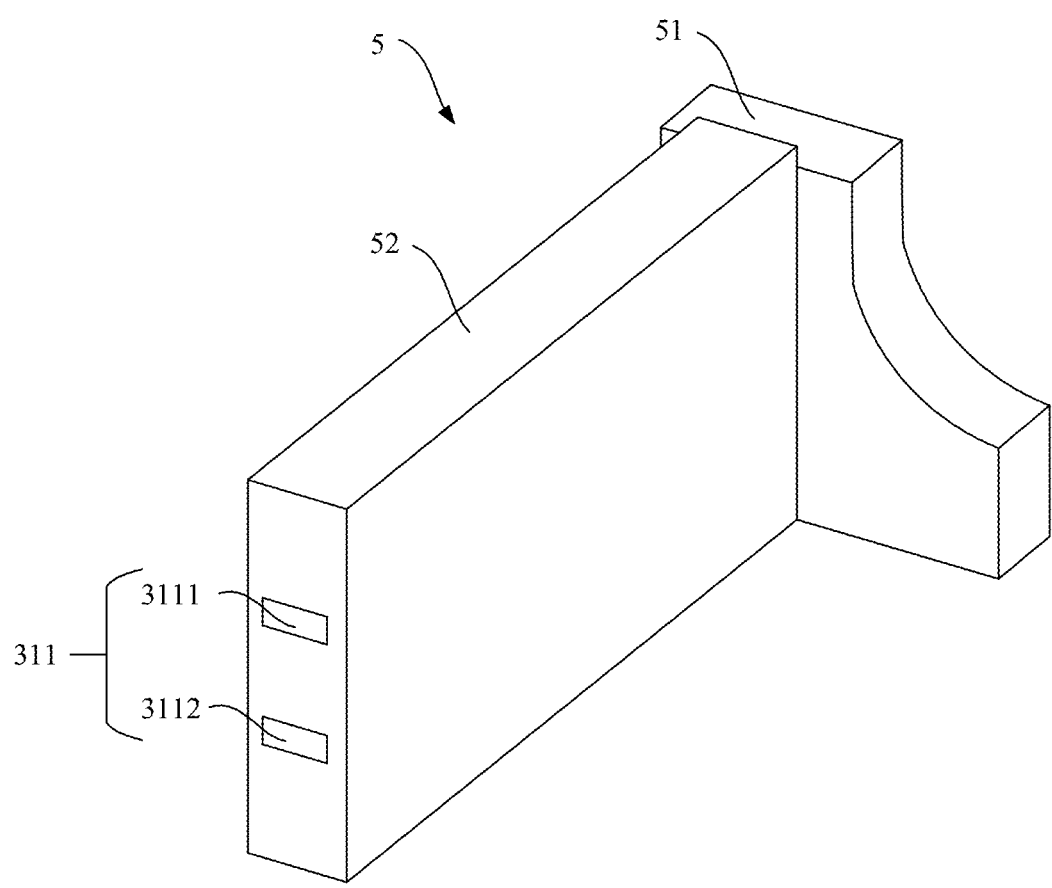
FIG. 25 is a schematic diagram of a structure of a first electrical connector conductive part in a center pillar according to this application.

For another example, as shown in FIG. 25, another manner in which both the first segment 3111*a* of the first bent strip 3111 and the fourth segment 3112*a* of the second bent strip 3112 are exposed from the guiding and limiting plate 52 may be that end parts of both the first segment 3111*a* of the first bent strip 3111 and the fourth segment 3112*a* of the second bent strip 3112 form contact points on an outer end face of the guiding and limiting plate 52.

Figure 26:
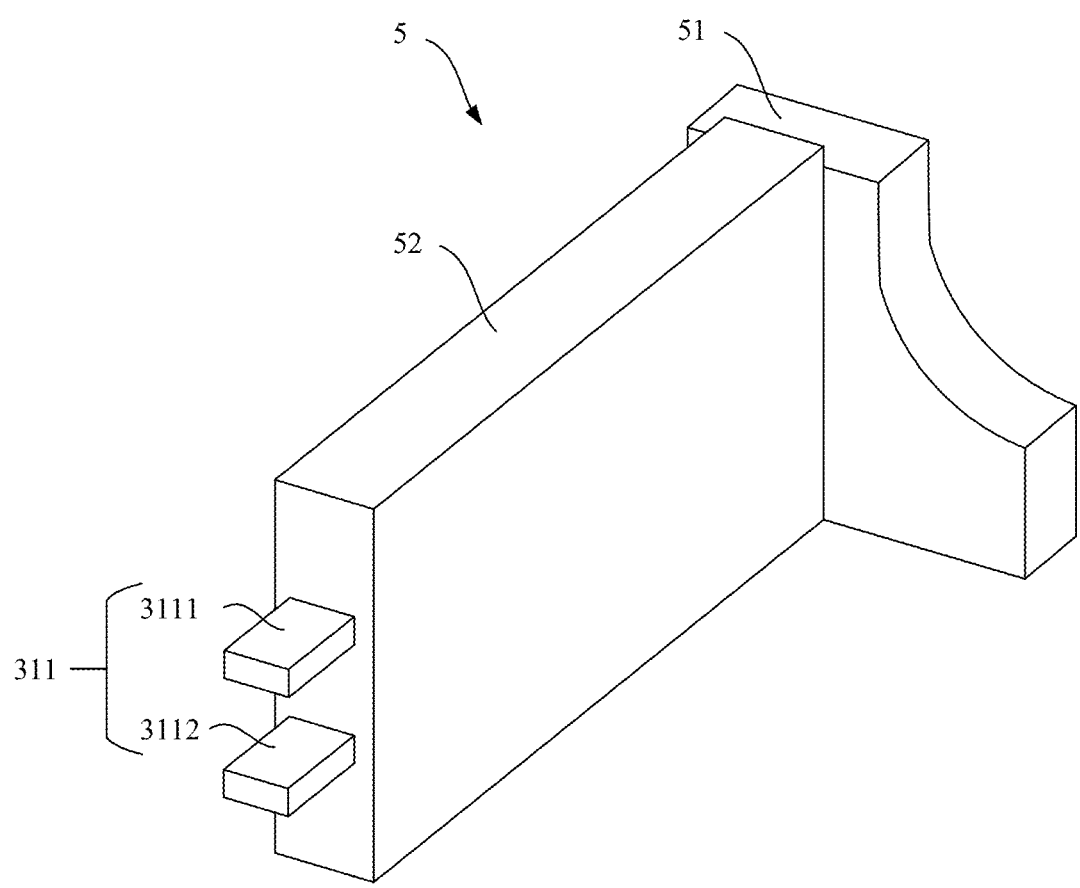
FIG. 26 is a schematic diagram of a structure of a first electrical connector conductive part in a center pillar according to this application.

For another example, another manner in which both the first segment 3111*a* of the first bent strip 3111 and the fourth segment 3112*a* of the second bent strip 3112 are exposed from the guiding and limiting plate 52 may be, as shown in FIG. 26, that end parts of both the first segment 3111*a* of the first bent strip 3111 and the fourth segment 3112*a* of the second bent strip 3112 extend out from an outer end face of the guiding and limiting plate 52. In this solution, to implement compatibility of the first socket 11, a sum of a length of a part that is of the first segment 3111*a* of the first bent strip 3111 and that extends out of the outer end face of the guiding and limiting plate 52 and a length of the center pillar 5 is less than or equal to a standard length of the center pillar 5. Similarly, a sum of a length of a part that is of the fourth segment 3112*a* of the second bent strip 3112 and that extends out of the outer end face of the guiding and limiting plate 52 and a length of the center pillar 5 is less than or equal to the standard length of the center pillar 5. The standard length of the center pillar 5 is a length of the center pillar 5 obtained when the optical module is packaged based on a standard packaging type.

Figure 27:
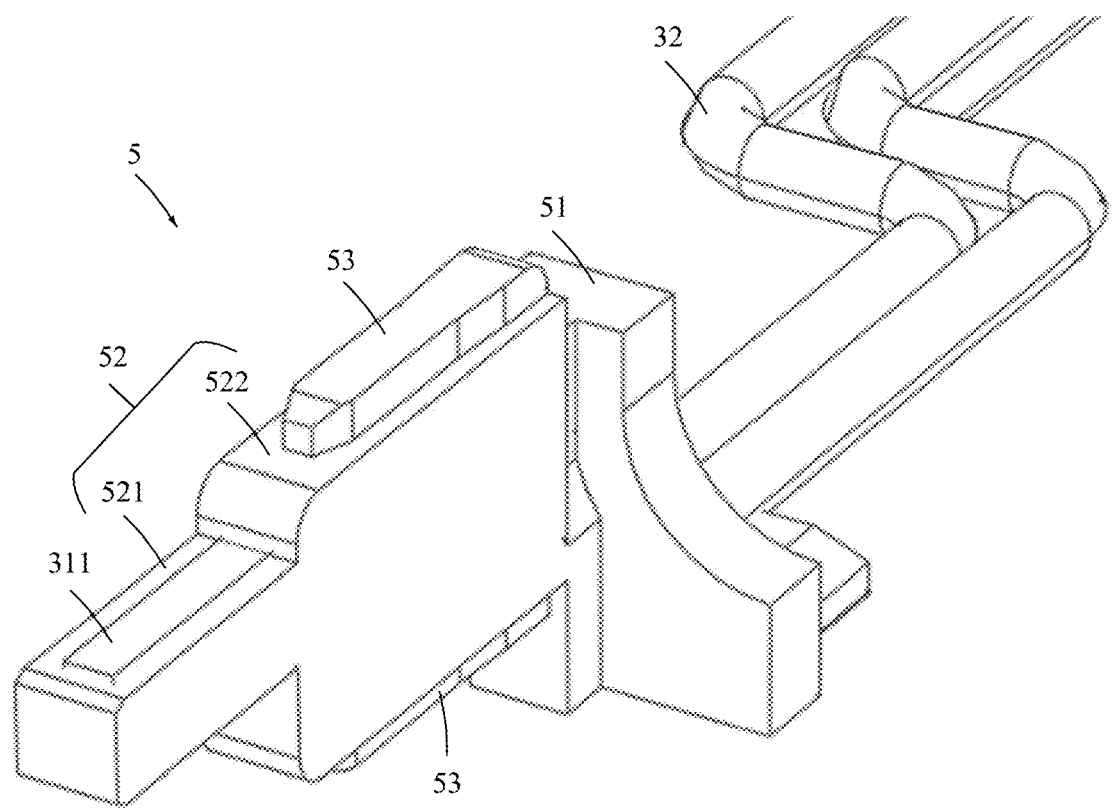
FIG. 27 is a schematic diagram of a structure of a center pillar according to this application.
Figure 28:
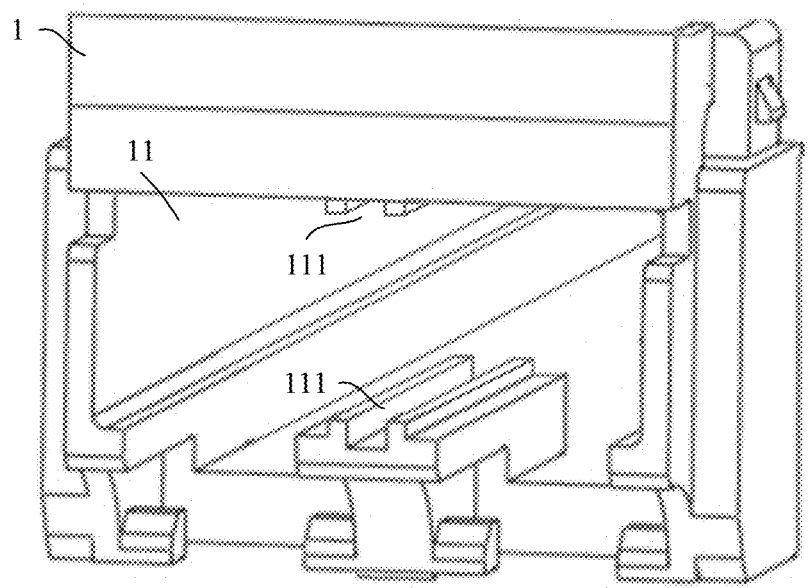
FIG. 28 is a schematic diagram of a structure of a first socket of an optical module according to this application.

To assemble the center pillar 5 in which the first electrical connector conductive part 311 is fastened into the housing 1, correspondingly, as shown in FIG. 27, a strip-shaped guide block 53 is disposed at an end part of the center pillar 5 in a height direction. As shown in FIG. 28, an inner wall of the first socket 11 has a strip-shaped guide groove 111. The strip-shaped guide block 53 matches the strip-shaped guide groove 111, and the strip-shaped guide block 53 is located in the strip-shaped guide groove 111.

For example, as shown in FIG. 27, both a top and a bottom opposite to each other of the guiding and limiting plate 52 of the center pillar 5 have strip-shaped guide blocks 53. As shown in FIG. 28, both a top wall and a bottom wall opposite to each other of the first socket 11 have strip-shaped guide grooves 111. As shown in FIG. 1, the strip-shaped guide block 53 on the top of the guiding and limiting plate 52 is located in the strip-shaped guide groove 111 on the top wall of the housing 1, and the strip-shaped guide block 53 on the bottom of the guiding and limiting plate 52 is located in the strip-shaped guide groove 111 on the bottom wall of the housing 1.

As shown in FIG. 27, the strip-shaped guide block 53 may be of a strip-shaped protrusion structure. Correspondingly, as shown in FIG. 28, the strip-shaped guide groove 111 may be of a strip-shaped groove structure. The strip-shaped guide block 53 adapts to the strip-shaped guide groove 111. For example, a size of the strip-shaped guide block 53 matches a size of the strip-shaped guide groove 111, and a position of the strip-shaped guide block 53 corresponds to a position of the strip-shaped guide groove 111.

In this way, the center pillar 5 in which the first electrical connector conductive part 311 is fastened is mounted in the housing 1. The strip-shaped guide block 53 of the guiding and limiting plate 52 slides in the corresponding strip-shaped guide groove 111 until the strip-shaped guide block 53 is limited in the strip-shaped guide groove 111 and cannot continue to slide. When the strip-shaped guide block 53 stops sliding in the strip-shaped guide groove 111, the center pillar 5 in which the first electrical connector conductive part 311 is fastened is mounted in the housing 1.

Figure 29:
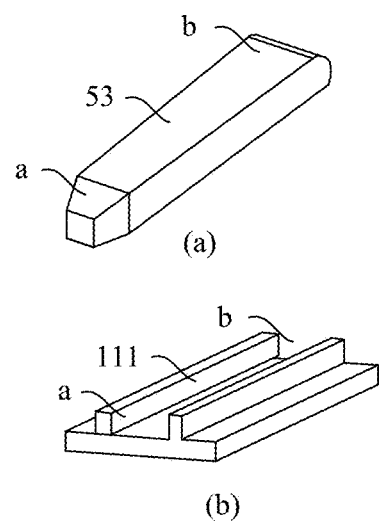
FIG. 29 is a schematic diagram of structures of a strip-shaped guide block and a strip-shaped guide groove according to this application.

In an example, to enable the strip-shaped guide block 53 to slide in the strip-shaped guide groove 111, correspondingly, as shown in (a) in FIG. 29, a width of the strip-shaped guide block 53 is gradually increased from a first end a to a second end b, the first end a of the strip-shaped guide block 53 is an end part facing the outside of the housing 1, and the second end b of the strip-shaped guide block 53 is an end part facing the inside of the housing 1.

For example, a groove width of the strip-shaped guide groove 111 adapts to the width of the strip-shaped guide block 53. For example, in a case, as shown in (b) in FIG. 29, the groove width of the strip-shaped guide groove 111 is gradually increased from the first end a to the second end b, the first end a of the strip-shaped guide groove 111 is the end part facing the outside of the housing 1, and the second end b of the strip-shaped guide groove 111 is the end part facing the inside of the housing 1. For another example, in another case, a groove width of the strip-shaped guide groove 111 may be greater than a minimum width of the strip-shaped guide block 53, and is less than a maximum width of the strip-shaped guide block 53. In other words, the groove width of the strip-shaped guide groove 111 is greater than a width of the first end a of the strip-shaped guide block 53, and is less than a width of the second end b of the strip-shaped guide block 53. In this way, in a process in which the strip-shaped guide block 53 slides in the strip-shaped guide groove 111, the strip-shaped guide block 53 does not slide out of the strip-shaped guide groove 111, and the strip-shaped guide block 53 may be limited in the strip-shaped guide groove 111. Therefore, the center pillar 5 can be stably mounted in the housing 1.

(II) The Power Supply Line 32 of the Power Supply Component 3

Figure 30:
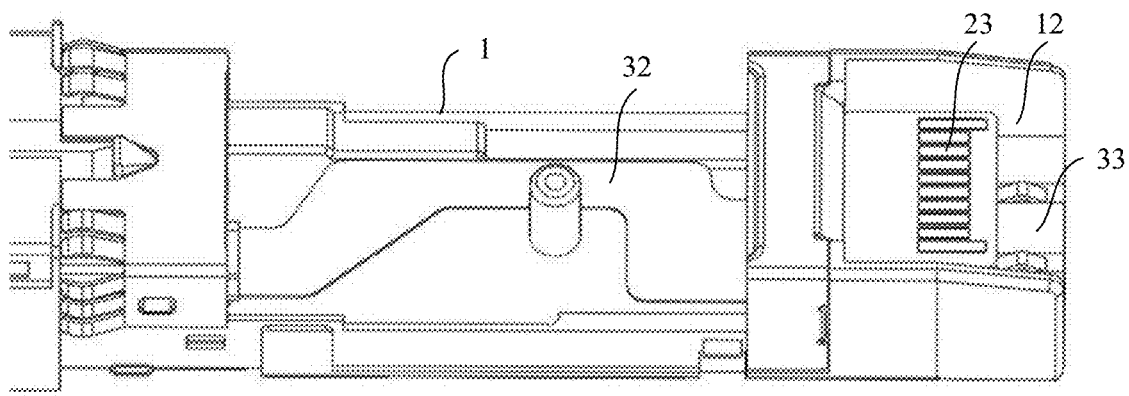
FIG. 30 is a schematic diagram of a structure in which a power supply line of an optical module is a flexible circuit board according to this application.

In an example, as shown in FIG. 30, the power supply line 32 may be a flexible circuit board (that is, a flexible printed circuit board). One end of the flexible circuit board is electrically connected to the first electrical connector conductive part 311 of the first electrical connector 31, and the other end of the flexible circuit board is electrically connected to the second electrical connector conductive part 331 of the second electrical connector 33.

Figure 31:
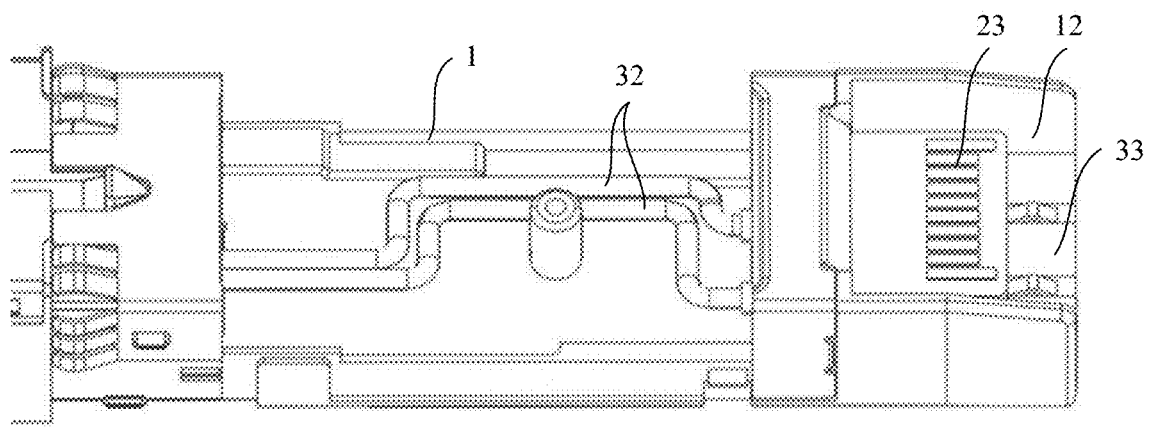
FIG. 31 is a schematic diagram of a structure in which a power supply line of an optical module is a cable according to this application.

In another example, as shown in FIG. 31, the power supply line 32 may be a cable (that is, a cable wrapped with a copper wire), one end of the cable is electrically connected to the first electrical connector conductive part 311 of the first electrical connector 31, and the other end of the cable is electrically connected to the second electrical connector conductive part 331 of the second electrical connector 33.

In another example, the power supply line 32 may be a second rigid circuit board. One end of the second rigid circuit board is electrically connected to the first electrical connector conductive part 311 of the first electrical connector 31, and the other end of the second rigid circuit board is electrically connected to the second electrical connector conductive part 331 of the second electrical connector 33.

In another example, in a solution in which the power supply line 32 is a second rigid circuit board, the second electrical connector conductive part 331 of the second electrical connector 33 may be located on a surface of the second rigid circuit board. For example, the power supply line 32 may be a second rigid circuit board, one end of the second rigid circuit board is electrically connected to the first electrical connector conductive part 311 of the first electrical connector 31, the other end of the second rigid circuit board extends into the second socket 12, and a surface of a part that is of the second rigid circuit board and that is located in the second socket 12 may have an edge connector, and the edge connector forms the second electrical connector conductive part 331 of the second electrical connector 33.

Figure 32:
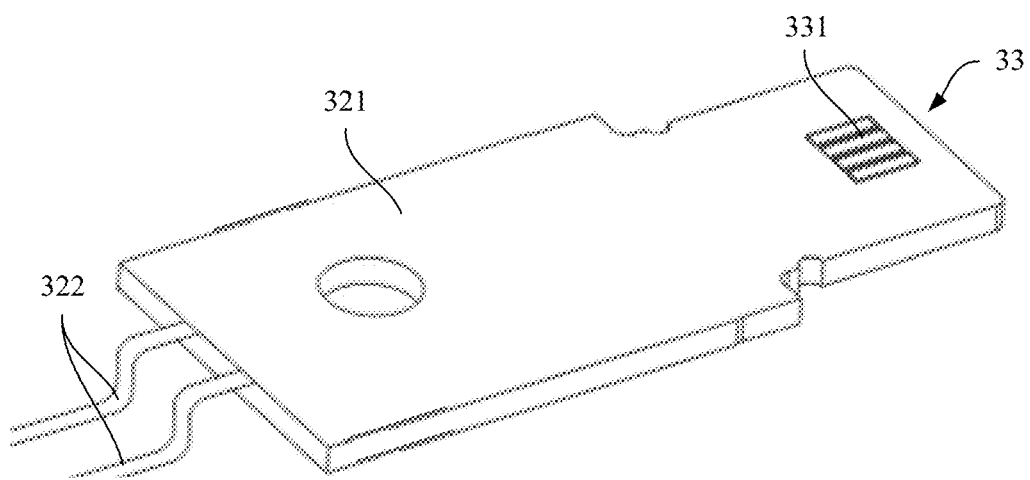
FIG. 32 is a schematic diagram of a structure in which a power supply line includes a cable and a second rigid circuit board according to this application.

In some other examples, as shown in FIG. 32, the power supply line 32 may include a second rigid circuit board 321 and a cable 322. One end of the second rigid circuit board 321 is electrically connected to the cable 322, and the other end of the second rigid circuit board 321 is electrically connected to the second electrical connector conductive part 331 of the second electrical connector 33. Alternatively, the second electrical connector conductive part 331 of the second electrical connector 33 is integrated on a surface of the second rigid circuit board 321. For example, one end of the second rigid circuit board 321 is electrically connected to the cable 322, the other end of the second rigid circuit board 321 extends into the second socket 12, and a surface that is of a part of the second rigid circuit board 321 and that is located in the second socket 12 may have an edge connector. The edge connector forms the second electrical connector conductive part 331 of the second electrical connector 33. An end part that is of the cable 322 and that is away from the second rigid circuit board 321 is electrically connected to the first electrical connector conductive part 311 of the first electrical connector 31.

Figure 33:
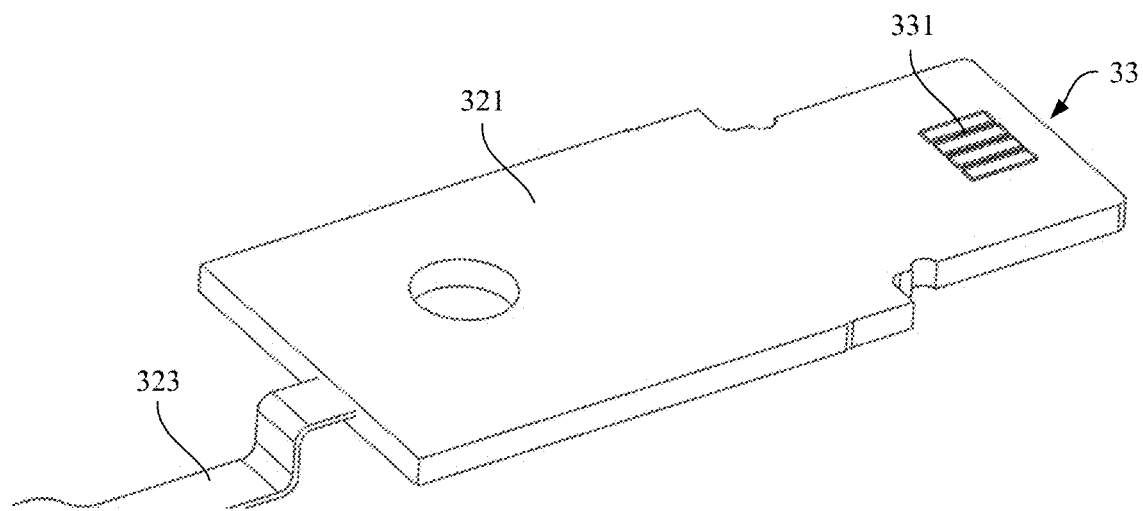
FIG. 33 is a schematic diagram of a structure in which a power supply line includes a flexible circuit board and a second rigid circuit board according to this application.

In some other examples, as shown in FIG. 33, the power supply line 32 includes a second rigid circuit board 321 and a flexible circuit board 323. One end of the second rigid circuit board 321 is electrically connected to the flexible circuit board 323, and the other end of the second rigid circuit board 321 is electrically connected to the second electrical connector conductive part 331 of the second electrical connector 33. Alternatively, the second electrical connector conductive part 331 of the second electrical connector 33 is integrated on a surface of the second rigid circuit board 321. For example, one end of the second rigid circuit board 321 is electrically connected to the flexible circuit board 323, the other end of the second rigid circuit board 321 extends into the second socket 12, and a surface that is of a part of the second rigid circuit board 321 and that is located in the second socket 12 may have an edge connector. The edge connector forms the second electrical connector conductive part 331 of the second electrical connector 33. An end part that is of the flexible circuit board 323 and that is away from the second rigid circuit board 321 is electrically connected to the first electrical connector conductive part 311 of the first electrical connector 31.

In some other examples, the power supply line 32 may alternatively include a cable 322 and a flexible circuit board 323. For example, the first electrical connector conductive part 311 of the first electrical connector 31, the cable 322, the flexible circuit board 323, and the second electrical connector conductive part 331 of the second electrical connector 33 are electrically connected in sequence. For another example, the first electrical connector conductive part 311 of the first electrical connector 31, the flexible circuit board 323, the cable 322, and the second electrical connector conductive part 331 of the second electrical connector 33 are electrically connected in sequence.

In some other examples, the power supply line 32 may alternatively be integrated into the first rigid circuit board 221 of the optical component 2. For example, the power supply line 32 may alternatively be a flat cable printed on a surface of the first rigid circuit board 221 of the optical component 2. In this case, the first electrical connector conductive part 331 of the first electrical connector 31 and the second electrical connector conductive part 331 of the second electrical connector 33 may be electrically connected by using the first rigid circuit board 221. For example, the first electrical connector conductive part 331 is connected to one end of the first rigid circuit board 221, and the second electrical connector conductive part 331 is connected to the other end of the first rigid circuit board 221.

In a solution in which the power supply line 32 is integrated into the first rigid circuit board 221, the second electrical connector conductive part 331 may alternatively be integrated into the first rigid circuit board 221. For example, the second electrical connector conductive part 331 is a metal sheet located on the surface of the first rigid circuit board 221.

Figure 48:
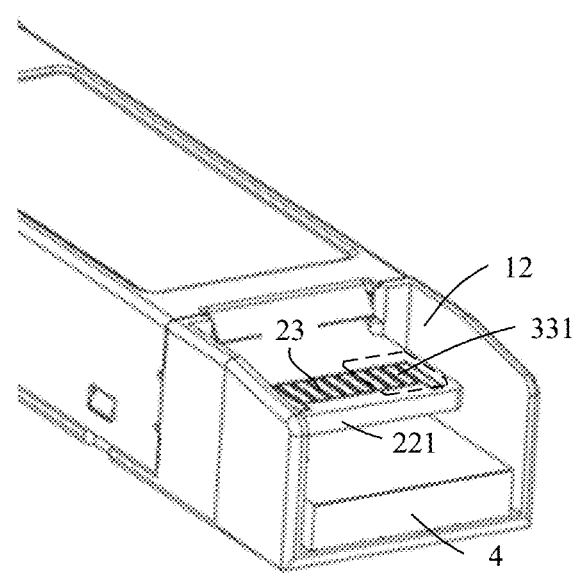
FIG. 48 is a schematic diagram of a structure of an optical module whose second electrical connector conductive part is located on a first rigid circuit board according to this application.
Figure 49:
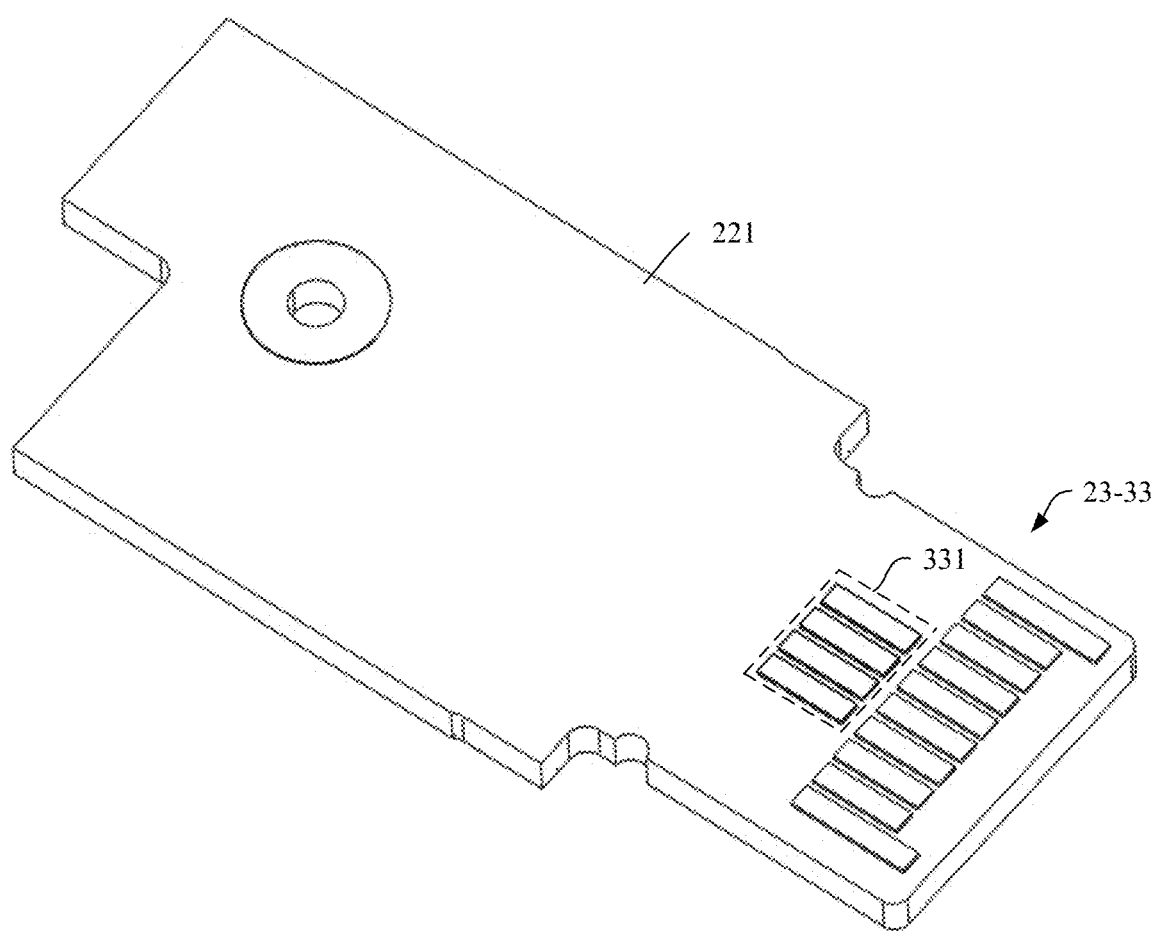
FIG. 49 is a schematic diagram of a structure in which a second electrical connector conductive part is located on a first rigid circuit board according to this application.
Figure 50:
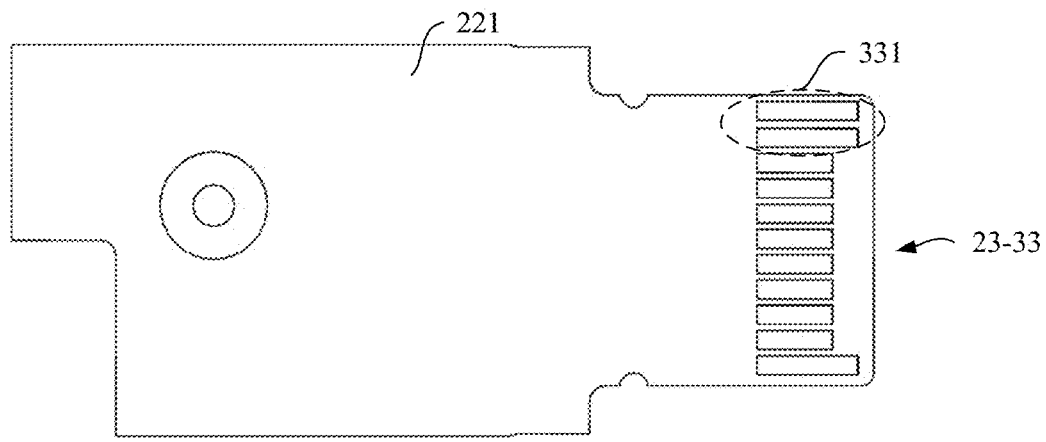
FIG. 50 is a schematic diagram of a structure in which a second electrical connector conductive part is located on a first rigid circuit board according to this application.

In a solution in which the second electrical connector conductive part 331 is a metal sheet located on a surface of the first rigid circuit board 221, as shown in FIG. 48, the second optical connector 23 of the optical component 2 is an edge connector located on the surface of the first rigid circuit board 221. Therefore, as shown in FIG. 48, the second electrical connector conductive part 331 may be an undefined metal sheet in the edge connector, and the undefined metal sheet is an unused metal sheet in the edge connector. For another example, as shown in FIG. 49 and FIG. 50, the second electrical connector conductive part 331 is a metal sheet additionally disposed around the edge connector, and 23-33 in FIG. 49 and FIG. 50 indicates a composite electrical connector including the second optical connector 23 and the second electrical connector 33.

In the solution in which the second electrical connector conductive part 331 is a metal sheet located on the surface of the first rigid circuit board 221, and the second electrical connector conductive part 331 may be a metal sheet additionally disposed around the edge connector. As shown in FIG. 49, the second electrical connector conductive part 331 is located at an end part of the edge connector in a length direction. Alternatively, as shown in FIG. 50, the second electrical connector conductive part 331 is located at a side part of the edge connector in a length direction. Position arrangement of the second electrical connector conductive part 331 of the second electrical connector 33 relative to the conductive part of the second optical connector 23 is not limited in this embodiment.

In another example, the first electrical connector conductive part 331 of the first electrical connector 31, the power supply line 32, and the second electrical connector conductive part 331 of the second electrical connector 33 are integrally formed. For example, the first electrical connector conductive part 331, the power supply line 32, and the second electrical connector conductive part 331 may be formed by processing metal conductors, a part that is of the metal conductor and that is close to the first end may form the first electrical connector conductive part 311, a part that is of the metal conductor and that is close to the second end may form the second electrical connector conductive part 331, and other parts of the metal conductor may form the power supply line 32. In this way, the first electrical connector conductive part 311, the power supply line 32, and the second electrical connector conductive part 331 are formed by processing metal conductors.

A specific implementation of the power supply line 32 is not limited in this embodiment, and in actual processing of the optical module, the optical module may be flexibly selected based on an actual situation.

In order not to affect layout space of the optical component 2 in the housing 1, correspondingly, as shown in FIG. 30 and FIG. 31, the power supply line 32 may be laid on an inner surface of the housing 1.

For example, as shown in FIG. 30, the power supply line 32 is a flexible circuit board, and the flexible circuit board may be laid on an inner surface of the housing 1. For another example, as shown in FIG. 31, the power supply line 32 is a cable, and the cable may be laid on an inner surface of the housing 1. For another example, the power supply line 32 includes a cable and a flexible circuit board, and both the cable and the flexible circuit board may be located on an inner surface of the housing 1. For another example, the power supply line 32 includes a cable and a second rigid circuit board, or the power supply line 32 includes a flexible circuit board and a second rigid circuit board. In this case, the cable or the flexible circuit board may be laid on an inner surface of the housing 1, and the second rigid circuit board may be suspended in the housing 1, so that some components may be installed on the surface of the second rigid circuit board. For example, a component used by the power supply line 32 to transmit a data signal may be installed, and some components may be installed. These components may be components used by an optical module to receive feedback information and determining feedback information, this part of content is described in detail in the following when a function of the power supply component 32 is described.

In a solution in which the power supply line 32 is a second rigid circuit board, the second rigid circuit board may be located in the housing 1 side by side with the first rigid circuit board 221 of the optical component 2.

The foregoing is a specific form of the power supply line 32 and a position of the power supply line 32 in the housing 1. Regardless of a manner and a position of the power supply line 32 in the housing 1, the power supply line 32 does not affect layout space of the optical component 2 in the housing 1.

(III) The Second Electrical Connector 33 of the Power Supply Component 3

In an implementation of the second electrical connector 33, positions of the second electrical connector 33 and the second optical connector 23 are independent of each other. In another implementation of the second electrical connector 33, the second electrical connector 33 and the second optical connector 23 are integrated together, but conductive parts of the two are independent of each other. The following describes the foregoing two implementations in sequence.

(1) Positions of the second optical connector 23 and the second electrical connector 33 that are located in the second socket 12 of the housing 1 are independent of each other, so that the second end of the optical module is compatible. The second end of the optical module is compatible, or in other words, the second socket 12 of the optical module is compatible.

Figure 34:
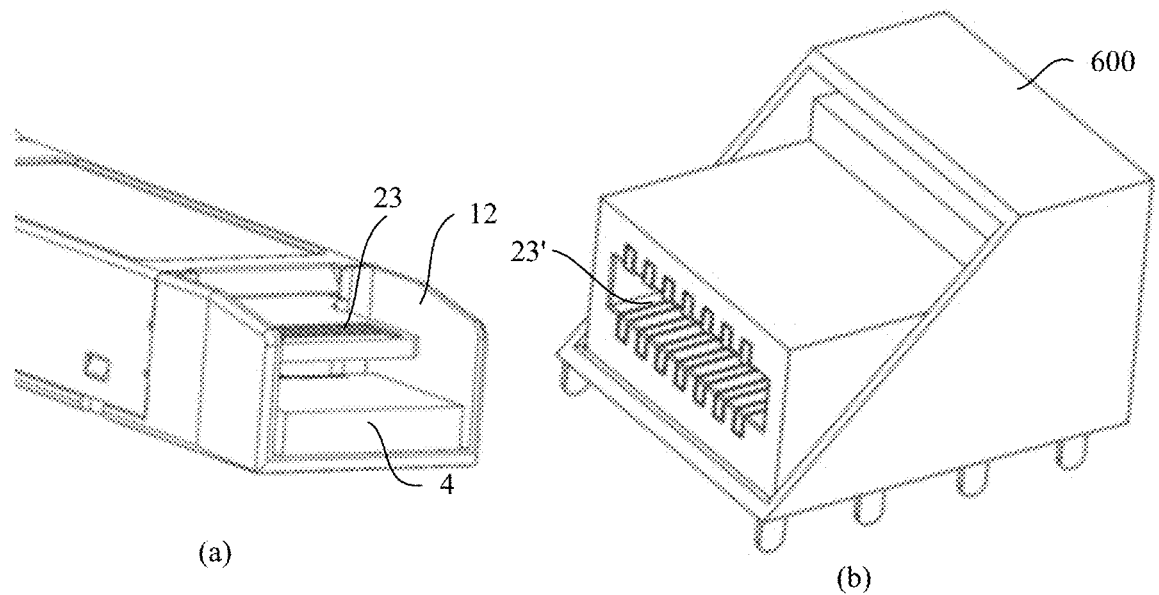
FIG. 34 is a schematic diagram of a structure in which an optical module is matched with an optical cage according to this application.
Figure 35:
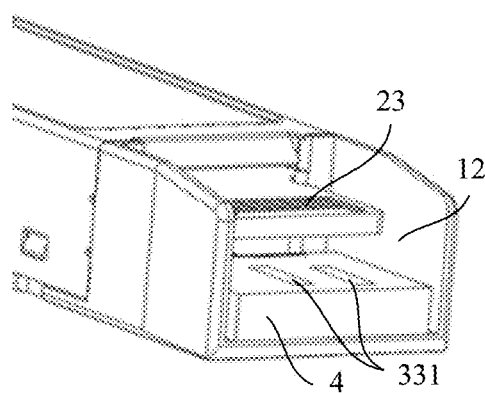
FIG. 35 is a schematic diagram of a structure of an optical module in which a second electrical connector conductive part is a metal sheet according to this application.

As shown in FIG. 34, the optical module includes a pluggable guide block 4, and the pluggable guide block 4 is located in the second socket 12. The second electrical connector 33 includes a second electrical connector conductive part 331. As shown in FIG. 35, the second electrical connector conductive part 331 is fastened to the pluggable guide block 4. A second end of the housing 1 can be inserted into a communication device that matches an optical module, and the optical module is any one of a standard optical module packaging type.

The pluggable guide block 4 is a structure included in all optical modules of a standard packaging type. Therefore, for an optical module that does not include the power supply component 3, the pluggable guide block 4 is also included. When the optical module is inserted into an optical cage of the communication device, as shown in FIG. 34, the pluggable guide block 4 of the optical module touches the optical cage 600 first, the optical module continues to be inserted into the optical cage 600, and the second optical connector 23 enters an electrical interface of the optical cage 600 under guidance of the pluggable guide block 4. 23' in FIG. 34 indicates an electrical interface corresponding to the second optical connector 23. In a process in which the optical module is inserted into the optical cage, the pluggable guide block 4 can further bear a specific action force, so as to reduce a force exerted on the second optical connector 23, protect the first rigid circuit board 221 in which the second optical connector 23 is located, and reduce a force exerted by the optical cage on the first rigid circuit board 221.

A conductive part of the second electrical connector 33, that is, the second electrical connector conductive part 331 of the second electrical connector 33, is fastened to the pluggable guide block 4, so that the second end of the housing 1 can be inserted into any communication device that matches the packaging type of the optical module, and the second end of the optical module is compatible.

The pluggable guide block 4 is used as an installation part of the second electrical connector 33, is a carrier of the second electrical connector conductive part 331, and may alternatively be referred to as a second electrical connector installation part. The pluggable guide block 4 may be made of an insulation material such as a plastic part.

As shown in FIG. 34, the pluggable guide block 4 has a plate-shaped structure, and is installed on an inner wall that is of the second socket 12 and that is located at the top (or bottom). For example, the pluggable guide block 4 may be fastened to the inner wall that is of the second socket 12 and that is located at the top by clamping, or may be fastened to the inner wall that is of the second socket 12 and that is located at the top through an adhesive.

The pluggable guide block 4 serves as a carrier of the second electrical connector conductive part 331, the second electrical connector conductive part 331 may be fastened on the pluggable guide block 4, and the second electrical connector conductive part 331 is further electrically connected to the power supply line 32. There are a plurality of positions for fastening the second electrical connector conductive part 331 on the pluggable guide block 4.

For example, a fastening position may be as follows: As shown in FIG. 35, the second electrical connector conductive part 331 is a strip-shaped metal sheet; the second electrical connector conductive part 331 is fastened on an outer surface of the pluggable guide block 4 opposite to the second optical connector 23, the outer surface of the pluggable guide block 4 is a surface parallel to an insertion/removal direction of an optical module, and the strip direction of the second electrical connector conductive part 331 is parallel to the insertion/removal direction of the optical module.

For example, as shown in FIG. 35, the second electrical connector conductive part 331 may be attached to an outer surface that is of the pluggable guide block 4 and that faces the second optical connector 23. For another example, the second electrical connector conductive part 331 may alternatively be attached to an outer surface of a sidewall of the pluggable guide block 4. For another example, when an outer surface of a sidewall of the pluggable guide block 4 is fastened to an inner surface of a sidewall of the second socket 12, the second electrical connector conductive part 331 may alternatively be attached to an outer surface that is of the pluggable guide block 4 and that is back to the second optical connector 23.

Figure 36:
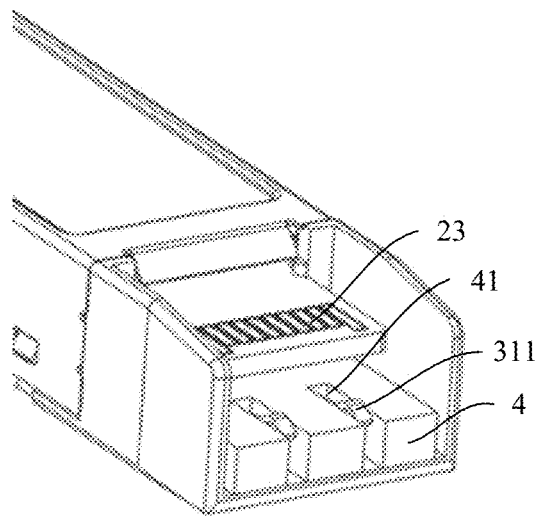
FIG. 36 is a schematic diagram of a structure of an optical module in which a second electrical connector conductive part is a strip-shaped spring according to this application.

For another example, as shown in FIG. 36, the second electrical connector conductive part 331 is a strip-shaped metal spring plate. The strip-shaped metal spring plate may alternatively be referred to as a strip-shaped spring. For a structure of the strip-shaped metal spring, refer to FIG. 37. The second electrical connector conductive part 331 that is a strip-shaped spring includes a straight part 3311 and a bent part 3312.

As shown in FIG. 36, the pluggable guide block 4 has a mounting groove 41, the mounting groove 41 has an opening on an outer surface of the pluggable guide block 4, and the outer surface of the pluggable guide block 4 is any surface parallel to an insertion/removal direction of the optical module. The surface parallel to the insertion/removal direction of the optical module may be an outer surface that is of the pluggable guide block 4 and that faces the second optical connector 23, or may be an outer surface of a sidewall of the pluggable guide block 4, or may be an outer surface that is of the pluggable guide block 4 and that is back to the second optical connector 23, or the like. This is not limited in this embodiment, and an example of facing the outer surface of the second optical connector 23 may be used.

Figure 37:
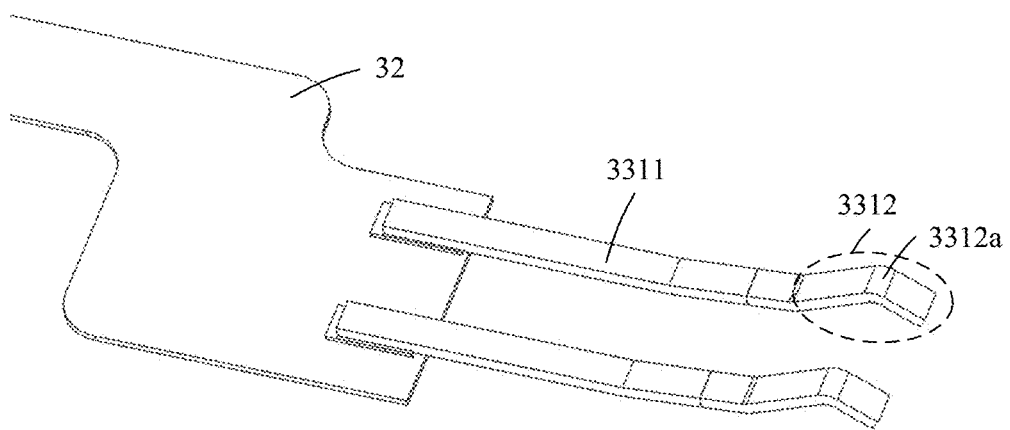
FIG. 37 is a schematic diagram of a structure of a strip-shaped spring according to this application.

As shown in FIG. 37 and FIG. 36, the straight part 3311 of the second electrical connector conductive part 331 that is a strip-shaped spring is located in the pluggable guide block 4, and the bent part 3312 of the strip-shaped spring is located in the mounting groove 41. For example, the bent part 3312 is suspended in the mounting groove 41, and a bending position 3312a of the bent part 3312 extends out of the opening of the mounting groove 41. The bending position 3312a of the bent part 3312 is configured to be electrically connected to a contact part of the inserted device. In this way, when the optical module is inserted into the device, the bending position 3312a may be in contact with a conductive part in the inserted device to implement an electrical connection.

Figure 38:
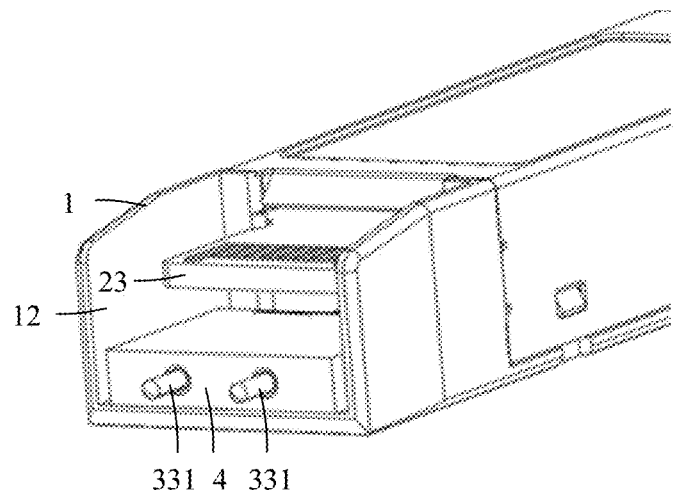
FIG. 38 is a schematic diagram of a structure of an optical module in which a second electrical connector conductive part is a conductive pillar according to this application.

For another example, as shown in FIG. 38, the second electrical connector conductive part 331 is a metal rod; and the second electrical connector conductive part 331 is fastened inside the pluggable guide block 4, and extends out of an end face that is of the pluggable guide block 4 and that is away from the power supply line 32.

For example, the second electrical connector conductive part 331 penetrates through the inside of the pluggable guide block 4, one end of the second electrical connector conductive part 331 extends out of an end face that is of the pluggable guide block 4 and that is close to the power supply line 32 and is electrically connected to the power supply line 32, and the other end extends out of the end face that is of the pluggable guide block 4 and that is away from the power supply line 32 and is configured to electrically connect to the inserted device.

Figure 39:
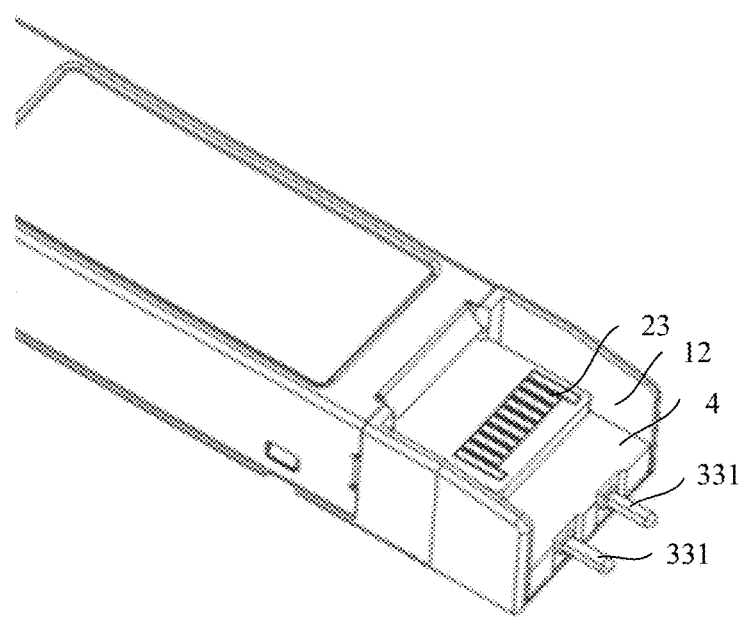
FIG. 39 is a schematic diagram of a structure of an optical module in which a second electrical connector conductive part is a spring pin according to this application.

In an example, to ensure that an electrical connection between the second electrical connector conductive part 331 and the inserted device is stable, correspondingly, as shown in FIG. 39, the metal rod may be a spring pin, where the spring pin may also be referred to as a pogopin, and a pin shaft of the spring pin can extend in an insertion/removal direction of an optical module.

Figure 40:
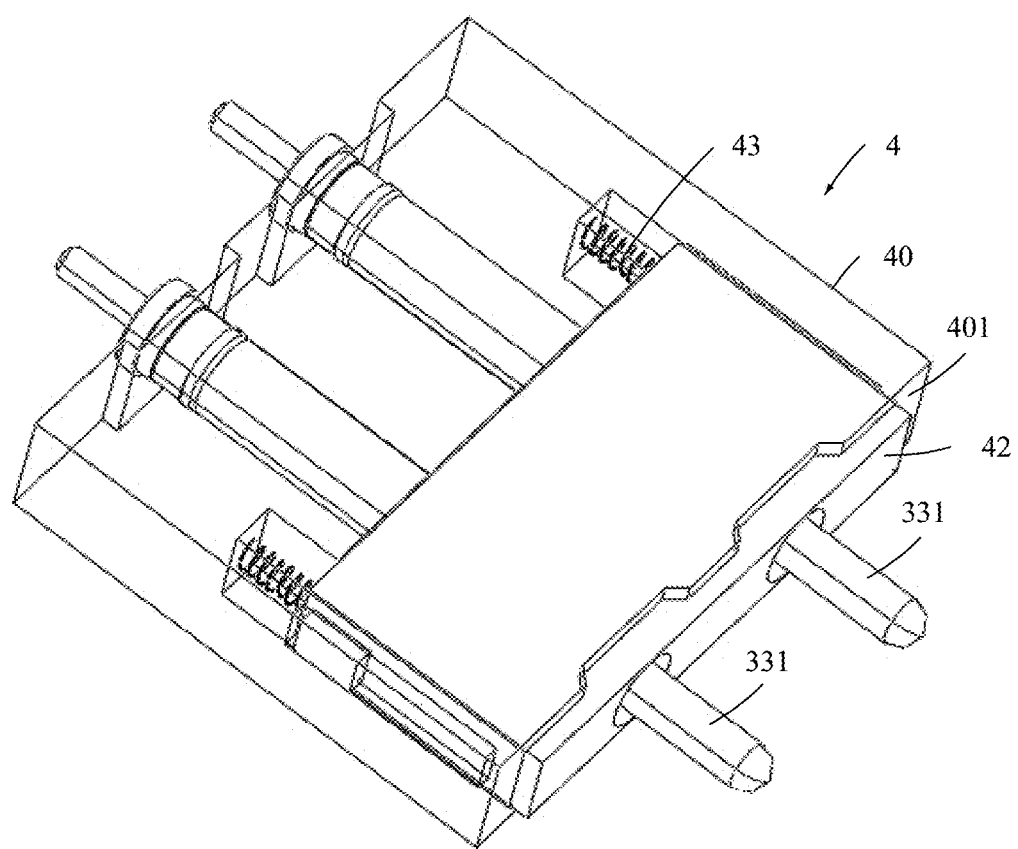
FIG. 40 is a schematic diagram of a structure in which a second electrical connector conductive part is in a pluggable guide block according to this application.

Because the spring pin extends out of an end part of the pluggable guide block 4, and has an end part that is configured to be electrically connected to a communication device and that is exposed on the housing 1, to avoid damage to the spring pin when the optical module falls, correspondingly, as shown in FIG. 40, the pluggable guide block 4 includes a body 40 and a protective part. The protective part is fixedly connected to the body 40, and the protective part is configured as follows: When the optical module is inserted into the communication device, the protective part can enable the pin shaft of the spring pin to be in close contact with a contact point of the communication device; or when the optical module is not inserted into the communication device, the protective part can protect the pin shaft of the spring pin.

Figure 41:
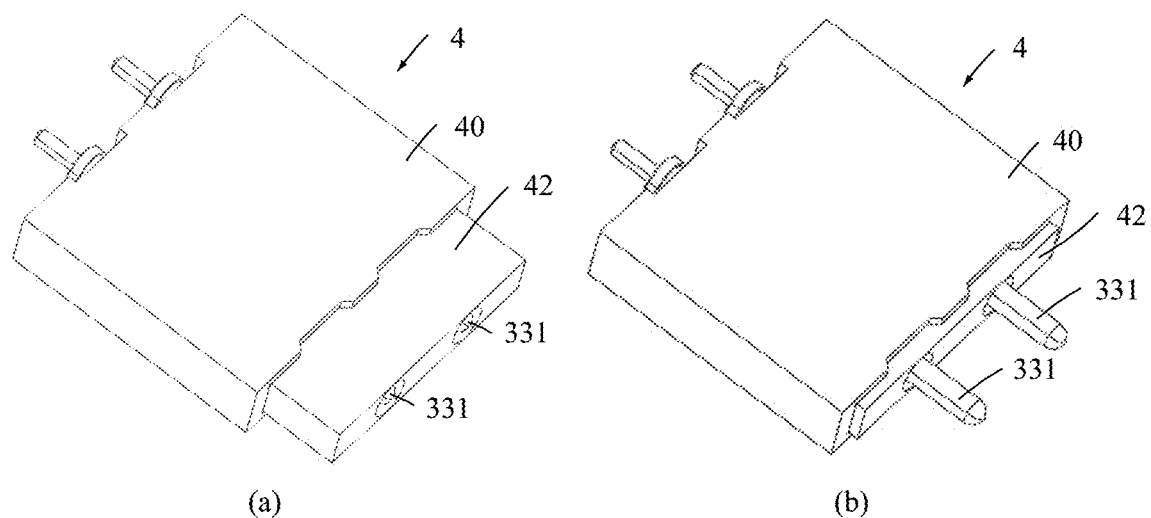
FIG. 41 is a schematic diagram of a structure in which a second electrical connector conductive part is in a pluggable guide block according to this application.

A specific implementation structure of the protective part includes a plurality of types. For example, a structure of the protective part is shown in FIG. 40. The protective part includes a slider 42 and a first elastic part 43. An elastic force of the first elastic part 43 is less than an elastic force of the spring pin. An end part of the body 40 has a sliding slot 401, the slider 42 and the first elastic part 43 are both located in the sliding slot 401, and the first elastic part 43 is connected between a bottom of the sliding slot 401 and the slider 42. One part of the spring pin is fastened in the body 40, and the other part is located in the slider 42. The slider 42 can slide relative to the body 41 and the spring pin, and a sliding direction is parallel to an insertion/removal direction of the optical module, as shown in (a) and (b) in FIG. 41.

The first elastic part 43 may be any component having telescopic elasticity, for example, may be a spring. In this way, under elasticity of the first elastic part 43, the slider 42 can extend out of the sliding slot 401 without detaching from the sliding slot 401, and can alternatively be retracted into the sliding slot 401.

In this way, when the optical module is inserted into the communication device, as the optical module is inserted, the slider 42 is retracted into the sliding slot 401 under push of the communication device. Because a spring of the spring pin is greater than the elasticity of the first elastic part 43, the pin shaft of the spring pin is in close contact with a contact point of the communication device. However, when the optical module is not inserted into the communication device, the slider 42 extends out of the sliding slot 401 under an elastic force of the first elastic part 43, so as to enclose the spring pin and protect the pin shaft of the spring pin.

Figure 42:
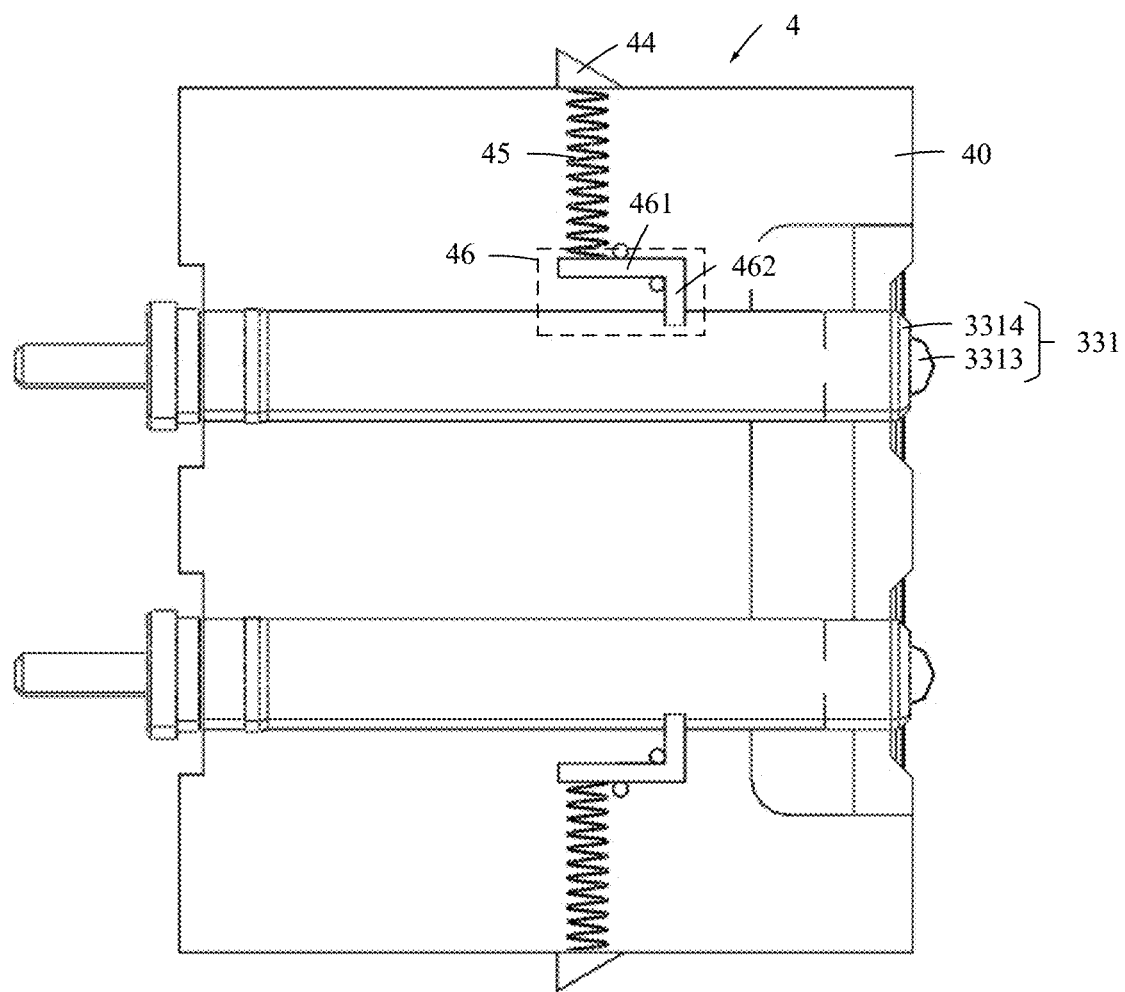
FIG. 42 is a schematic diagram of a structure in which a second electrical connector conductive part is in a pluggable guide block according to this application.
Figure 43:
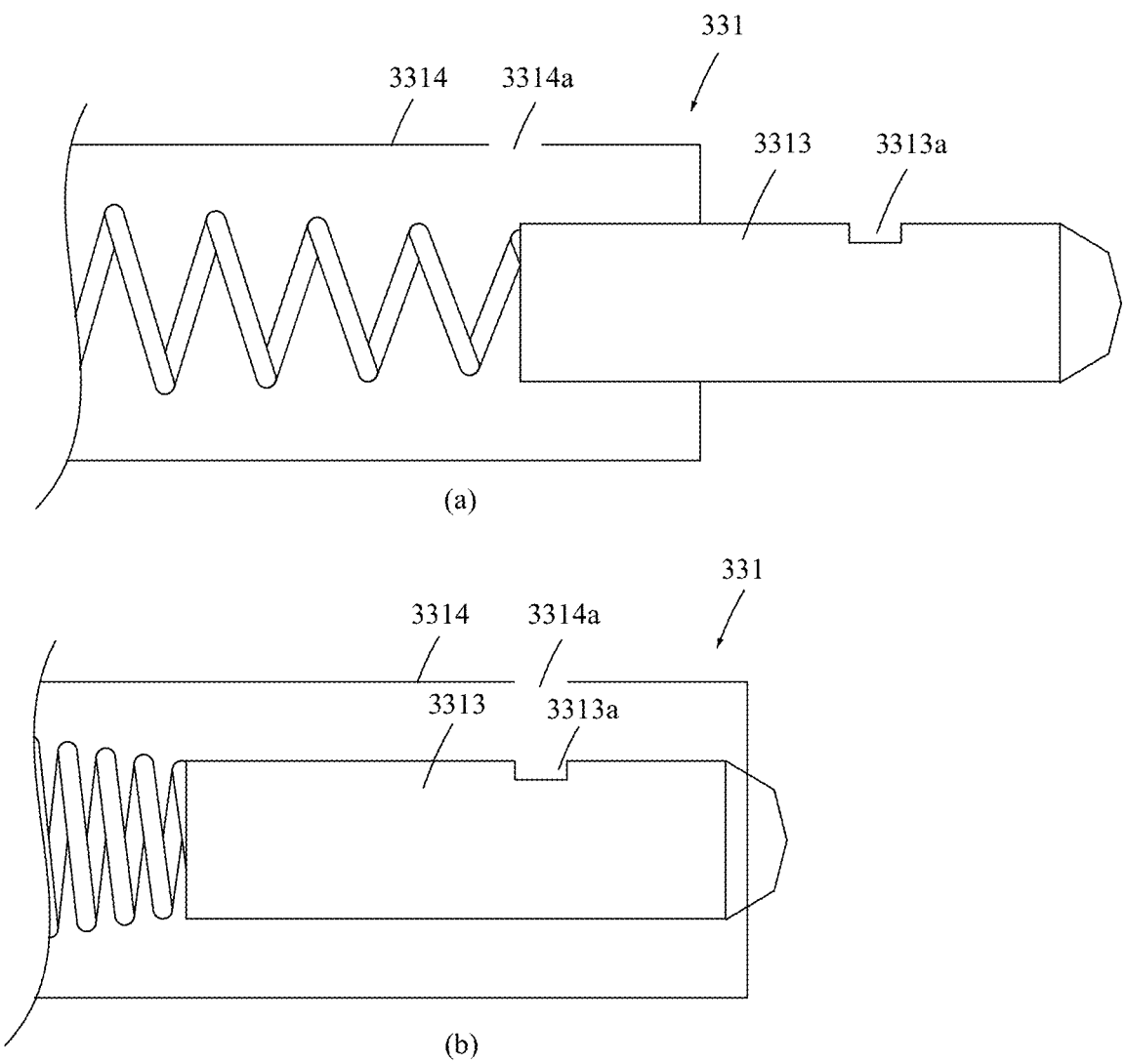
FIG. 43 is a schematic diagram of a structure of a spring pin according to this application.

For another structure of the protective part, as shown in FIG. 42, the protective part includes a pressing part 44, a second elastic part 45, and an L-shaped rod 46. As shown in (a) and (b) in FIG. 43, the pin shaft 3313 of the spring pin has a groove 3313a, and a tube wall of a tube 3314 of the spring pin has a through hole 3314a. When the groove 3313a of the pin shaft 3313 is opposite to the through hole 3314a of the tube 3314, the pin shaft 3313 is accommodated in the tube 3314.

As shown in FIG. 42, one part of the pressing part 44 is located outside the body 40, and the other part is located in the body 40. The spring pin, the second elastic part 45, and the L-shaped rod 46 are all located in the body 40. The pressing part 44, the second elastic part 45, and the first rod 461 of the L-shaped rod 46 are sequentially connected. The second rod 462 of the L-shaped rod 46 is opposite to the through hole 3314a of the tube 3314.

The pressing part 44 may be extendable or retractable relative to the body 40, and an extending/retracting direction is perpendicular to the insertion/removal direction of the optical module. Correspondingly, as shown in FIG. 42, the pressing part 44 is located at a side part of the body 40.

In this way, when the optical module is inserted into an optical cage of a communication device, an inner wall of a socket of the optical cage exerts an action force on the pressing part 44, so that the pressing part 44 is in a pressed state. When the optical module is removed from the optical cage of the communication device, the inner wall of the socket of the optical cage no longer exerts an action force on the pressing part 44, and the pressing part 44 restores to a natural state under the action of the second elastic part 45, and is no longer in the pressed state.

A structure of the pressing part 44 may be any structure that is convenient for entering the optical cage. For example, as shown in FIG. 42, the pressing part 44 has a wedge-shaped structure, including an oblique surface. When the optical module is inserted into the communication device, the oblique surface of the pressing part 44 first enters the optical cage. For another example, the pressing part 44 may alternatively have a spherical structure, and a part that is of the pressing part 44 and that extends out of the body 40 is a spherical structure. A specific implementation structure of the pressing part 44 is not limited in this embodiment.

In this way, when the optical module is inserted into the communication device, the pressing part 44 is in a pressed state, and an end part of the second rod 462 of the L-shaped rod 46 is located outside the tube 3314, so that the pin shaft 3313 is in close contact with a contact point of the communication device. However, when the optical module is not inserted into the communication device, and the pin shaft 3313 is retracted into the tube 3314, an end part of the second rod 462 of the L-shaped rod 46 is located in the groove 3313a of the pin shaft 3313, so that the pin shaft 3313 keeps being retracted into the tube 3314.

Figure 44:
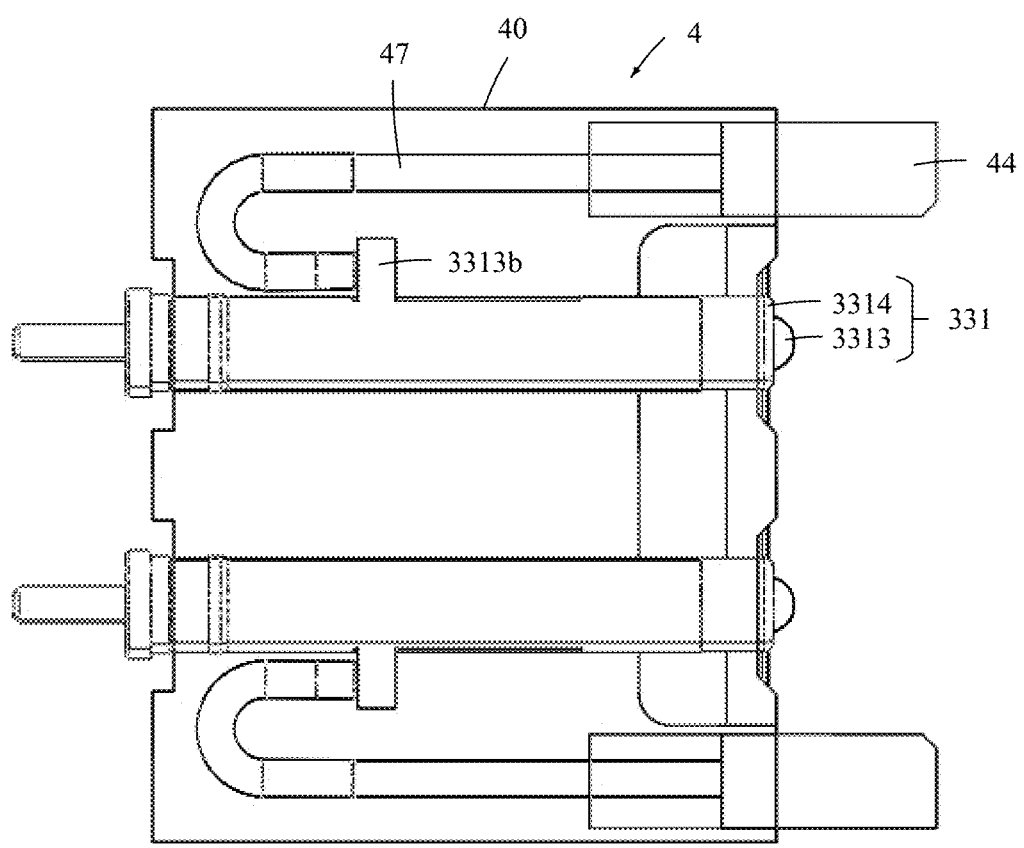
FIG. 44 is a schematic diagram of a structure in which a second electrical connector conductive part is in a pluggable guide block according to this application.
Figure 45:
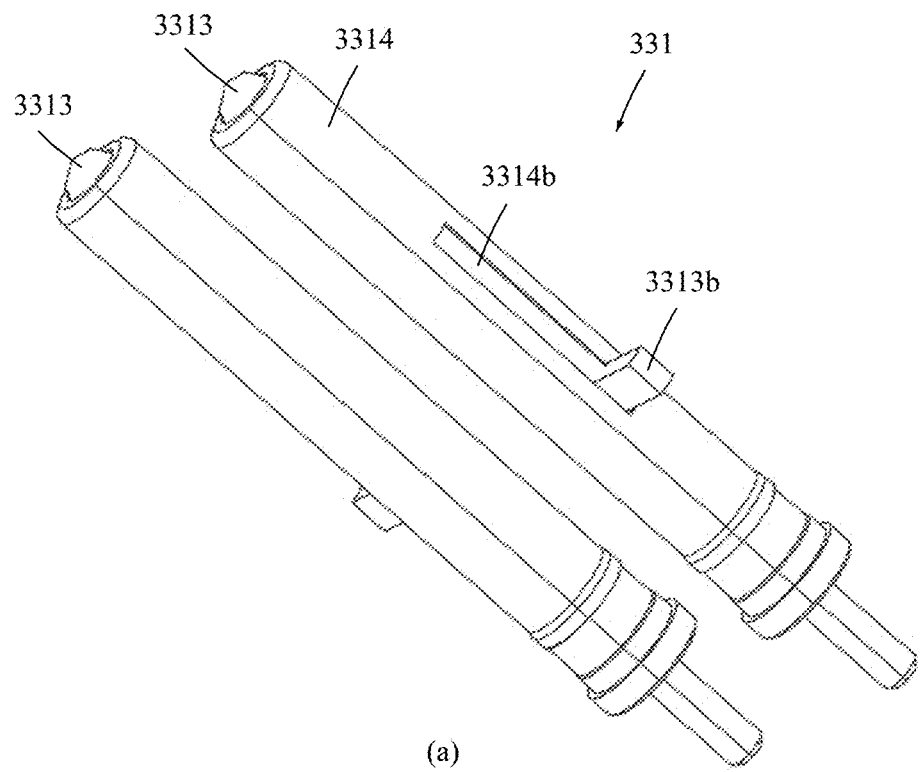
FIG. 45 is a schematic diagram of a structure of a spring pin according to this application.
Figure 45:
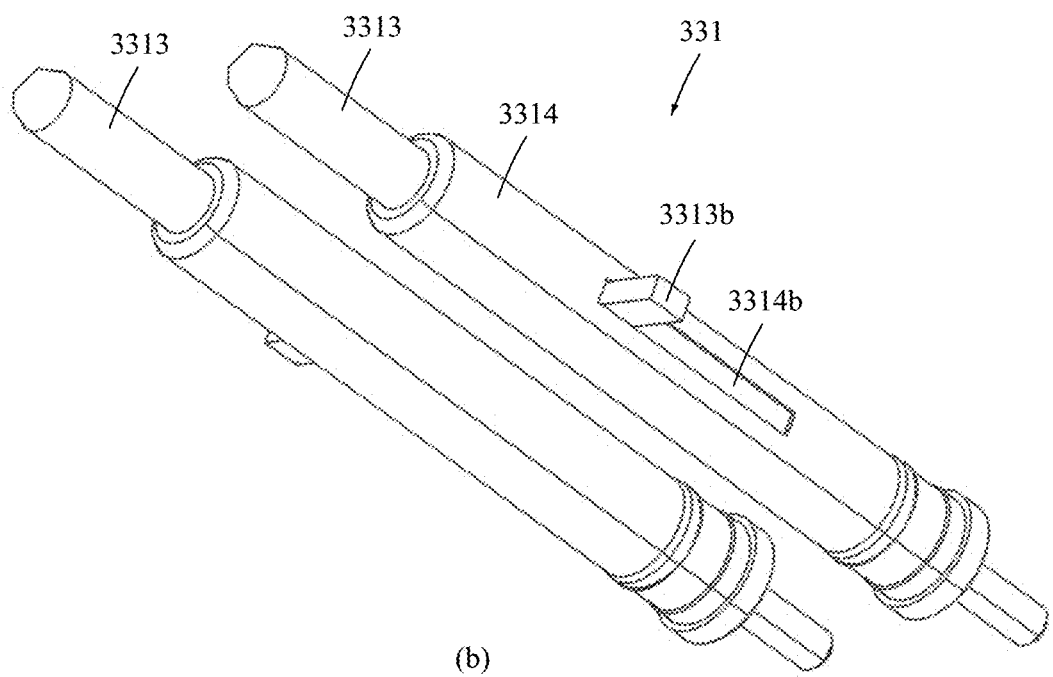

For another structure of the protective part, as shown in FIG. 44. The protective part includes a pressing part 44, and a U-shaped part 47. As shown in (a) and (b) in FIG. 45, the tube 3314 of the spring pin has an axial strip-shaped hole 3314b, the pin shaft 3313 of the spring pin has a bump 3313b, and the bump 3313b is located in the axial strip-shaped hole 3314b.

As shown in FIG. 44, one part of the pressing part 44 is located outside the body 40, and the other part is located in the body 40. Both the spring pin and the U-shaped part 47 are located in the body 40, a first end of the U-shaped part 47 is located at the pressing part 44, and a second end of the U-shaped part 47 is located at the bump 3321b of the pin shaft 3313.

The pressing part 44 may extend or retract relative to the body 40, and an extending/retracting direction is parallel to an insertion/removal direction of the optical module. Correspondingly, as shown in FIG. 44, the pressing part 44 is located at an end part of the body 40.

In this way, when the optical module is inserted into an optical cage of a communication device, the optical cage exerts an action force on the pressing part 44, so that the pressing part 44 is in a pressed state. When the pressing part 44 is in the pressed state, the U-shaped part 47 can push the pin shaft 3313 of the spring pin, so that the pin shaft 3313 is in close contact with a connector in the optical cage. When the optical module is removed from the optical cage of the communication device, the optical cage no long applies an action force on the pressing part 44, the spring inside the spring pin pulls the pin shaft 3313 to retract, and the bump 3321*b* of the pin shaft 3313 pushes the U-shaped part 47 to move, so that the pressing part 44 restores to a natural state, and is no longer in a pressed state.

It can be learned that, when the optical module is inserted into the communication device, the pressing part 44 is in a pressed state, and the pin shaft 3313 extends out of the tube 3314 under the push of the U-shaped rod 47, so as to be in close contact with a contact of the communication device. When the optical module is not inserted into the communication device, the pressing part 44 is in an unpressed state, and the pin shaft 3313 is retracted into the tube 3314.

In the foregoing solution, positions of the second electrical connector 32 and the second optical connector 23 are independent of each other, and the optical module includes one rigid circuit board, that is, the first rigid circuit board 221 of the optical component 2. In a solution in which the optical module includes two rigid circuit boards, positions of the second electrical connector 32 and the second optical connector 23 can also be independent of each other. One of the two rigid circuit boards is a rigid circuit board of the optical component 2, and is denoted as the first rigid circuit board 221, and the other is a rigid circuit board of the power supply component 3, and is denoted as a second rigid circuit board 321. The detailed solution is as follows.

Figure 46:
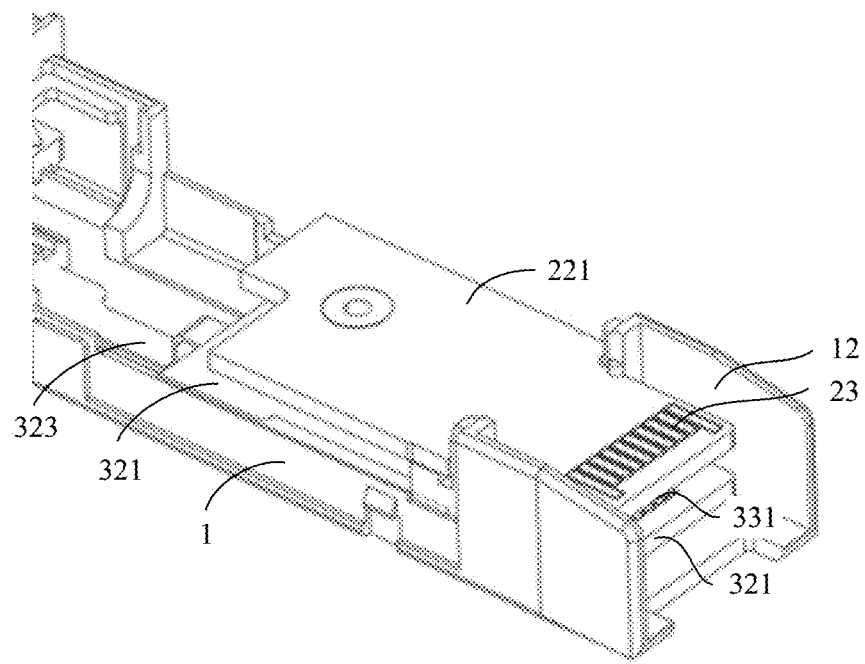
FIG. 46 is a schematic diagram of a structure of an optical module whose power supply line includes a second rigid circuit board according to this application.
Figure 47:
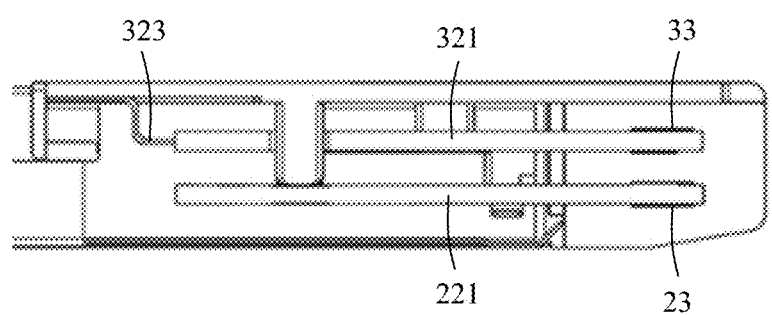
FIG. 47 is a schematic diagram of a structure of an optical module whose power supply line includes a second rigid circuit board according to this application.

For example, as shown in FIG. 46 and FIG. 47, the power supply component 3 further includes a second rigid circuit board 321. For example, the power supply line 32 of the power supply component 3 includes the second rigid circuit board 321, a first end of the second rigid circuit board 321 is located in the second socket 12, and the second electrical connector conductive part 331 of the second electrical connector 33 is an edge connector located on a surface of the second rigid circuit board 321.

As shown in FIG. 47, the second rigid circuit board 321 and the first rigid circuit board 221 of the optical component 2 are located in parallel in the housing 1, a first end of the second rigid circuit board 321 extends into the second socket 12, a surface of a part that is of the second rigid circuit board 321 and that is located in the second socket 12 has an edge connector, and the edge connector may be used as the second electrical connector conductive part 331 of the second electrical connector 33.

In an example, the second rigid circuit board not only has a flat cable used to implement an electrical connection between the first electrical connector 31 and the second electrical connector 33, but also may have some components installed, to reduce a quantity of components on the first rigid circuit board 221 of the optical component 2. In some other examples, a processing chip may be mounted on a surface of the second rigid circuit board 321, to increase a processing speed of the optical module.

An electrical connection relationship between the second electrical connector 33 and the first electrical connector 31 may be as follows: The power supply line 32 not only includes the second rigid circuit board 321, as shown in FIG. 46, but also includes the flexible circuit board 323. The first electrical connector 31, the flexible circuit board 323, and the second rigid circuit board 321 are electrically connected in sequence. The flexible circuit board 323 may be replaced with a cable.

In an example, the second rigid circuit board 321 is relatively close to an inner wall of the housing 1. In this case, the second socket 12 at a second end of the optical module is compatible, and can be inserted into an optical cage that does not include a power connector.

In the foregoing, the positions of the second electrical connector 33 and the second optical connector 23 are independent of each other, so as to implement compatibility of the second socket 12 of the optical module. In addition, the positions of a conductive part of the second electrical connector 33 and a conductive part of the second optical connector 23 are independent of each other, so that compatibility of the second socket 12 of the optical module can also be implemented. The detailed solution is as follows.

(2) The second electrical connector 33 and the second optical connector 23 are integrated together, but conductive parts of the two are independent of each other, so that compatibility of the second socket 12 can be implemented.

The second electrical connector conductive part 331 of the second electrical connector 33 is a metal sheet located on the surface of the first rigid circuit board 221.

For example, as described above, as shown in FIG. 48, the second optical connector 23 of the optical component 2 is an edge connector located on the surface of the first rigid circuit board 221. Therefore, as shown in FIG. 48, the second electrical connector conductive part 331 may be an undefined metal sheet in the edge connector, and the undefined metal sheet is an unused metal sheet in the edge connector. For another example, as shown in FIG. 49 and FIG. 50, the second electrical connector conductive part 331 is a metal sheet additionally disposed around the edge connector, and 23-33 in FIG. 49 and FIG. 50 indicates a composite electrical connector including the second optical connector 23 and the second electrical connector 33.

However, in a case in which the second electrical connector conductive part 331 of the second electrical connector 33 is a metal sheet additionally disposed around the edge connector, as shown in FIG. 49, the second electrical connector conductive part 331 is located at an end part of the edge connector in a length direction. Alternatively, as shown in FIG. 50, the second electrical connector conductive part 331 is located at a side part of the edge connector in a length direction. Position arrangement of the second electrical connector conductive part 331 of the second electrical connector 33 relative to the conductive part of the second optical connector 23 is not limited in this embodiment.

Regardless of whether the second electrical connector conductive part 331 of the second electrical connector 33 is an undefined metal sheet in the edge connector or a metal sheet additionally disposed around the edge connector, the second electrical connector conductive part 331 of the second electrical connector 33 is located on a surface of the first rigid circuit board 221 and is located in the second socket 12.

The first rigid circuit board 221 includes two opposite surfaces, and therefore, the second electrical connector conductive part 331 of the second electrical connector 33 is located on at least one of a first surface and a second surface of the first rigid circuit board 221.

The first surface and the second surface are a top surface and a bottom surface of the rigid circuit board.

For example, the second electrical connector conductive part 331 is located on the first surface of the first rigid circuit board 221. For another example, the second electrical connector conductive part 331 is located on the second surface of the first rigid circuit board 221. For another example, one part of the second electrical connector conductive part 331 is located on the first surface of the first rigid circuit board 221, and the other part of the second electrical connector conductive part 331 is located on the second surface of the first rigid circuit board 221.

In addition, regardless of whether the second electrical connector conductive part 331 of the second electrical connector 33 is an undefined metal sheet in the edge connector or a metal sheet additionally disposed around the edge connector, the second electrical connector conductive part 331 of the second electrical connector 33 and the conductive part of the second optical connector 23 are integrated on a surface of the first rigid circuit board 221 and are located in the second socket 12.

Figure 51:
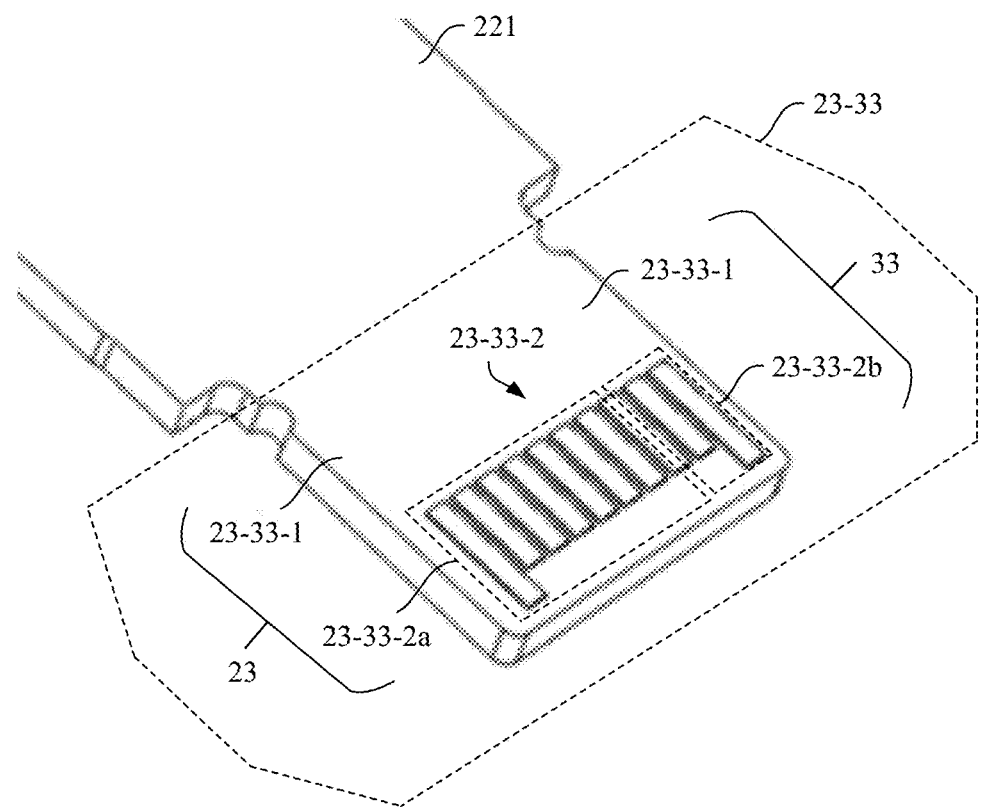
FIG. 51 is a schematic diagram of a structure in which a second electrical connector conductive part is located on a first rigid circuit board according to this application.

In this case, a part that is of the rigid circuit board 221 of the optical module and that is located in the second socket 12 may be denoted as a composite electrical connector 23-33. As shown in FIG. 51, the second optical connector 23 and the second electrical connector 33 form the composite electrical connector 23-33. The composite electrical connector 23-33 includes a composite electrical connector carrier 23-33-1 and a composite electrical connector edge connector 23-33-2. The composite electrical connector edge connector 23-33-2 is fastened on a surface of the composite electrical connector carrier 23-33-1, and the surface of the composite electrical connector carrier 23-33-1 is a surface parallel to an insertion/removal direction of the optical module. A first metal sheet 23-33-2a in the composite electrical connector edge connector 23-33-2 is electrically connected to an optical-to-electrical conversion component 22 to form the second optical connector 23, and a second metal sheet 23-33-2b in the composite electrical connector edge connector 23-33-2 is electrically connected to the power supply line 32 to form the second electrical connector 33.

The second metal sheet 23-33-2b may be the undefined metal sheet or additionally disposed metal sheet described above.

The composite electrical connector carrier 23-33-1 is also a part that is of the first rigid circuit board 221 and that is located in the second socket 12. The composite electrical connector edge connector 23-33-2 is formed by a plurality of conductive contact sheets (which may also be referred to as metal sheets), and is laid on two opposite surfaces of the composite electrical connector carrier 23-33-1.

In this way, the second optical connector 23 and the second electrical connector 33 are integrated together, so that installation space of the optical module can be reduced and miniaturization development of the optical module is facilitated.

In addition, the second optical connector 23 and the second electrical connector 33 are integrated together to implement compatibility of the second end of the optical module, so that the second end of the optical module can be inserted not only into an optical cage of an updated communication device, but also into the optical cage of the updated communication device.

The updated communication device refers to a device whose optical cage has a power connector electrically connected to the second electrical connector 33. The communication device before update refers to a device whose optical cage has no power connector electrically connected to the second electrical connector 33.

As described above, an electrical connection between the first electrical connector 31 and the second electrical connector 33 is implemented by using the power supply line 32 and the first rigid circuit board 221. As shown in FIG. 50, the power supply line 32 may be a flexible circuit board. As shown in FIG. 51, an end that is of the flexible circuit board and that is far away from the first electrical connector 31 may be welded to a surface of the first rigid circuit board 221, so as to implement an electrical connection between the flexible circuit board and a flat cable of the first rigid circuit board 221, and one end that is of the flat cable of the first rigid circuit board 221 and that is away from the flexible circuit board is electrically connected to the second electrical connector conductive part 331 located in the first rigid circuit board 221.

In another example, the power supply line 32 may alternatively be a cable. In this case, one end that is of the cable and that is away from the first electrical connector 31 may be connected to a flat cable of the first rigid circuit board 221, to implement an electrical connection between the cable and the flat cable of the first rigid circuit board 221, and one end that is of the flat cable of the first rigid circuit board 221 and that is far away from the flexible circuit board is electrically connected to the second electrical connector conductive part 331 located in the first rigid circuit board 221.

Regardless of whether the power supply line 32 of the power supply component 3 is a cable or a flexible circuit board, the power supply line 32 may be laid on an inner surface of the housing 1.

(IV) When the Power Supply Component 3 of the Optical Module is Used as a Power Transmission Channel, an Application Scenario of the Power Supply Component 3 May be as Follows.

The power supply component 3 is mainly configured to transmit electric energy, and is used as a power channel to transmit power.

Therefore, the optical module not only has an optical component for implementing conversion between an optical signal and an electrical signal, but also has a power supply component for implementing PoE. In this way, only an interface used to insert an optical module may be disposed on a panel of a device into which the optical module is inserted, for example, a switch or an AP, and an interface used to implement PoE does not need to be additionally disposed, so that a size of a panel on the device can be reduced.

As described above, the optical module has the power supply component 3 for implementing PoE. In application, the optical module may be configured to: when it is detected that the inserted communication device is a powered device, determine a power consumption level of the communication device, and transmit electric energy to the communication device based on the power consumption level of the communication device.

PoE includes power sourcing equipment (Power Sourcing Equipment, PSE) and a powered device (Power Device, PD). The power sourcing equipment may be a PoE switch or the like, and the powered device may be a PoE network camera, an AP, or the like.

For example, in a scenario, an optical module is inserted into an interface of a switch, an optical module is inserted into an interface of an AP, and the optical module on the switch is connected to the optical module on the AP by using a composite cable. The switch is power sourcing equipment, and the AP is a powered device. The switch outputs a small voltage to the AP through a port. After detecting that the AP is a powered device and supports PoE, a processor in the optical module inserted into the switch may feed back that the AP is the powered device to the inserted switch, and then the switch increases a voltage transmitted to the AP, so that the processor of the optical module inserted into the switch detects a power consumption level of the AP, the processor of the optical module inserted into the switch determines, based on a pre-stored correspondence between a power consumption level and a power supply voltage, a power supply voltage corresponding to the power consumption level of the AP, and feeds back the power supply voltage required by the AP to the inserted switch. In this case, the switch stably transmits electric energy to the AP based on the power supply voltage.

The power supply component 3 in the optical module may be configured to transmit not only electric energy, but also some data signals.

In some examples, the data signal transmitted in the power supply component 3 may include at least one of a signal used to adjust optical power of an optical component, a signal used to adjust a signal-to-noise ratio of a fiber channel, a signal used to adjust an S parameter of a fiber channel, and a signal indicating that an optical module is abnormal.

Since the power supply component 3 may transmit a data signal, the power supply component 3 may be used as a backhaul channel, and the backhaul channel is a channel that can return some information to a transmit end after a receive end receives the signal.

The power supply component 3 is used as a backhaul channel. In this case, when receiving an optical signal sent by the optical module at the transmit end, the optical module at the receive end may generate first feedback information based on the optical signal, and modulate the first feedback information to the power supply component 3. The first feedback information is used to indicate the optical module at the transmit end to adjust a parameter of the optical component 2. For example, the first feedback information includes at least one type of information used to adjust optical power of the optical component 2, information used to adjust a signal-to-noise ratio of a fiber channel, and information used to adjust an S parameter of the fiber channel, where the S parameter may also be referred to as a scattering parameter, and is an important parameter in microwave transmission.

In this case, for the optical module at the transmit end, when second feedback information sent by the optical module at the receive end is received by using the power supply component 3, the parameter of the optical component 2 is adjusted based on the second feedback information.

The second feedback information also includes at least one of information used to adjust optical power of the optical component 2, information used to adjust a signal-to-noise ratio of a fiber channel, and information used to adjust an S parameter of the fiber channel.

If the optical module at the transmit end and the optical module at the receive end are a pair of interactive optical modules, content carried in the first feedback information is equal to content carried in the second feedback information. In the following example, a pair of interactive optical modules may be used as an example for description.

For example, if a switch sends an optical signal to an AP, an optical module inserted into a panel of the switch is a transmit end, and an optical module inserted into a panel of the AP is a receive end. The optical module at the transmit end sends an optical signal to the optical module at the receive end through a fiber channel. When receiving the optical signal sent by the optical module at the transmit end, the optical module at the receive end generates feedback information (that is, the foregoing first feedback information) based on the optical signal, and modulates the feedback information to the power supply component 3. The power supply component 3 sends the feedback information to a copper wire of a composite cable by using the first electrical connector 31.

The feedback information is transmitted to the optical module at the transmit end by using the copper wire, and is transmitted to the power supply component 3 of the optical module at the transmit end by using the first electrical connector 31 of the optical module at the transmit end. The power supply component 3 of the optical module at the transmit end sends the feedback information to the processor, and the processor parses to obtain the feedback information (that is, the foregoing second feedback information). Then, the processor in the optical module at the transmit end performs equalization adjustment on a parameter of the optical component 2 based on the received feedback information.

In an example, the feedback information includes a power value. In this case, after obtaining, through parsing, the power value received by the optical module at the receive end, the optical module at the transmit end compares the power value with a pre-stored power threshold required by the optical module at the receive end. If the received power value is greater than the power threshold, a power value for subsequently sending the optical signal to the optical module at the receive end may be reduced, and when the received power value is relatively close to the pre-stored power threshold, adjustment of the power value for sending the optical signal to the optical module at the receive end is stopped. In this way, the optical module at the transmit end may dynamically adjust the power value of the transmitted optical signal based on the feedback information that is sent by the optical module at the receive end and that carries the power value, to achieve an effect of reducing power consumption and saving energy.

In another example, the feedback information includes a signal-to-noise ratio or an S parameter. In this case, after the optical module at the transmit end obtains, through parsing, the signal-to-noise ratio of the fiber channel sent by the optical module at the receive end, if the signal-to-noise ratio is high, the optical module at the transmit end does not need to adjust a parameter; if the signal-to-noise ratio is low, the optical module at the transmit end may increase the signal-to-noise ratio by increasing a transmit power, or may increase the signal-to-noise ratio by adjusting a quantity of taps and a coefficient of the quantity of taps.

In this way, the power supply component 3 is used as a backhaul channel, so that the optical module at the transmit end can obtain some data in the fiber channel, to provide a basis for transmitting an optimal optical signal. In addition, once quality of the transmitted optical signal is high, the optical module is also protected to a specific extent. This helps prolong the service life of the optical module.

For another example, when the optical module is faulty, for example, when power of the transmitted optical signal is excessively low, or when optical-to-electrical conversion cannot be performed, an abnormal signal may be sent to the inserted device by using the power supply component 3, so that a skilled person can learn, by using the device, that the optical module is faulty and needs to be replaced.

It can be learned that the optical module has a power supply component for implementing PoE, and the power supply component can not only transmit electric energy, but also transmit some data signals.

Transmitting the data signal by using the power supply component 3 has at least the following beneficial effects.

(1) Because power of a transmitted data signal is much lower than power of power transmission, the transmitted data signal is equivalent to being overwhelmed in a power signal in a spectrum. In this way, even if the data signal is intercepted by an eavesdropper, the eavesdropper may consider it as a noise signal. Therefore, when the data signal is transmitted by using the power supply component 3, it is difficult to intercept the data signal, and security of data signal transmission can be improved.

(2) Compared with transmitting the data signal in the fiber channel, transmitting the data signal by using the power supply component 3, apparently, does not occupy the fiber channel, and does not affect a transmission rate of the optical signal in the fiber channel.

Based on the foregoing description, the optical module has at least the following effects.

The optical module not only has an optical-to-electrical conversion function, but also has the power supply component for implementing PoE. In addition, the power supply component does not change an original structural feature of the optical module, and does not affect a size of the optical module. In this way, a power connector of the composite cable is electrically connected to the communication device by using the optical module, and the power connector of the composite cable does not need to be inserted into the communication device, so that panel space of the communication device is reduced, and miniaturization development of the communication device is facilitated.

The first electrical connector 31 at a first end of the optical module does not change the original structural feature of the optical module, so that the first end of the optical module is compatible, and can be configured to insert a composite cable or an optical cable. Therefore, the optical module has a wide application scenario.

The second electrical connector 33 at a second end of the optical module does not change an original structural feature of the optical module, so that the second end of the optical module is compatible, and can be inserted into both an updated optical cage and an optical cage before update. Therefore, the optical module has a wide application scenario. The updated optical cage matches a packaging type of the optical module, and includes an optical cage of a power connector that matches the second electrical connector. The updated optical cage matches the packaging type of the optical module, but does not include the optical cage of the power connector that matches the second electrical connector. The optical cage is an interface component of a communication device.

Embodiments of this application further provide a communication device. The communication device may be any device in the optical communication field, for example, may be a switch or an AP.

Figure 52:
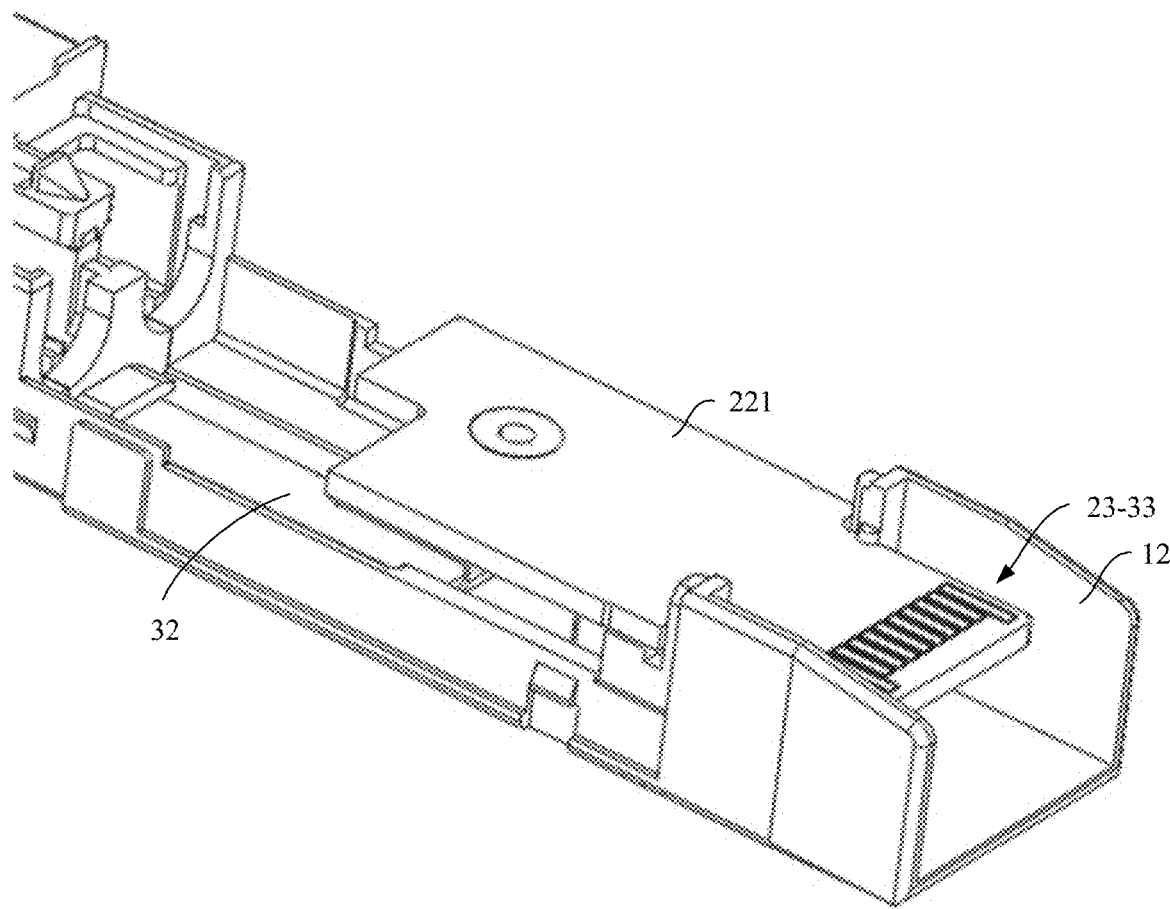
FIG. 52 is a schematic diagram of a structure of an optical module whose second electrical connector conductive part is located on a first rigid circuit board according to this application.
Figure 53:
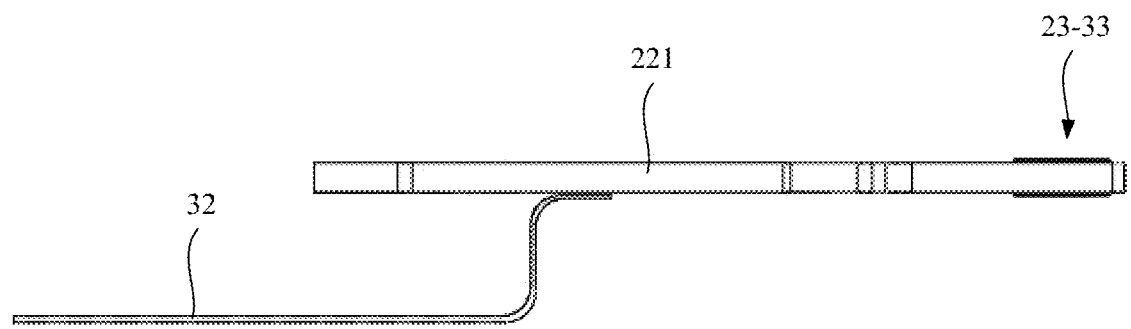
FIG. 53 is a schematic diagram of a structure in which a power supply line is connected to a first rigid circuit board according to this application.
Figure 54:
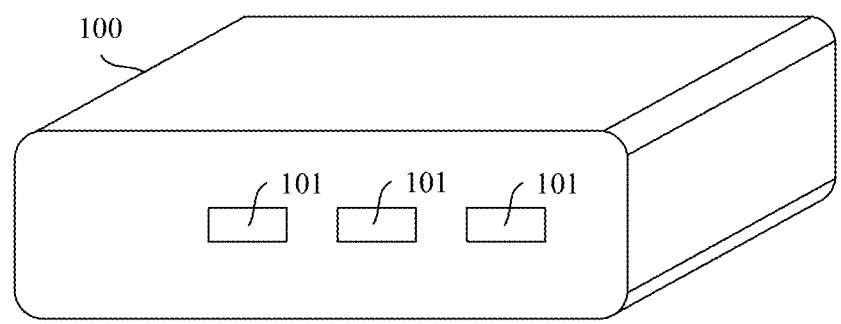
FIG. 54 is a schematic diagram of a structure of a communication device according to this application.
Figure 55:
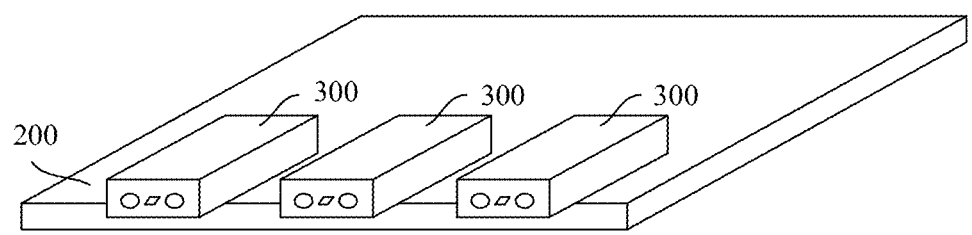
FIG. 55 is a schematic diagram of a structure of a mainboard of a communication device according to this application.

As shown in FIG. 52 and FIG. 53, the communication device includes a chassis 100, a mainboard 200, and an optical-to-electrical conversion assembly 300. As shown in FIG. 52, a panel of the chassis 100 has an optical cable socket 101. The optical-to-electrical conversion assembly 300 shown in FIG. 53 includes the optical component 2 and the power supply component 3. The mainboard 200, the optical component 2, and the power supply component 3 are all located in the chassis 100, the optical component 2 and the power supply component 3 are both located on a surface of the mainboard 200, and the optical connector of the optical component 2 and the electrical connector of the power supply component 3 are independent of each other, and are all located in the optical cable socket 101.

The optical connector of the optical component 2 is configured to be connected to an optical fiber connector of a composite cable, so as to transmit an optical signal. The electrical connector of the power supply component 3 is configured to be electrically connected to the power connector of the composite cable, to implement PoE power transmission.

In an example, the optical-to-electrical conversion assembly 300 implements an optical-to-electrical conversion function by using the optical component 2, and implements a PoE function by using the power supply component 3. Because the communication device needs to be connected to the composite cable, a panel of the chassis 100 has an optical cable socket 101. An optical connector of the optical component 2 and an electrical connector of the power supply component 3 are both opposite to the optical cable socket 101. For example, the optical connector of the optical component 2 is located in the optical cable socket 101, and the electrical connector of the power supply component 3 is also located in the optical cable socket 101.

In an example, the communication device may be matched with the composite cable for use. The composite cable may be inserted into the optical cable socket 101. An optical fiber connector of the composite cable is connected to an optical connector of the optical component 2 in the optical cable socket 101, to implement optical signal transmission. A power connector of the composite cable is electrically connected to an electrical connector in the optical cable socket 101, to implement electrical transmission.

In another example, the optical cable socket 101 is compatible, so that the communication device may further be matched with an optical cable for use. An optical fiber connector of the optical cable may be inserted into the optical cable socket 101, and is connected to an optical connector of the optical component 2, to implement optical signal transmission.

It can be learned that the optical cable socket 101 of the communication device can be matched with both a composite cable and an optical cable, and has compatibility, a wide application scenario, and high use flexibility. In application, the communication device is also easy for cable onsite preparation.

A structural feature of implementing compatibility of the communication device may be as follows.

For an implementation in which the optical cable socket 101 has compatibility, refer to the foregoing implementation in which the first socket 11 of the optical module has compatibility.

For example, both the optical connector of the optical component 2 and the electrical connector of the power supply component 3 are located in the optical cable socket 101, and positions of the optical connector of the optical component 2 and the electrical connector of the power supply component 3 are independent of each other, so that the optical cable socket 101 is configured to insert the composite cable and the optical cable.

In an example, the optical component 2 is located on a surface of the mainboard 200, and the optical connector of the optical component 2 is generally supported by using a center pillar 5, and guiding and limiting for insertion and removal are also implemented by using the center pillar 5. The conductive part of the electrical connector of the power supply component 3 may be a bent strip, and may be fastened in the center pillar 5, without affecting a structural feature of the optical connector of the optical component 2. In this way, compatibility of the optical cable socket 101 of the communication device can be implemented. For a fastening relationship between the conductive part of the electrical connector of the power supply component 3 and the center pillar 5 and a specific structural form of the conductive part of the electrical connector, refer to a fastening relationship between the first electrical connector conductive part 311 of the power supply component 3 and the center pillar 5 and a specific structural form of the first electrical connector conductive part 311. Details are not described herein again.

The optical cable socket 101 of the communication device has compatibility, so that an optical cable can be inserted into the optical cable socket 101 and is connected to an optical connector in the optical cable socket 101, to implement optical signal transmission. A composite cable can be further inserted into the optical cable socket 101, an optical fiber connector of the composite cable is connected to an optical connector in the optical cable socket 101, to implement optical signal transmission, and a power connector of the composite cable is electrically connected to an electrical connector in the optical cable socket 101, to implement power transmission.

The communication device is integrated with the optical-to-electrical conversion assembly 300. In this case, when the communication device is connected to another device, only an optical cable or a composite cable needs to be inserted, and an optical module does not need to be additionally inserted. Therefore, the connection operation is simple, and loss of the optical module can be avoided. In addition, a case in which a connection fails due to mismatching between the optical module and the communication device can be avoided.

This embodiment further provides a power over Ethernet PoE device. The PoE device includes the optical module described above, and the optical module of the PoE device, as described above, not only has an optical-to-electrical conversion function, but also has a power supply component for implementing PoE, and the power supply component does not change an original structural feature of the optical module, and does not affect a size of the optical module. In this way, the power connector of the composite cable is electrically connected to the PoE device by using the optical module, and the power connector of the composite cable does not need to be inserted into the PoE device, so that panel space of the PoE device can be reduced, a structure of the PoE device more compact, and miniaturization development of the PoE device is facilitated.

The foregoing description is merely an embodiment of this application, but is not intended to limit this application. Any modification, equivalent replacement, or improvement made without departing from the principle of this application shall fall within the protection scope of this application.

What is claimed is:

1. An optical module, comprising:
    a housing having a first end and a second end, the first end of the housing being provided with a first socket and the second end of the housing being provided with a second socket;
    an optical component comprising a first optical connector, an optical-to-electrical converter, and a second optical connector that are sequentially connected;
    a center pillar comprising a support plate and a guiding and limiting plate; and
    a power supply component comprising a first electrical connector, a power supply line, and a second electrical connector that are sequentially connected, the first electrical connector comprising a first electrical connector conductor being located in the center pillar and comprising a first bent strip and a second bent strip, the first bent strip comprising a first segment, a second segment, and a third segment, the second bent strip comprising a fourth segment, a fifth segment, and a sixth segment,
    wherein both the optical-to-electrical converter and the power supply line are located in the housing,
    wherein both the first optical connector and the first electrical connector are located at the first socket,
    wherein positions of the first optical connector and the first electrical connector are independent of each other,
    wherein both the second optical connector and the second electrical connector are located at the second socket,
    wherein the first socket is configured to receive a composite cable or an optical cable that matches the optical module,
    wherein the guiding and limiting plate includes a first plate body and a second plate body, a height of the first plate body being less than a height of the second plate body, the first plate body being located at a first end of the second plate body, a second end of the second plate body being located on a surface of the support plate, the second end of the second plate body being distal from the first plate body,
    wherein a first part of the first segment of the first bent strip is located on an upper surface of the first plate body, the first part of the first segment of the first bent strip being exposed from the guiding and limiting plate and configured to be connectable to a power connector of the composite cable, a second part of the first segment of the first bent strip being located in the second plate body, and
    wherein a first part of the fourth segment of the second bent strip is located on a lower surface of the first plate body, the first part of the fourth segment of the second bent strip being exposed from the guiding and limiting plate and configured to be connectable to the power connector of the composite cable, a second part of the fourth segment of the second bent strip being located in the second plate body.

2. The optical module according to claim 1, wherein the first electrical connector conductor is configured to pass a current greater than or equal to a target current value.

3. The optical module according to claim 2,
    wherein at least a portion of the first bent strip and at least a portion of the second bent strip are located in a same vertical plane; and
    wherein at least a portion of the first bent strip and at least a portion of the second bent strip are located in a same horizontal plane.

4. The optical module according to claim 3,
    wherein one end of the second segment is connected to a side part of the first segment, the other end of the second segment is connected to a side part of the third segment, and the first segment and the third segment are located on different sides of the second segment, and
    wherein there is a height difference between the first segment and the third segment.

5. The optical module according to claim 4, wherein the first segment, the second segment, and the third segment are integrally formed.

6. The optical module according to claim 3, wherein a bending of the second bent strip matches a bending of the first bent strip.

7. The optical module according to claim 4,
wherein one end of the fifth segment is connected to one end of the fourth segment, the other end of the fifth segment is connected to an end part of the sixth segment, the fourth segment and the sixth segment are located on different sides of the fifth segment, and
wherein there is a height difference between the fourth segment and the sixth segment.

8. The optical module according to claim 3, wherein a minimum spacing between the first bent strip and the second bent strip meets a specified safety range under a target voltage.

9. The optical module according to claim 3, wherein a cross-sectional area of the first bent strip and a cross-sectional area of the second bent strip can satisfy that a current passing through is greater than or equal to a target current value.

10. The optical module according to claim 1, wherein a shape of a connection part that is of the first electrical connector conductor and that is close to the power supply line matches a shape of the power supply line.

11. The optical module according to claim 10, wherein the power supply line is a flexible circuit board, the connection part of the first electrical connector conductor has a sheet-shaped structure, and the connection part is welded on a surface of the power supply line.

12. The optical module according to claim 10, wherein the power supply line is a cable, the connection part of the first electrical connector conductor has a circular-ring-shaped structure, and an end part of the power supply line is fastened in the connection part.

13. A power over Ethernet (POE) device, comprising the optical module according to claim 1.

* * * * *